(12) United States Patent
Tang et al.

(10) Patent No.: US 11,947,069 B2
(45) Date of Patent: Apr. 2, 2024

(54) ADAPTIVE DOWNHOLE ACQUISITION SYSTEM

(71) Applicant: Schlumberger Technology Corporation, Sugar Land, TX (US)

(72) Inventors: Yiqiao Tang, Belmont, MA (US); Yi-Qiao Song, Newton Center, MA (US); Nicholas Heaton, Houston, TX (US); Martin Hurlimann, Newton, MA (US); Scott DiPasquale, Sugar Land, TX (US); Diogenes Molina, Richmond, TX (US); Albina Rishatovna Mutina, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/044,587

(22) PCT Filed: May 15, 2019

(86) PCT No.: PCT/US2019/032337
§ 371 (c)(1),
(2) Date: Oct. 1, 2020

(87) PCT Pub. No.: WO2019/222300
PCT Pub. Date: Nov. 21, 2019

(65) Prior Publication Data
US 2021/0199838 A1    Jul. 1, 2021

Related U.S. Application Data

(60) Provisional application No. 62/671,640, filed on May 15, 2018.

(51) Int. Cl.
*G01V 3/32* (2006.01)
*E21B 44/00* (2006.01)
(Continued)

(52) U.S. Cl.
CPC ............... *G01V 3/32* (2013.01); *E21B 44/00* (2013.01); *E21B 47/26* (2020.05); *E21B 49/00* (2013.01); *E21B 41/00* (2013.01)

(58) Field of Classification Search
CPC ............ G01V 3/32; E21B 47/26; E21B 44/00; E21B 49/00
See application file for complete search history.

(56) References Cited

U.S. PATENT DOCUMENTS

| 5,309,098 A | | 5/1994 | Coates et al. |
| 5,486,762 A | * | 1/1996 | Freedman ............ G01N 24/081 324/303 |

(Continued)

FOREIGN PATENT DOCUMENTS

| AU | WO 2010062635 A3 * | 6/2010 | ............. E21B 47/00 |
| CN | 102016746 A | 4/2011 | |

(Continued)

OTHER PUBLICATIONS

International Search Report and Written Opinion issued in International Patent application PCT/US2019/032337 dated Aug. 23, 2019, 12 pages.

(Continued)

*Primary Examiner* — Dixomara Vargas
(74) *Attorney, Agent, or Firm* — Jeffrey D. Frantz

(57) ABSTRACT

A method can include accessing a measurement model in memory of a downhole tool; determining an optimal parameter set using a processor of the downhole tool and the measurement model; and performing at least one measurement using at least one sensor of the downhole tool operated according to the optimal parameter set.

19 Claims, 41 Drawing Sheets

(51) Int. Cl.
    *E21B 47/26*     (2012.01)
    *E21B 49/00*     (2006.01)
    *E21B 41/00*     (2006.01)

(56) References Cited

U.S. PATENT DOCUMENTS

| | | |
|---|---|---|
| 6,291,995 B1 | 9/2001 | Speier et al. |
| 6,405,798 B1 | 6/2002 | Barrett et al. |
| 6,766,254 B1 | 7/2004 | Bradford et al. |
| 7,301,338 B2 | 11/2007 | Gillen et al. |
| 7,565,833 B2 | 7/2009 | Gillen et al. |
| 7,660,705 B1 | 2/2010 | Meek et al. |
| 10,042,026 B2 * | 8/2018 | Li .................. G01N 24/081 |
| 2003/0214286 A1 * | 11/2003 | Heidler ............ G01V 3/32 |
| | | 324/303 |
| 2004/0267770 A1 | 12/2004 | Lee |
| 2005/0257610 A1 | 11/2005 | Gillen et al. |
| 2006/0033491 A1 * | 2/2006 | Blanz ............... G01R 33/5617 |
| | | 324/303 |
| 2008/0021654 A1 | 1/2008 | Gillen et al. |
| 2008/0257546 A1 | 10/2008 | Cresswell et al. |
| 2008/0270346 A1 | 10/2008 | Mehta et al. |
| 2010/0259415 A1 * | 10/2010 | Strachan ........... G05B 13/048 |
| | | 340/853.6 |
| 2011/0174541 A1 * | 7/2011 | Strachan ........... E21B 44/00 |
| | | 702/9 |
| 2011/0295510 A1 * | 12/2011 | Gulati ............. G01V 1/288 |
| | | 345/419 |
| 2012/0316787 A1 * | 12/2012 | Moran ............. E21B 44/00 |
| | | 702/9 |
| 2013/0214779 A1 * | 8/2013 | Tietjen ............ G01V 3/32 |
| | | 324/303 |
| 2013/0226461 A1 | 8/2013 | Yu et al. |
| 2013/0325408 A1 * | 12/2013 | Song ............... G01R 33/54 |
| | | 702/189 |
| 2014/0190747 A1 * | 7/2014 | Hay ............... E21B 47/024 |
| | | 73/1.13 |
| 2014/0251688 A1 | 9/2014 | Turner et al. |
| 2014/0253116 A1 * | 9/2014 | Freedman .......... G01R 33/305 |
| | | 324/309 |
| 2016/0047935 A1 * | 2/2016 | Ali ............... G01V 3/32 |
| | | 702/7 |
| 2016/0170067 A1 * | 6/2016 | Heaton ............ G01V 3/14 |
| | | 324/303 |
| 2016/0170071 A1 | 6/2016 | Yang et al. |
| 2016/0202384 A1 * | 7/2016 | Utsuzawa .......... E21B 17/10 |
| | | 324/303 |
| 2017/0004455 A1 | 1/2017 | Tang et al. |
| 2017/0032210 A1 | 2/2017 | Deppieri et al. |
| 2017/0235007 A1 | 8/2017 | Holtz |
| 2017/0308634 A1 * | 10/2017 | Samuel ............ E21B 47/007 |
| 2017/0315258 A1 | 11/2017 | Molina et al. |
| 2017/0335662 A1 | 11/2017 | Torrado et al. |
| 2018/0188403 A1 | 7/2018 | Halsey et al. |
| 2019/0138920 A1 | 5/2019 | Lin et al. |
| 2019/0249523 A1 * | 8/2019 | Moghanloo ........ G01N 15/0886 |
| 2019/0331813 A1 * | 10/2019 | Zhang ............ G01V 1/30 |
| 2019/0360320 A1 * | 11/2019 | Hohl ............. G01L 5/10 |
| 2020/0019882 A1 * | 1/2020 | Garg ............. G06F 21/6218 |
| 2020/0185085 A1 * | 6/2020 | Mavrieudus ....... G16H 30/40 |
| 2020/0319369 A1 * | 10/2020 | Shao ............. G01V 3/32 |
| 2020/0392836 A1 * | 12/2020 | Mohnke .......... E21B 47/12 |
| 2021/0157026 A1 * | 5/2021 | Yang ............. G01V 3/38 |

FOREIGN PATENT DOCUMENTS

| | | |
|---|---|---|
| CN | 203308456 U | 11/2013 |
| CN | 107133670 A | 9/2017 |
| CN | 107169463 A | 9/2017 |
| CN | 107590775 A | 1/2018 |
| EP | 3038049 A1 | 6/2016 |
| WO | 0125823 A1 | 4/2001 |
| WO | 2017127045 A1 | 7/2017 |
| WO | 2018030994 A1 | 2/2018 |
| WO | 2020069378 A1 | 4/2020 |

OTHER PUBLICATIONS

International Preliminary Report on Patentability of International Patent Application No. PCT/US2019/032337 dated Nov. 17, 2020, 7 pages.

International Search Report and Written Opinion issued in International Patent application PCT/US2019/053552 dated Jan. 16, 2020, 10 pages.

Atkinson et al. "Optimum experimental designs for properties of a compartmental model." Biometrics, Jun. 1993, 325-337.

Bahrami, A., et al. "Robust, Integrated Computational Control of NMR Experiments to Achieve Optimal Assignment by Adapt-NMR." PLOS One, 2012, 7(3), 7 pages.

Box et al., "Design of experiments in non-linear situations." Biometrika 46.1/2 (1959): 77-90.

Burges, C. J.. "A Tutorial on Support Vector Machines for Pattern Recognition," Data Mining and Knowledge Discovery, 2, 1998, pp. 121-167.

Chaloner, K. et al., "Bayesian Experimental Design: A Review", Statistical Science, 1995, 10(3), pp. 273-304.

Duan, C., et al. "Effect of off-resonance on T1 saturation recovery measurement in inhomogeneous fields." Journal of Magnetic Resonance 2017, 281, pp. 31-43.

Eghbalnia et al., "High-resolution iterative frequency identification for NMR as a general strategy for multidimensional data collection." Journal of the American Chemical Society 127.36 (2005): 12528-12536.

"Golub, G. H. et al., ""Singular Value Decomposition and Least Squares Solutions"" Numer. Math, 1970, 14, pp. 403-420."

Hansen et al., "Absolute Minimal Sampling in High-Dimensional NMR Spectroscopy." Angewandte Chemie International Edition 55.45 (2016): 14169-14172.

Hansen et al., "Absolute Minimal Sampling of Homonuclear 2D NMR TOCSY Spectra for High-Throughput Applications of Complex Mixtures." Angewandte Chemie(2017) 56, 8149-8152.

Heaton, et al. "Next Generation LWD NMR for Slim Holes." SPWLA 59th Annual Logging Symposium. Society of Petrophysicists and Well-Log Analysts, 2018, 12 pages.

Hiller, S., et al. "Automated projection spectroscopy (APSY)." Proceedings of the National Academy of Sciences of the United States of America, 2005, 102(31), pp. 10876-10881.

Hurlimann et al., "Spin Dynamics of Carr-Purcell-Meiboom-Gill-like Sequences in Grossly Inhomogenous B0 and B1 Fields and Application to NMR Well Logging" Journal of Magnetic Resoanance, 2000, 143, pp. 120-135.

Jaravine et al., "Targeted acquisition for real-time NMR spectroscopy." Journal of the American Chemical Society 128.41 (2006): 13421-13426.

Ma et al. "Magnetic resonance fingerprinting." Nature 495.7440 (2013): 187-193.

Mcgivney et al., "SVD compression for magnetic resonance fingerprinting in the time domain." IEEE transactions on medical imaging 33.12 (2014): 2311-2322.

Shi et al, Edge computing: Vision and challenges, IEEE Internet of Things Journal 3 (5) (2016), pp. 637-646.

Song., et al. "Real-time optimization of nuclear magnetic resonance experiments." Journal of Magnetic Resonance 289 (2018): 72-78.).

Venkataramanan, L. et al., "Solving Fredholm integrals of the First Kind with Tensor Product Structure in 2 and 2.5 Dimensions", IEEE Transactions on Signal Processing, 2002, 50(5), pp. 1017-1026.

Wald, Abraham. Sequential analysis.Chapter 2 Sequential Test of a Statistical Hypothesis: General Discussion, Courier Corporation, 1973, 31 pages.

Yi-Qiao et al. "Two-dimensional NMR of Diffusion and Relaxation." Diffusion NMR of Confined Systems. 2016. 111-155.

Zhao et al., "Accelerated MR Parameter Mapping with Low-Rank and Sparsity Constraints", Magnetic Resonance in Medicine, 2015, 74(2), pp. 489-498.

(56) References Cited

OTHER PUBLICATIONS

Huan, X. et al., "Sequential Bayesian optimal experimental design via approximate dynamic programming", ARXIV.org, Cornell University Library, 2016, 34 pages.
Extended Search Report issued in European Patent Application No. 19866591.1 dated May 13, 2022, 10 pages.
First Office Action issued in Chinese Patent Application No. 2019800710162 dated Jan. 28, 2023, 25 pages with English translation.
Yan et al., Study on real-time control and analysis system for LWD, includes English Abstract and English References, Oil Drilling & Production Technology, vol. 23, No. 3, China, May 2010, 5 pages.
Office Action issued in U.S. Appl. No. 17/279,617 dated Apr. 6, 2023, 49 pages.
Third Office Action issued in Chinese Patent Application No. 2019800710162 dated Sep. 26, 2023, 23 pages.
Office Action issued in U.S. Appl. No. 17/279,617 dated Aug. 23, 2023, 30 pages.
Second Office Action issued in Chinese Patent Application No. 2019800710162 dated Jul. 29, 2023, 15 pages.
Ding, S. et al., "Survey on Multi Class Twin Support Vector Machines", Journal of Software, 2018, 29(1), 20 pages, includes English abstract.

\* cited by examiner

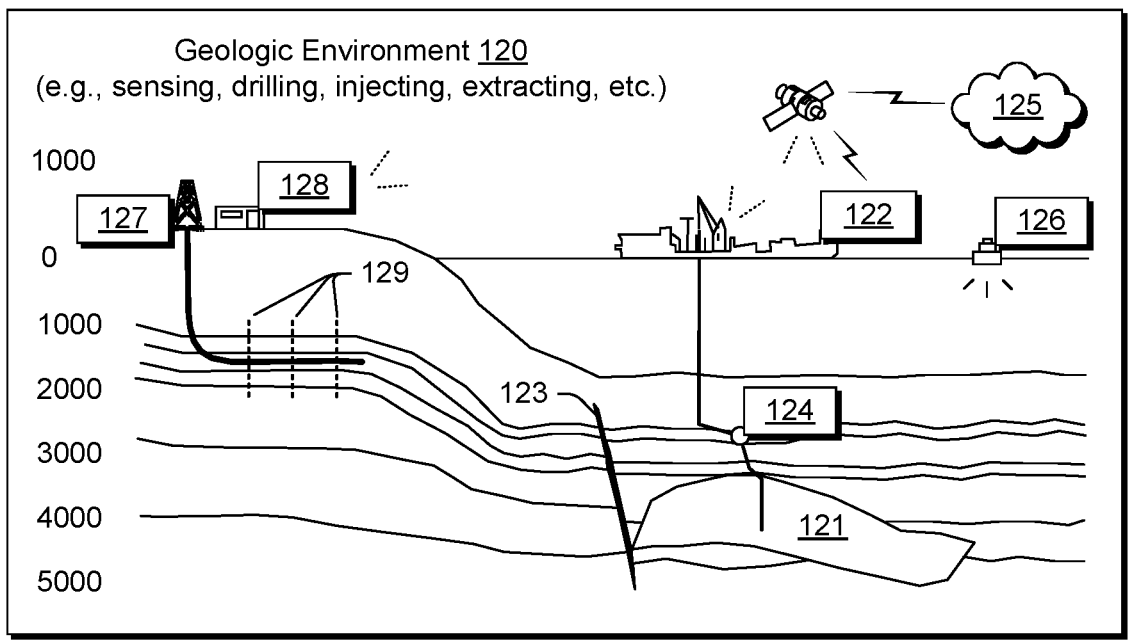
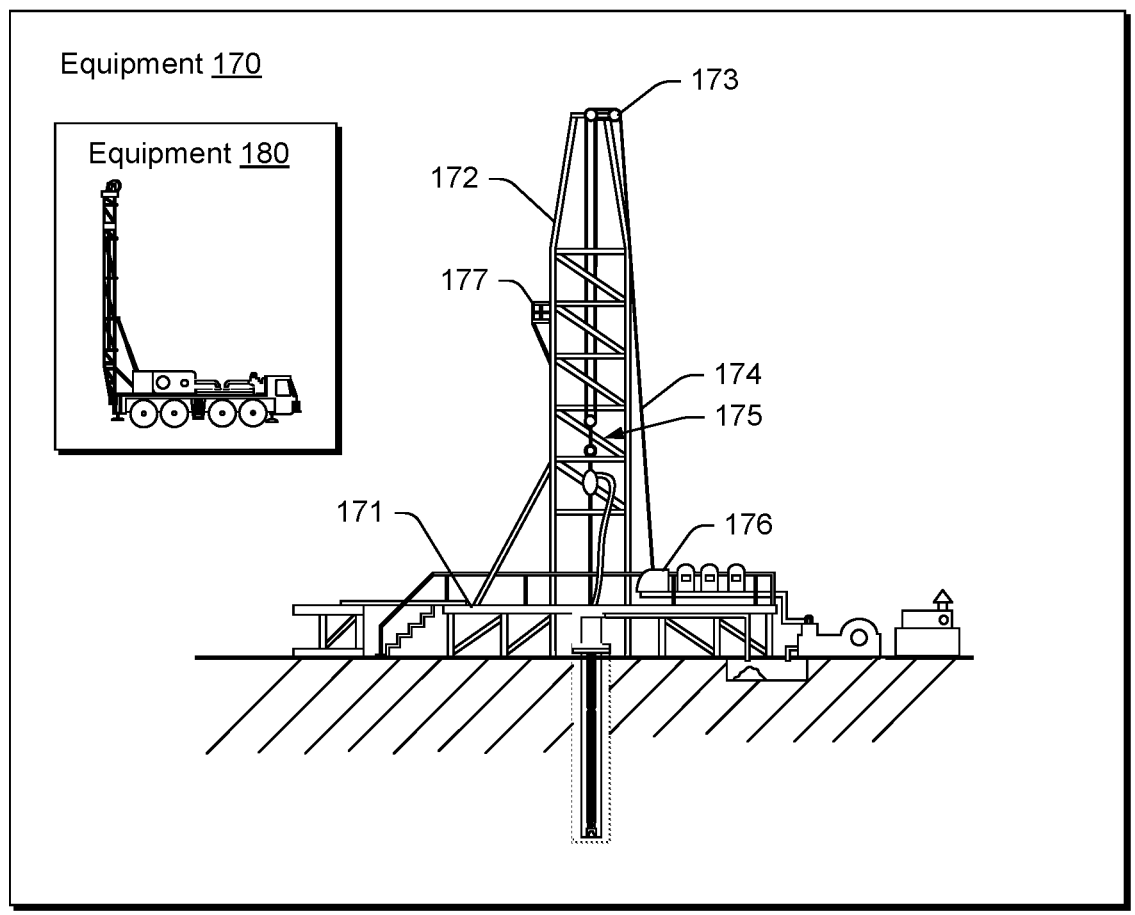
Fig. 1

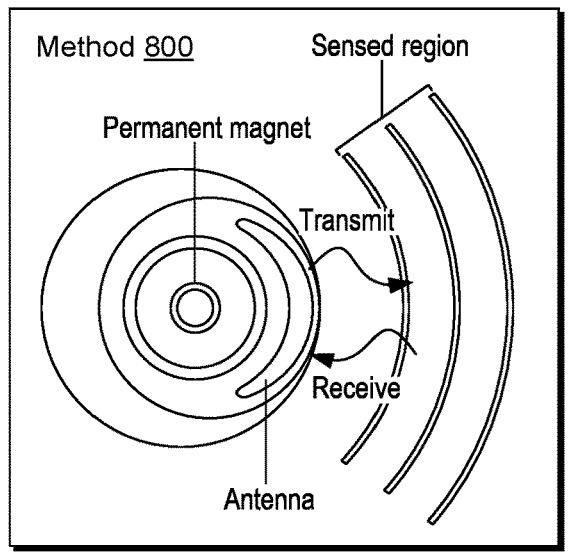
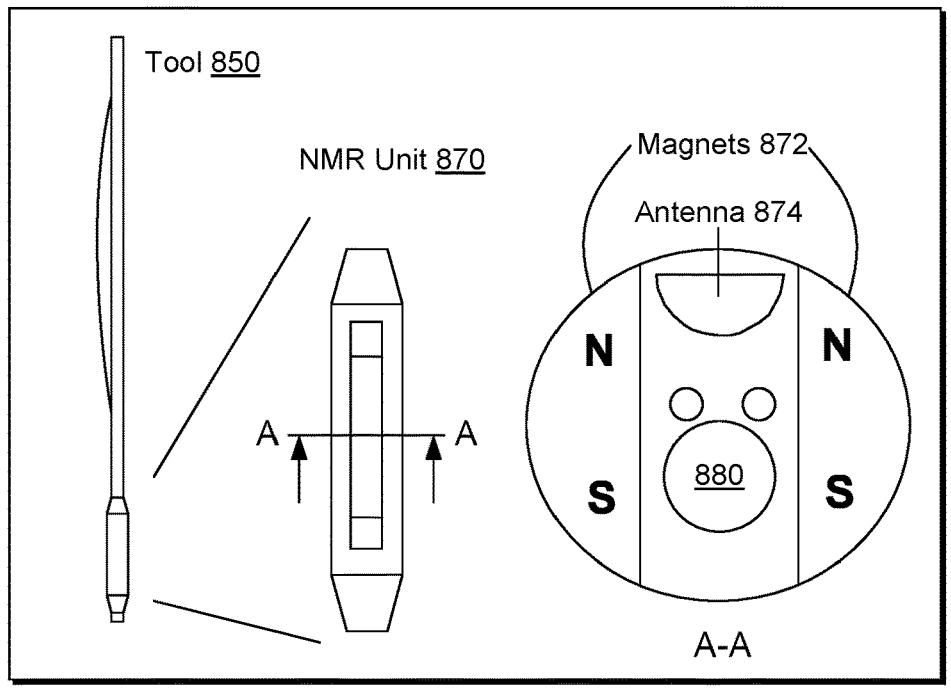
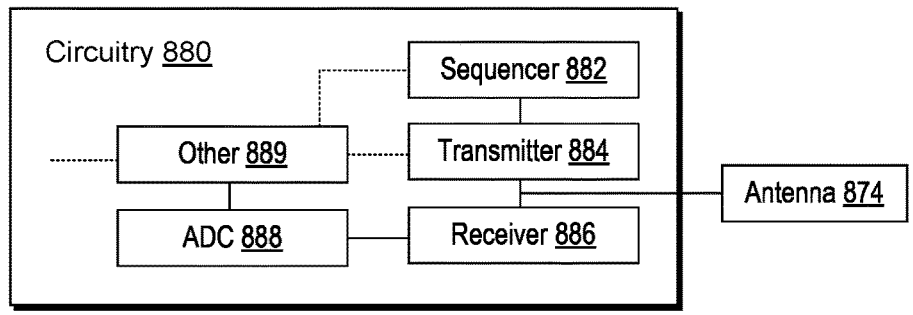
Fig. 8

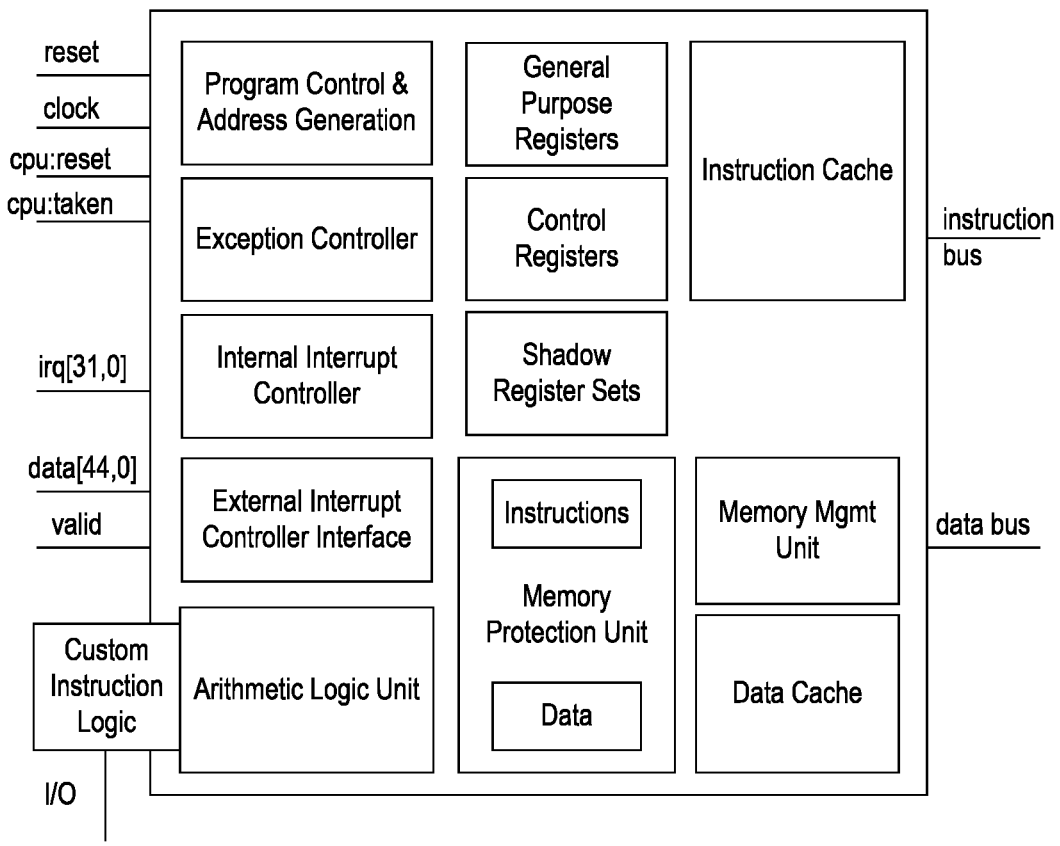
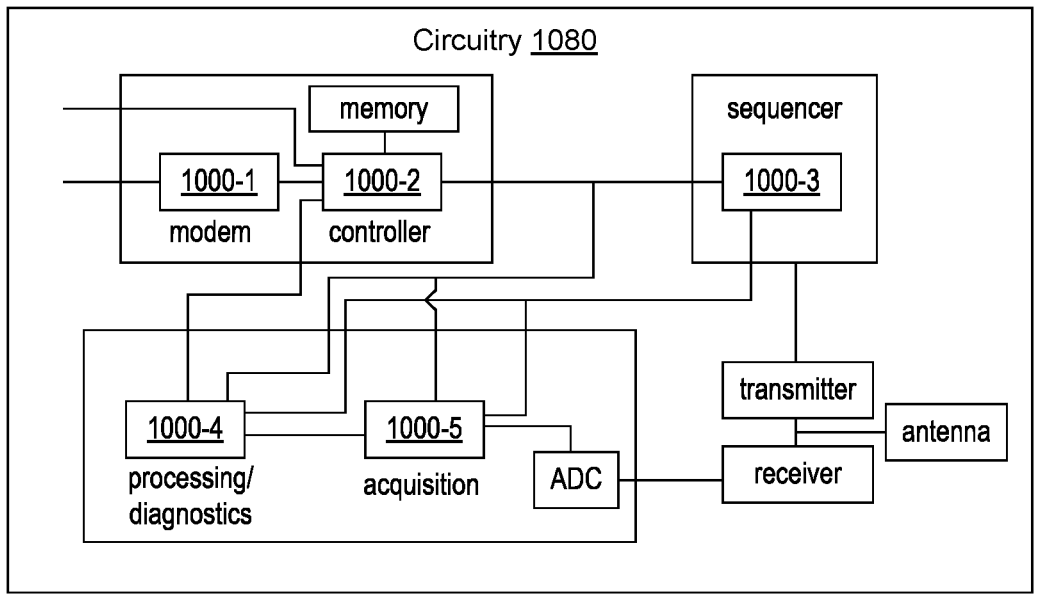
Fig. 10

1410
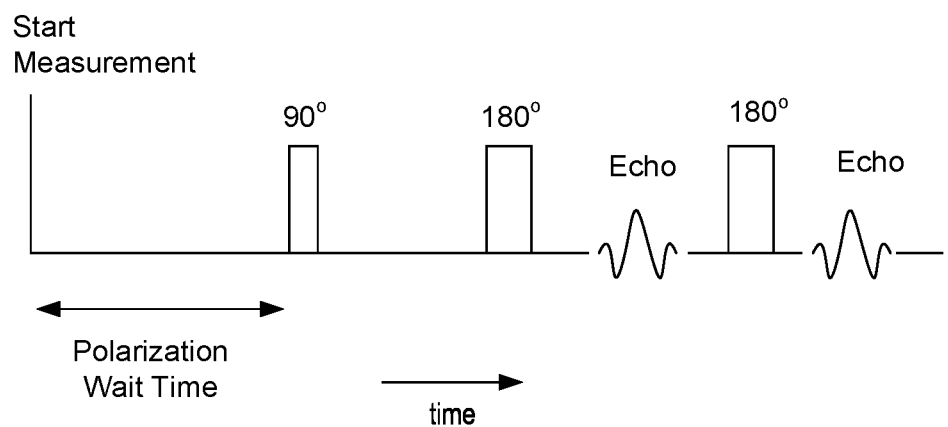
1430
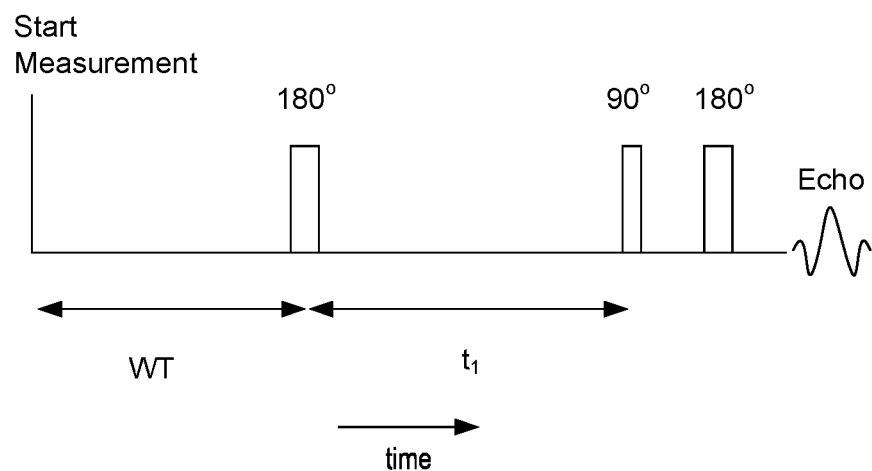
Fig. 14

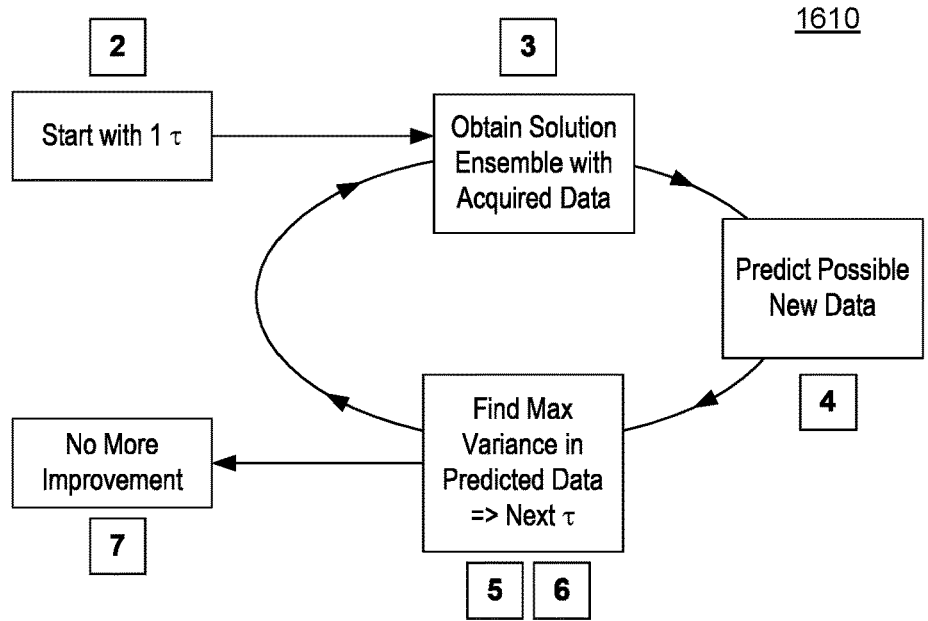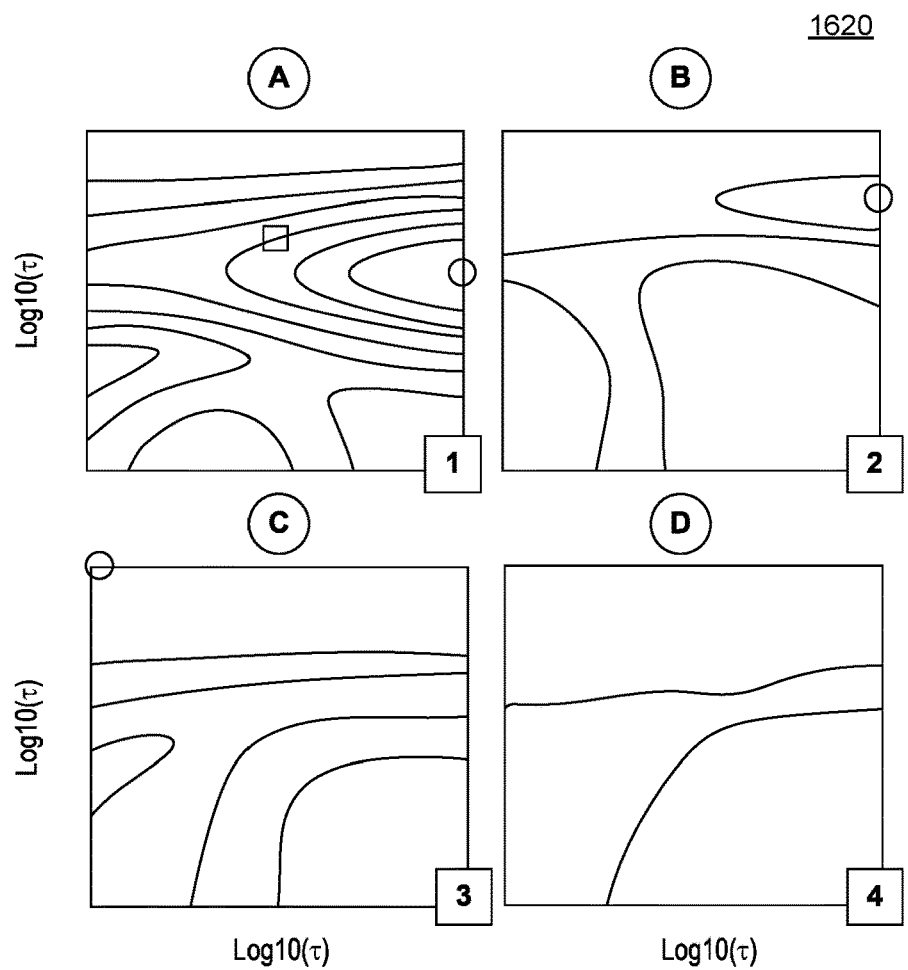
Fig. 16

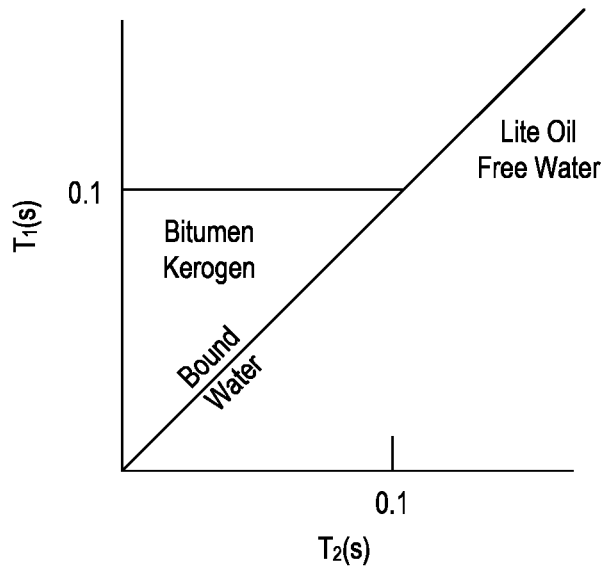
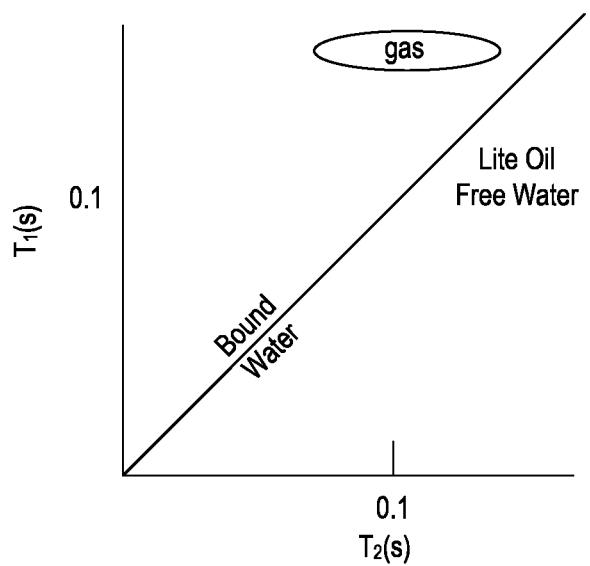
Fig. 21

$T_2 = 0.0035$ s; $A = 1.5$
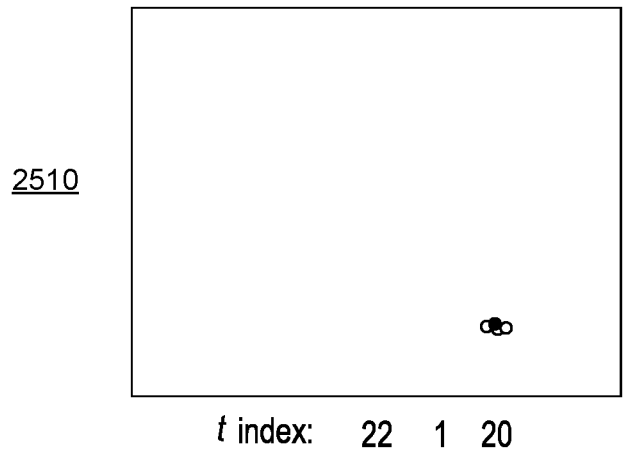
2510
t index:   22   1   20
$T_2 = 0.35$ s; $A = 1.5$
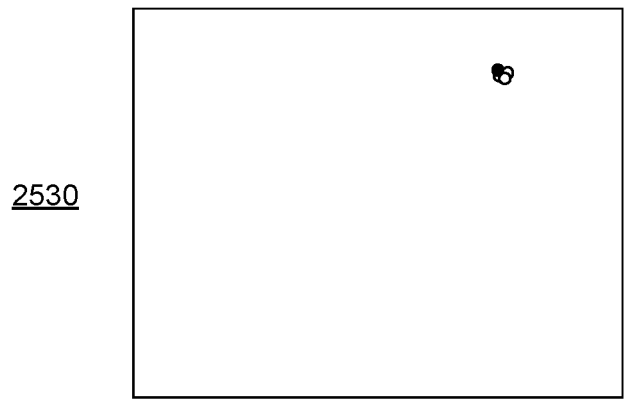
2530
t index:   22   58   72
$T_2 = 0.035$ s; $A = 0.5$
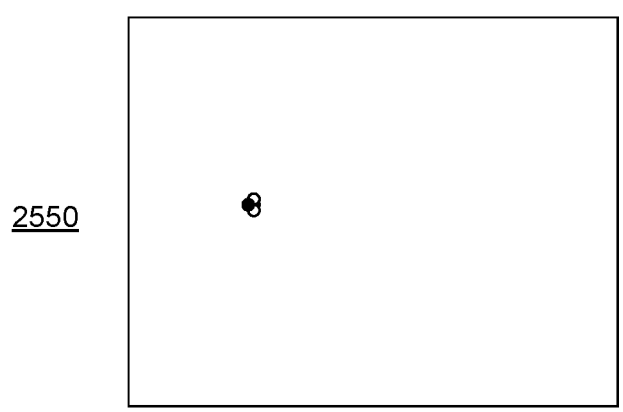
2550
t index:   22   1   42   44
Fig. 25

3610
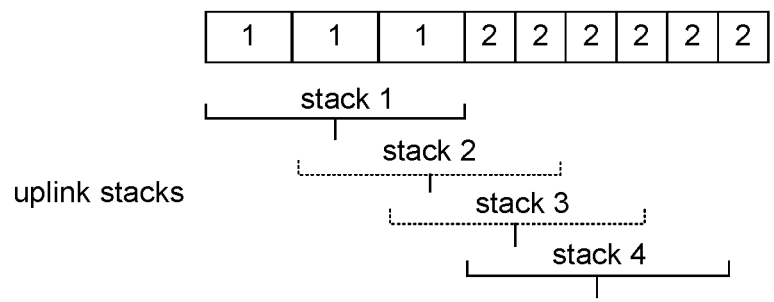
3630
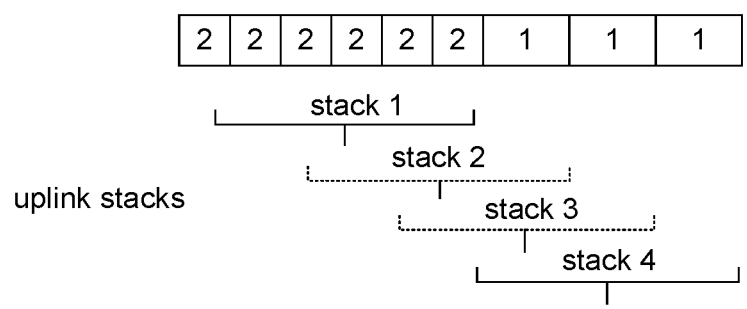
Fig. 36

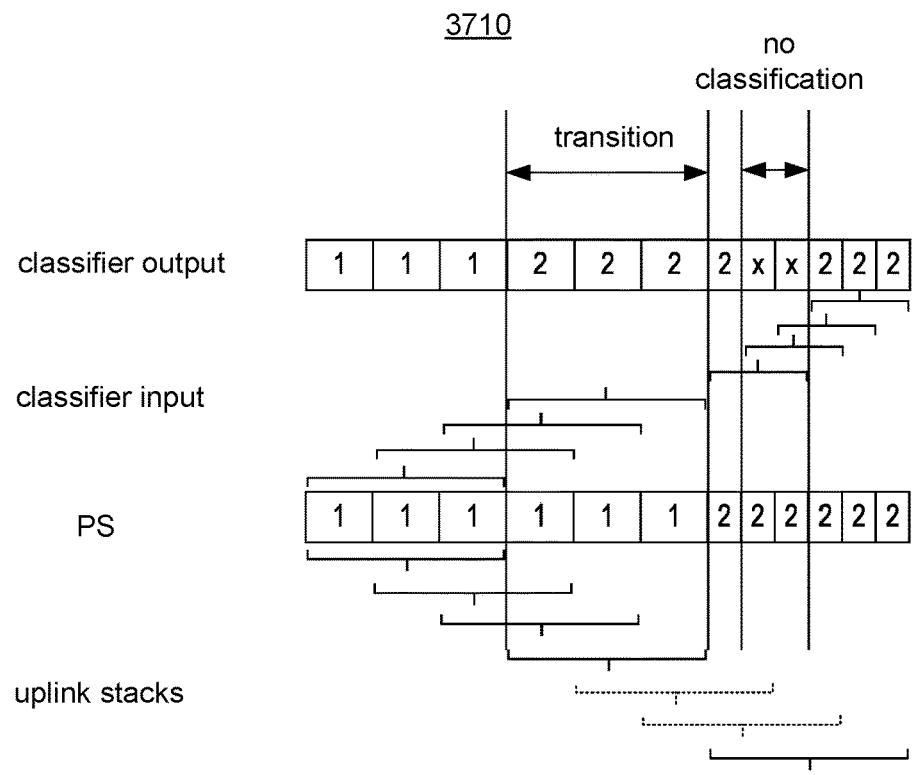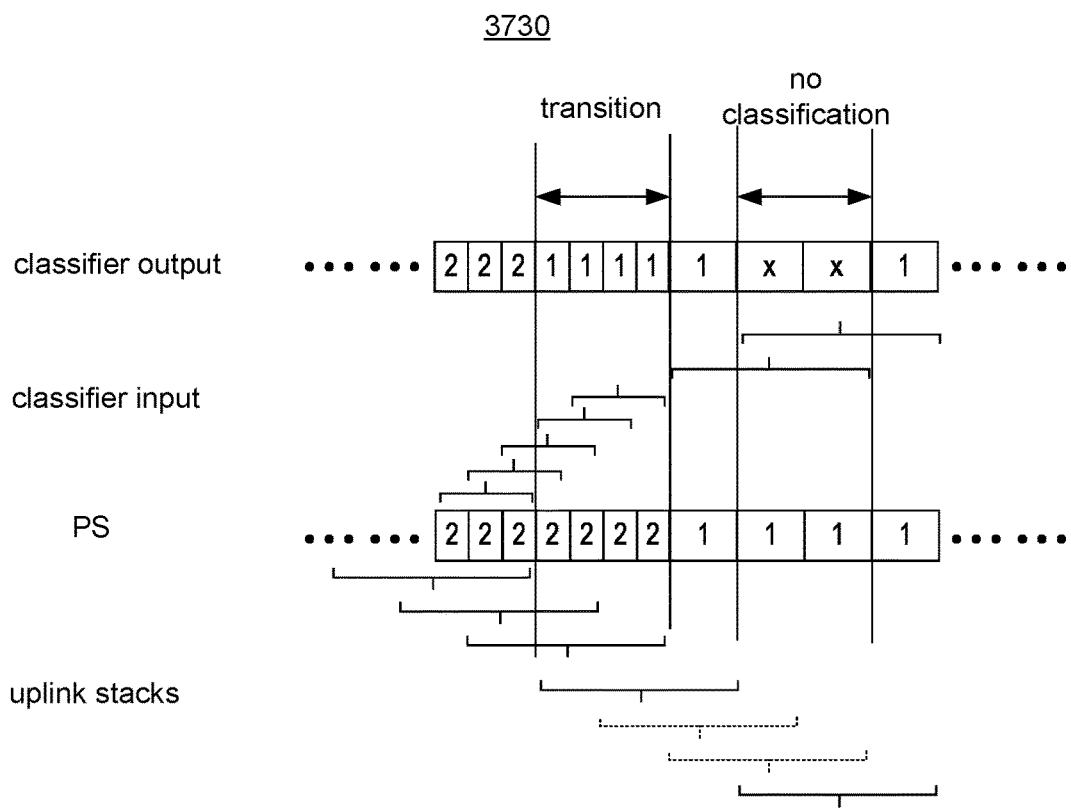
Fig. 37

ADAPTIVE DOWNHOLE ACQUISITION SYSTEM

RELATED APPLICATIONS

This application is a National Stage Entry of International Application No. PCT/US2019/032337, filed 15 May 2019, which claims priority to and the benefit of a U.S. Provisional Application having Ser. No. 62/671,640, filed 15 May 2018, which is incorporated by reference herein.

BACKGROUND

Various types of sensors may be included in one or more types of downhole tools to perform measurements where such measurements can be utilized to determine properties of objects, substances or objects and substances. For example, an object can be a formation that includes one or more substances, which may be present in one or more forms. As an example, as to nuclear magnetic resonance (NMR) measurements, a substance can include protons (e.g., $H^1$), which can be aligned using a static magnetic field and altered using an oscillating magnetic field. Responses of the protons to alteration can be acquired as signals, which can be processed to determine properties such as relaxation properties.

Relaxation pertains to restoration of a state, which may be an equilibrium state, or otherwise going back to a low-energy level after excitation. One relaxation property is spin-lattice (longitudinal) or $T_1$ relaxation, which is a process by which longitudinal magnetization is recovered (e.g., after an excitation pulse is applied) due to transfer of energy from a nuclear spin system to neighboring molecules (e.g., the lattice). The $T_1$ relaxation time (or simply $T_1$) is a measure of the rate of transfer of energy from the nuclear spin system to the neighboring molecules (e.g., the lattice). $T_1$ can be defined as the time when approximately 63 percent of the longitudinal magnetization has recovered. Another relaxation property is spin-spin (transverse) or $T_2$ relaxation, which is a process by which transverse magnetization decays due to dephasing of proton spins (e.g., spins becoming desynchronized). Responsive to application of an excitation pulse, magnetization can be altered by 90 degrees from a longitudinal axis (e.g., z-axis) into a plane (e.g., x, y-plane). The transverse magnetization can be initially at a maximum (e.g., due to coherent nuclear spins); however, coherence gradually diminishes due to field inhomogeneities and/or direct interactions between the spins (e.g., without energy transfer to the lattice). $T_2$ relaxation occurs in the plane and may be depicted as the spreading of magnetic moments along the plane (e.g., some faster and some slower). The $T_2$ relaxation time (or simply $T_2$) is a measure of the rate of the decay of transverse magnetization within the plane. $T_2$ can be defined as the time when approximately 63 percent of the transverse magnetization has decayed.

While NMR measurements are given as an example, one or more other types of measurements may be performed using a downhole tool in a downhole environment (e.g., a downhole tool disposed in a borehole, etc.).

SUMMARY

A method can include accessing a measurement model in memory of a downhole tool; determining an optimal parameter set using a processor of the downhole tool and the measurement model; and performing at least one measurement using at least one sensor of the downhole tool operated according to the optimal parameter set. A system can include a processor; memory accessible to the processor; processor-executable instructions stored in the memory and executable by the processor to instruct the system to: access a measurement model in memory of a downhole tool; determine an optimal parameter set using a processor of the downhole tool and the measurement model; and perform at least one measurement using at least one sensor of the downhole tool operated according to the optimal parameter set. One or more computer-readable storage media can include computer-executable instructions executable to instruct a computing system to: access a measurement model in memory of a downhole tool; determine an optimal parameter set using a processor of the downhole tool and the measurement model; and perform at least one measurement using at least one sensor of the downhole tool operated according to the optimal parameter set. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 8 illustrates an example of a method and an example of a tool;

FIG. 10 illustrates an example of a microprocessor and an example of circuitry;

FIG. 14 illustrates examples of pulse sequences;

FIG. 16 illustrates an example of a method and examples of measurement spaces;

FIG. 21 illustrates examples of measurement spaces for two different types of reservoirs;

FIG. 25 illustrates examples of decision spaces of a measurement model;

FIG. 36 illustrates examples of graphics with respect to data handling;

FIG. 37 illustrates examples of graphics with respect to data handling;

DETAILED DESCRIPTION

Figure 2:
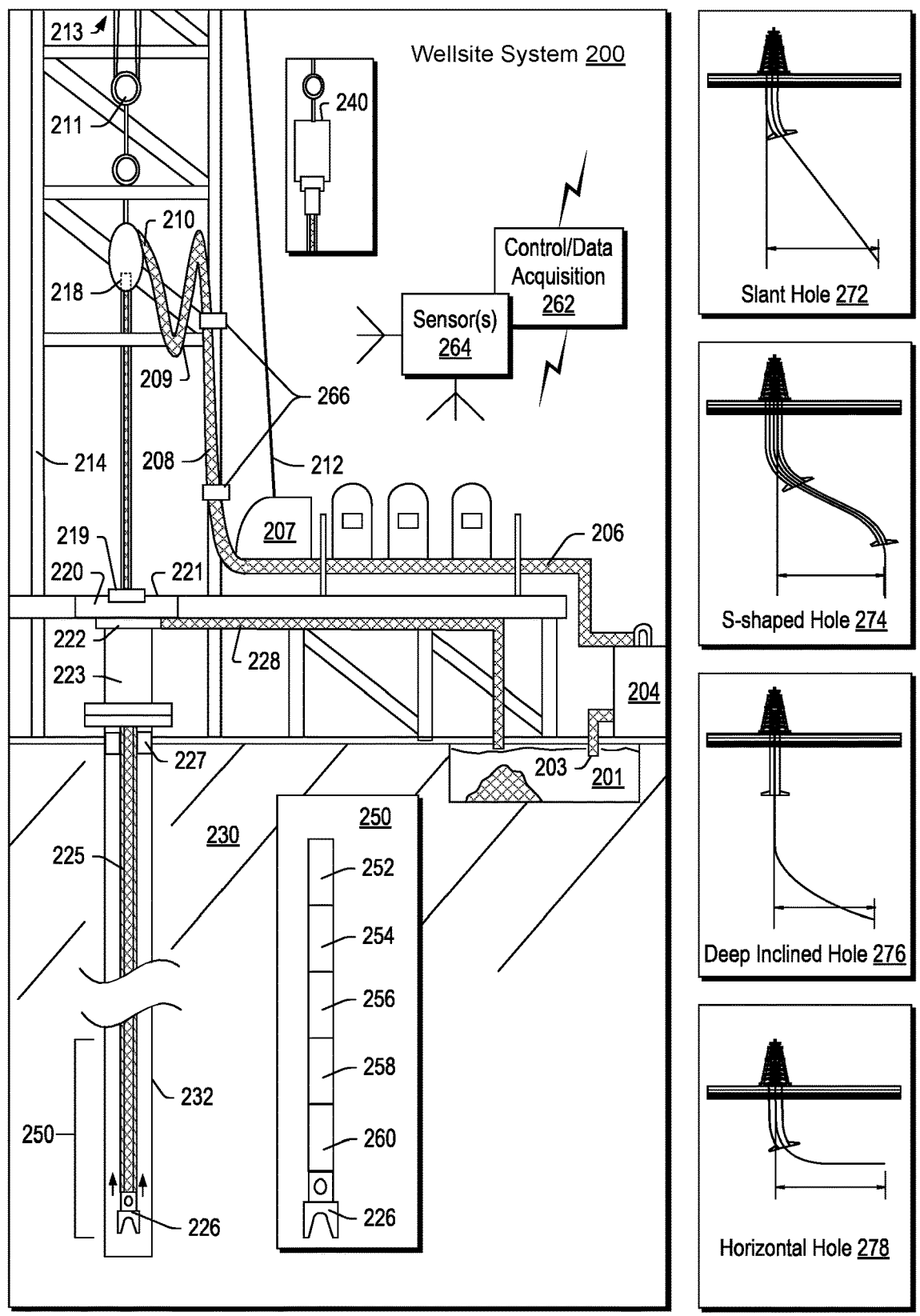
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or a borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. As an example, drilling can include using one or more logging tools that can perform one or more logging operations while drilling or otherwise with a drillstring (e.g., while stationary, while tripping in, tripping out, etc.). As an example, a wireline operation can include using one or more logging tools that can perform one or more logging operations. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, drilling or one or more other operations may occur responsive to measurements. For example, a logging while drilling operation may acquire measurements and adjust drilling based at least in part on such measurements. As an example, a logging operation can include moving a logging tool, stopping a logging tool, or otherwise controlling a logging tool based at least in part on measurements acquired by the logging tool or, for example, another logging tool (e.g., sensor unit, etc.).

As explained, a nuclear magnetic resonance (NMR) can be utilized to determine properties of objects, substances or objects and substances. In various operations, a downhole tool can include one or more NMR units that can acquire NMR measurements. Such measurements may provide for characterization of one or more objects, one or more substances, etc. Such measurements may be acquired using wireline technology, drilling technology (e.g., logging while drilling, etc.), or other downhole technology. As an example, NMR technology can be utilized in a geologic environment to characterize the geologic environment (e.g., formation characterization, fluid characterization, etc.).

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, NMR logging, assessment of one or more fractures, injection, production, etc. As an example, the equipment 127 and/or 128 may provide for measurement, collection, communication, storage, analysis, etc. of data such as, for example, formation data, fluid data, production data (e.g., for one or more produced resources), etc. As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform and the derrick 214 positioned over the borehole 232. As mentioned, the wellsite system 200 can include the rotary table 220 where the drillstring 225 passes through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical, rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor, however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools (e.g., NMR unit or units, etc.). It will also be understood that more than one LWD and/or MWD module can be employed, for example, as represented at by the MWD module 256 of the drillstring assembly 250. Where the position of an LWD module is mentioned, as an example, it may refer to a module at the position of the LWD module 254, the MWD module 256, etc. An LWD module can include capabilities for measuring, processing, and storing information, as well as for communicating with the surface equipment. In the illustrated example, the LWD module 254 may include a seismic measuring device, a NMR measuring device, etc.

The MWD module 256 may be housed in a suitable type of drill collar and can contain one or more devices for measuring characteristics of the drillstring 225 and the drill bit 226. As an example, the MWD tool 256 may include equipment for generating electrical power, for example, to power various components of the drillstring 225. As an example, the MWD tool 256 may include the telemetry equipment 252, for example, where the turbine impeller can generate power by flow of the mud, it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more NMR measuring devices (e.g., NMR units, etc.) may be included in a drillstring (e.g., a BHA, etc.) where, for example, measurements may support one or more of geosteering, geostopping, trajectory optimization, etc. As an example, motion characterization data can be utilized for control of NMR measurements (e.g., acquisition, processing, quality assessment, etc.).

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As an example, a trajectory and/or a drillstring may be characterized in part by a dogleg severity (DLS), which can be a two-dimensional parameter specified in degrees per 30 meters (e.g., or degrees per 100 feet).

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium. As an example, data acquired by a NMR unit may be processed in a manner that can reduce data load, which can facilitate transmission. For example, consider downhole processing of NMR measurements to reduce a total number of bits to be transmitted (e.g., consider downhole data compression, downhole data analysis, etc.).

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
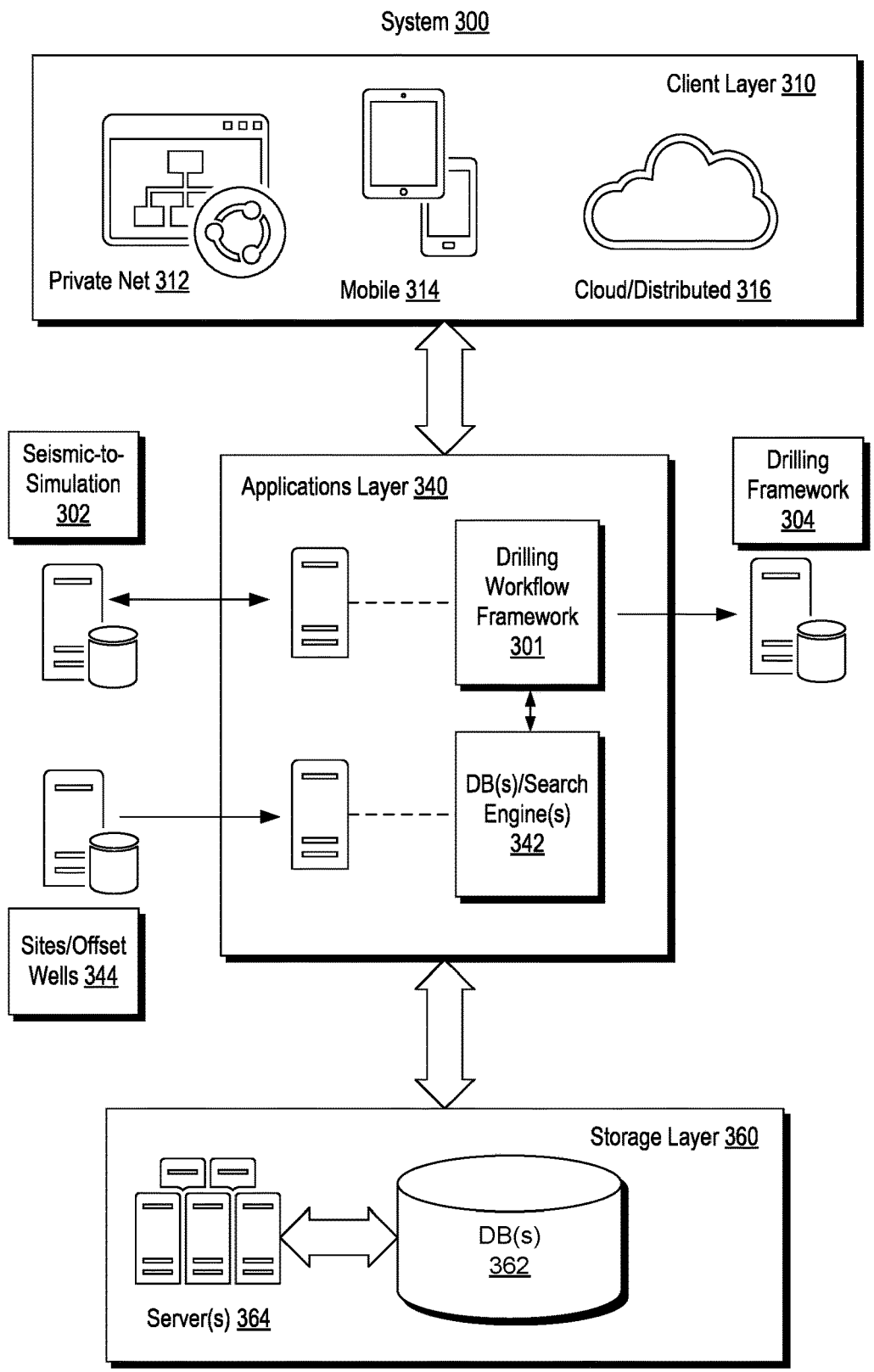
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360. In such an example, a computational framework may be provided for handling of logging measurements and/or data derived from logging measurements. For example, logging information may be provided to the seismic-to-simulation framework 302 and/or to the drilling framework 304. Such information may be utilized for model building (e.g., constructing a multidimensional model of a geologic environment), generating a trajectory for a well (e.g., or an extension thereof), generating a stimulation plan (e.g., fracturing, chemical treatment, etc.), controlling one or more drilling operations, etc.

In the example of FIG. 3, the client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engine features (e.g., sets of executable instructions to perform various actions, etc.).

As an example, the database management component 342 can include one or more search engine features that provide for searching one or more information that may be stored in one or more data repositories. As an example, the STUDIO E&P knowledge environment (Schlumberger Ltd., Houston, Tex.) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more components may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites 344. As an example, the applications layer 340 may be implemented for a particular wellsite where information can be processed as part of a workflow for operations such as, for example, operations performed, being performed and/or to be performed at the particular wellsite 344. As an example, an operation may involve directional drilling, for example, via geosteering. As an example, an operation may involve logging via one or more downhole tools.

In the example of FIG. 3, the storage layer 360 can include various types of data, information, etc., which may be stored in one or more databases 362. As an example, one or more servers 364 may provide for management, access, etc., to data, information, etc., stored in the one or more databases 362. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 340 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework (e.g., a logging data framework, etc.) and the drilling framework 304 before, during and/or after performance of one or more drilling operations. In such an example, the one or more drilling operations may be performed in a geologic environment (see, e.g., the environment 120 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, Wash.). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, Calif.).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
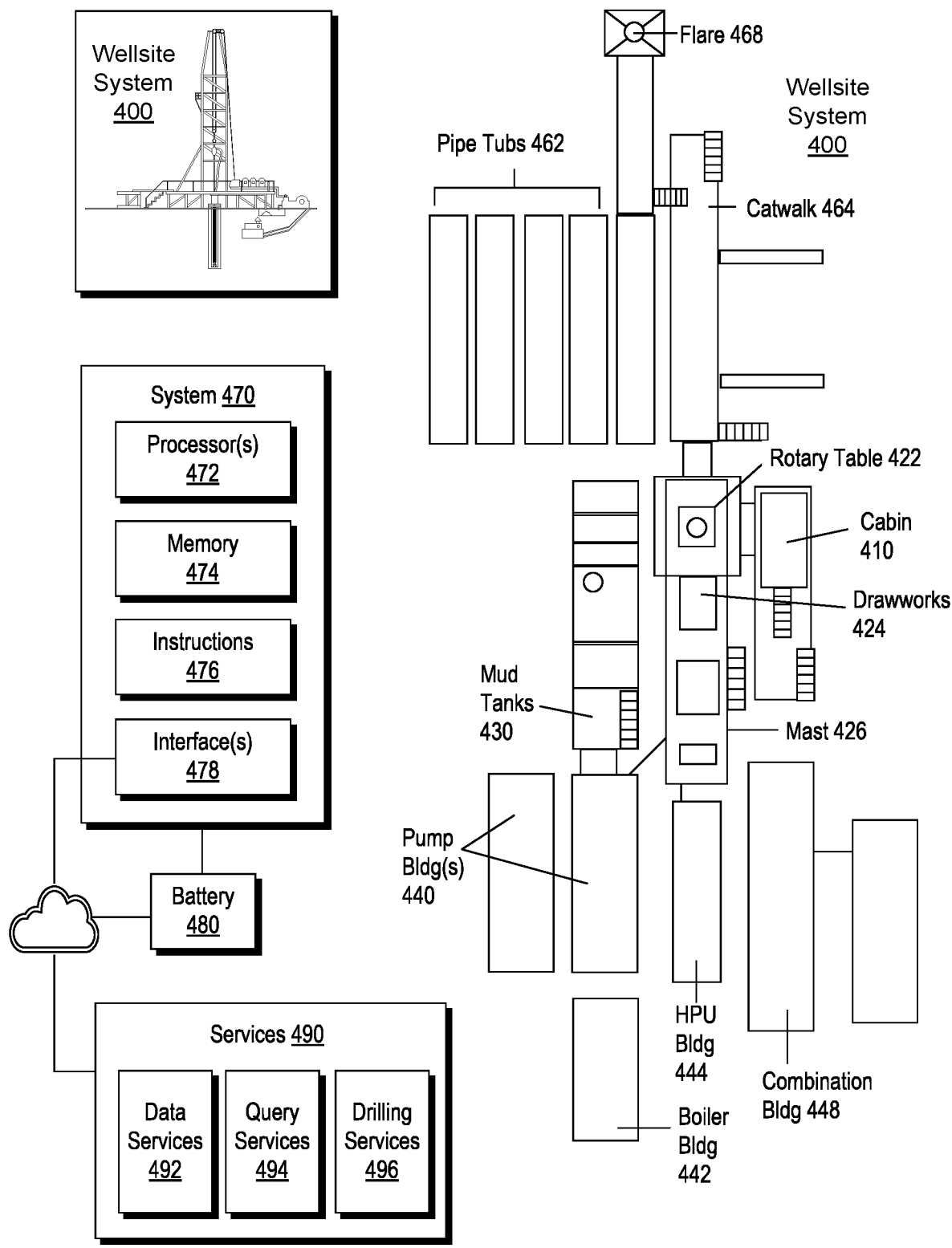
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, a hydraulic pumping units (HPU) building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

A wellsite can include a prime mover as a source of power. As an example, a prime mover can include one to four or more diesel engines, which may produce several thousand horsepower. Such engines can be operatively coupled to one or more electric generators. Electrical power may be distributed by a silicon-controlled-rectifier (SCR) system. Rigs that convert diesel power to electricity may be referred to as electric rigs or diesel electric rigs. As an example, a rig can be configured for transmission of power from one or more diesel engines to one or more rig components (e.g., drawworks, pumps, rotary table, etc.) through mechanical belts, chains, clutches, etc. Such a configuration may be referred to a mechanical rig or a so-called "power rig".

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a system management bus (SMBus) or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity, or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Tex.). Such a framework may operatively couple various other frameworks to provide for a multi-framework workspace.

As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
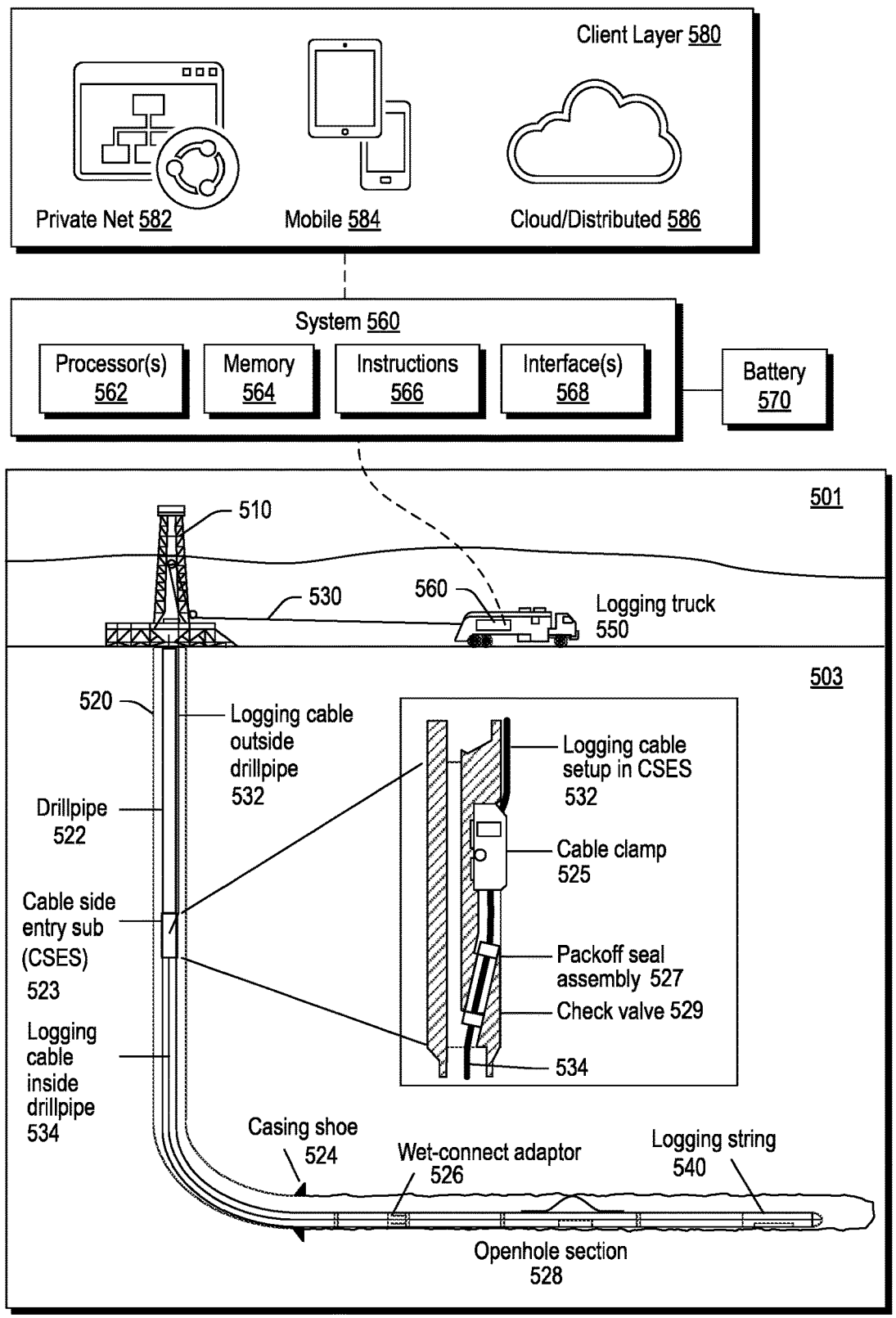
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, the logging string 540 can include one or more NMR units, which may be part of one or more tools that are movable via movement of the logging string 540.

As an example, a combinable magnetic resonance (CMR) tool can be utilized for NMR logging. As an example, NMR measurements can be utilized for determining one or more of reservoir permeability, water cut, and hydrocarbon pore volume. As an example, NMR measurements may be utilized to evaluate porosity and permeability independent of mineralogy. As an example, NMR measurements may be suitable for characterizing thinly laminated reservoirs; low-contrast, low-resistivity pay zones; and carbonates.

As an example, a tool can include circuitry for implementing an enhanced-precision mode (EPM) pulse acquisition scheme to refine precision of NMR data associated with the smallest pores and heavy crude oils. As an example, processing of EPM acquisition data can provide total porosity along with partitioning into micro-, meso-, and macroporosity and estimates of the bound and free fluid. As an example, in complex lithologies, such information can facilitate determining the irreducibile water saturation and potential for water production.

As an example, a tool can include magnets such as permanent magnets that may extend above and/or below an antenna, which may be utilized for delivery of an oscillating magnetic field and/or receipt of responses from nuclei to a delivered oscillating magnetic field. As an example, consider a tool that includes magnets arranged above and below (e.g., approximately 12 cm above and approximately 12 cm below) an antenna (e.g., approximately 2.5 cm). Such an arrangement of components can be utilized to create a longer pre-polarizing field that can provide for increased logging speed (e.g., consider logging speeds to 1,200 meters per hour or more in a fast-relaxation environment).

As an example, an acquisition scheme can be implemented that provides for increased logging speed, increased vertical resolution and/or an arrangement of components (e.g., magnet(s) and antenna(s)) that may be beneficial to one or more logging operations. As an example, where total acquisition time of an acquisition scheme can be reduced, the length of a NMR unit may be reduced, which may reduce mass and demands of movement of a logging string (e.g., consider lesser energy for rotation of a reel, etc.).

Figure 6:
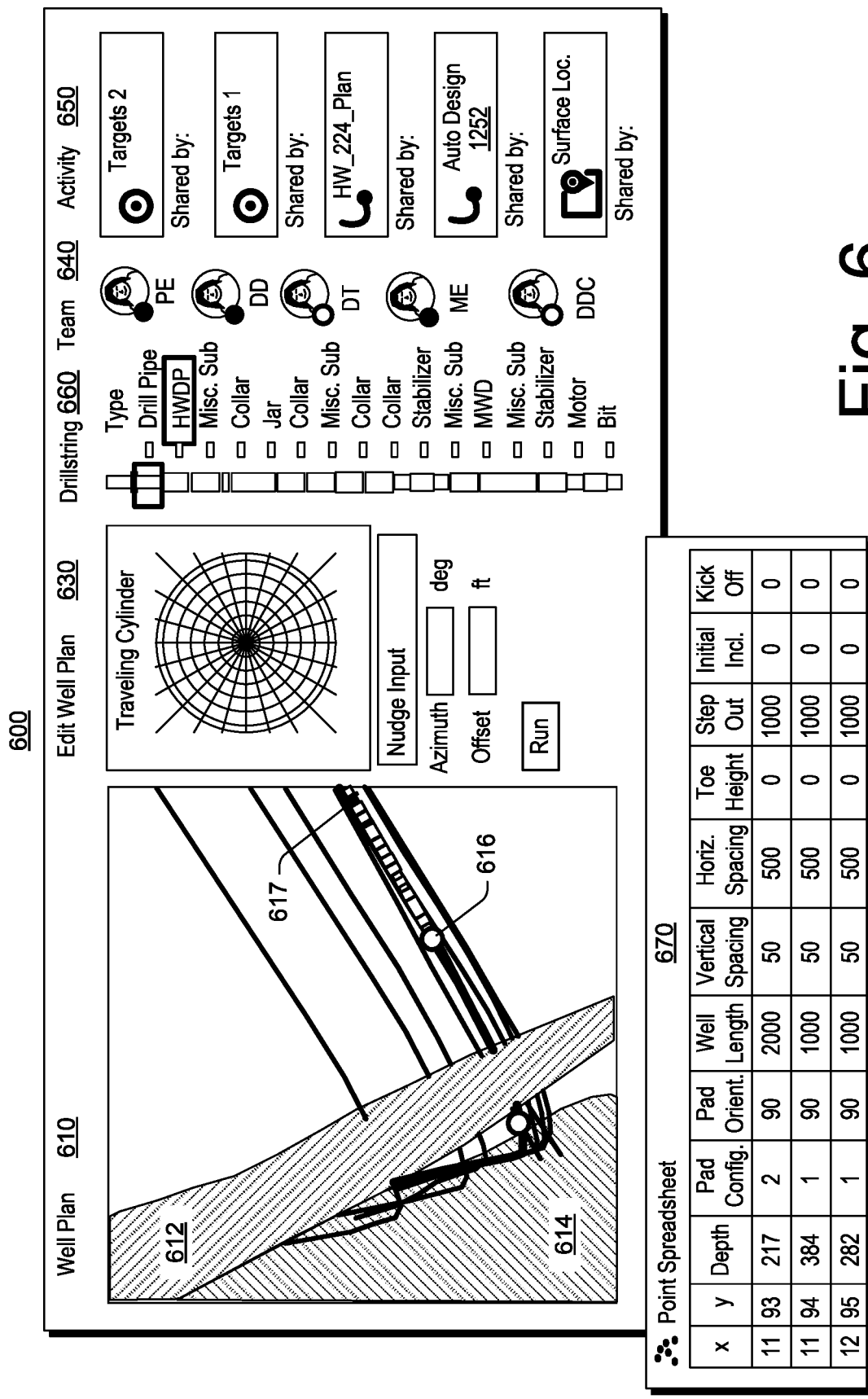
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650. As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). FIG. 6 also shows a table 670 as a point spreadsheet that specifies information for a plurality of wells. For example, the point spreadsheet can include coordinates, dimensions, etc., that specify a trajectory of a well, spacing of wells, etc.

As an example, the drillstring 617 can include one or more NMR units, which can be part of a tool or tools (e.g., a LWD assembly, a measurement sub, etc.). In such an example, information derived from NMR measurements may be utilized in control of an operation, planning of an operation, etc.

As an example, a tool can include one or more nuclear magnetic resonant (NMR) units. As an example, a tool can be a combinable nuclear magnetic resonance tool, which may be referred to as a CMR tool.

NMR involves a phenomenon by which a nucleus absorbs electromagnetic radiation of a specific frequency in the presence of a strong magnetic field. A NMR technique can include exposing nuclei to a strong static magnetic field and perturbing them by a weak oscillating magnetic field to produce an electromagnetic signal with a frequency characteristic of the magnetic field at the nucleus. The process occurs near resonance, when the oscillation frequency matches the intrinsic frequency of the nuclei, which depends on the strength of the static magnetic field, the chemical environment, and the magnetic properties of the isotope involved.

As an example, a static magnetic field can be specified in units of tesla. A laboratory NMR unit may include a superconducting magnet that can produce a static magnetic field of the order of 20 tesla (20 T) or more. In logging operations, a logging tool may include a magnet or magnets that can be permanent rather than superconducting or may be non-superconducting electromagnets rather than superconducting where a field of the order of one tesla or less may be generated. As an example, a logging operation may utilize the Earth's magnetic field, which may be assumed to be static along a borehole and of the order of tens of microtesla (e.g., 20 microtesla or 0.2 gauss to 80 microtesla or 0.8 gauss). As mentioned, the frequency at which a nucleus "absorbs" energy depends on the strength of the static magnetic field and is referred to as the Larmor frequency or precessional frequency.

The precessional frequency of nuclei of a substance exposed to a static magnetic field $B_0$ can be determined using the Larmor Equation:

$$\omega = \gamma B$$

where $\omega$ is the Larmor frequency in MHz, $\gamma$ is the gyromagnetic ratio in MHz/tesla and B is the strength of the static magnetic field in tesla. As to $H^1$, consider a precessional frequency of 42.58 MHz for a static field of one tesla (T). In such an example, if the static field is 0.1 T, then the precessional frequency is 4.258 MHz; whereas, for a static field of 10 T, the precessional frequency would be 425.8 MHz.

A NMR unit can investigate a sample (e.g., a rock volume) that is outside the unit while moving the unit along a borehole. Such a NMR unit can include components to generate a static magnetic field and an oscillating magnetic field. In such an arrangement, the fields can be of respective strengths sufficient to penetrate at least approximately 1 cm or more into formation surrounding a borehole. The diameter of a borehole can limit the size of permanent magnets that can be used and, correspondingly, strength of a magnetic field that can be generated by a downhole tool.

As an example, a NMR unit may operate at or below several megahertz and generate a relatively weak (<1 T) and somewhat inhomogeneous magnetic field (e.g., gradients up to 20 gauss/cm). Where the Earth's magnetic field is utilized, an operating frequency may be of the order of approximately several kilohertz; noting that homogeneity may be greater than that of a NMR unit with its own magnet or magnets. Such constraints generally make downhole NMR units more suitable for relaxation investigations; rather than chemical spectroscopy. Downhole NMR units can be operated using various techniques to account for noise, for example, acquiring a sufficient number of echoes and/or stack data to improve signal to noise ratio (S/N).

As an example, a NMR unit can utilize one or more permanent magnets rather than electromagnets to reduce surface-power requirement; can focus a sensitive region of the magnetic field at some distance into the formation, which can help to address mud (e.g., drilling fluid invasion); can use an RF pulse from a coil tuned to the Larmor frequency to help ensure that those nuclei in the sensitive region are in resonance; can control pulse duration, which may help to reduce dead times to allow for a better estimate of initial decay amplitude (e.g., as to porosity) measurement for short $T_2$ components (e.g., bound-fluid evaluation); and can provide for one or more types of pulse sequences, which may be for one or more purposes (e.g., measurement of additional rock, fluid properties, etc.).

As an example, a NMR unit can include features for handling gradients in a static magnetic field, which may causes molecular diffusion. For example, strength of a magnetic field gradient, G, may be controlled by tool design and configuration (e.g., tool size and tool frequency); by environmental conditions such as formation temperature; and by internal gradients induced by an applied field, $B_0$. As an example, characterization of gradients may enable in-gradient diffusion to be used for hydrocarbon typing.

As an example, a NMR unit may be part of a tool that aims to centralize or eccentralize the NMR unit (e.g., with respect to fields and formation). As an example, a tool can include one or more features that can act to position a NMR unit or a portion thereof with respect to a formation (e.g., wall of a borehole). For example, consider a mandrel type of tool or a pad type of tool.

The type of features can be a factor as to length of a NMR unit, which can affect so-called "vertical resolution". Vertical resolution refers to resolution of the NMR unit along a longitudinal axis of a tool, which is generally parallel to the longitudinal axis of a borehole. For deviated wells, including horizontal wells, the so-called "vertical resolution" is not a resolution that is aligned with the acceleration of gravity; rather, it can be at an angle thereto. As utilized herein, "vertical resolution" refers to resolution along a dimension that is substantially parallel to the longitudinal axis of a borehole in which a NMR unit is positioned.

As an example, a contact NMR unit, which may be a CMR type of NMR unit that is utilized in an eccentric manner, can include magnets and electronics that may provide higher vertical resolution that a centralized, non-contact NMR unit; however, possibly with a shallower depth of investigation (DOI) and greater sensitivity to borehole rugosity. As an example, a NMR unit can include, additional to standard permanent magnets, "pre-polarization" magnets, which may be added to help ensure fuller polarization at a desired logging speed.

As an example, a NMR unit or units may operate at several different RF frequencies, optionally simultaneously, to measure multiple sample volumes. In the presence of a gradient magnetic field, pulses with different frequencies can cause protons in different (and parallel) regions of space (e.g., measurement or sensitive volumes) to resonate. Cycling through several frequencies excites protons in different cylindrical volumes, allowing measurements to be made more quickly. If the frequencies of multi-frequency measurements are relatively close together, then the sensitive volumes tend to be relatively close together; and, for practical purposes, the rocks sampled can be considered to be the same (e.g., akin to slice selection in medical MRI imaging).

As an example, a NMR unit may include features to acquire multiple echo trains using different values of wait time (TW), echo time, and variable magnetic gradients (G) in a single logging pass. The time between measurements made at multiple frequencies can be as little as the time of an echo train, and the time between measurements made at a single frequency can be approximately the time to repolarize (e.g., a TW). In a multi-frequency arrangement, thickness of sensitive volumes may be as small as approximately 1 mm.

As an example, a NMR unit can provide for $T_1$ acquisition, $T_2$ acquisition or $T_1$ and $T_2$ acquisition. As mentioned, multi-frequency operation may provide for measurements at multiple DOIs (e.g., approximately 1 cm to approximately 10 cm), which may allow for invasion effects to be accounted for in data interpretation to provide for determination of near-wellbore fluid saturation and oil properties at higher resolution.

A NMR technique can include various sequential actions such as, for example, alignment (polarization) of magnetic nuclear spins in a static magnetic field $B_0$; perturbation of the alignment of the nuclear spins by a weak oscillating magnetic field (e.g., via an RF pulse); and detection of the NMR signal during or after the RF pulse, due to the voltage induced in a detection coil by precession of the nuclear spins around $B_0$. After an RF pulse, precession tends to occur at a nuclei's intrinsic Larmor frequency and, in itself, does not involve transitions between spin states or energy levels. In acquiring NMR measurements, the static and oscillating magnetic fields can be chosen to be perpendicular to each other, which can help to maximize NMR signal strength. For example, $B_1$ can be described in a classical sense as being perpendicular to $B_0$.

As an example, a NMR unit can be part of a tool such as the CMR tool (Schlumberger Limited, Houston, Tex.). The CMR tool can utilize a particular technique referred to as a phase alternating pairs (PAPs) technique to achieve one or more dynamic vertical resolutions, for example, in a high-resolution mode, a standard resolution mode or a fast mode. For example, consider the following vertical resolutions that include static and dynamic: static with 6-in (e.g., 15.24 cm) measurement aperture; dynamic (high-resolution mode) with 9-in (e.g., 22.86 cm), three-level averaging; dynamic (standard mode) with 18-in (e.g., 45.72-cm) vertical resolution, three-level averaging; and dynamic (fast mode) with 30-in (e.g., 76.20-cm) vertical resolution, three-level averaging.

An example of the PAPs technique is described in U.S. Pat. No. 5,023,551 to Kleinberg et al., issued Jun. 11, 1991, which is incorporated by reference herein. The PAPs technique can be utilized for measuring an indication of an attribute of a volume of a formation with a borehole tool that produces a static magnetic field in the volume of the formation, that produces an oscillating magnetic field in the volume of the formation and that measures an induced magnetic signal where the PAPs technique can include (i) producing a static magnetic field in the volume of the formation; (ii) producing oscillating magnetic fields according to a pulse sequence $[W_i\text{-}180\text{-}\tau_i\text{-}90\text{-}(t_{cp}\text{-}180\text{-}t_{cp}\text{-}\text{echo})_j]_i$ where j=1, 2, . . . J, and J is the number of echoes collected in a single Carr-Purcell-Meiboom-Gill (CPMG) sequence, where i=1, . . . I, and I is the number of waiting times used in the pulse sequence, where $W_i$ are waiting times before a CPMG sequence, where $\tau_i$ are recovery times are recovery times before a CPMG sequence, and $t_{cp}$ is the Carr-Purcell (cp) spacing to induce signals in the volume of the formation (e.g., as to be measured).

Figure 7:
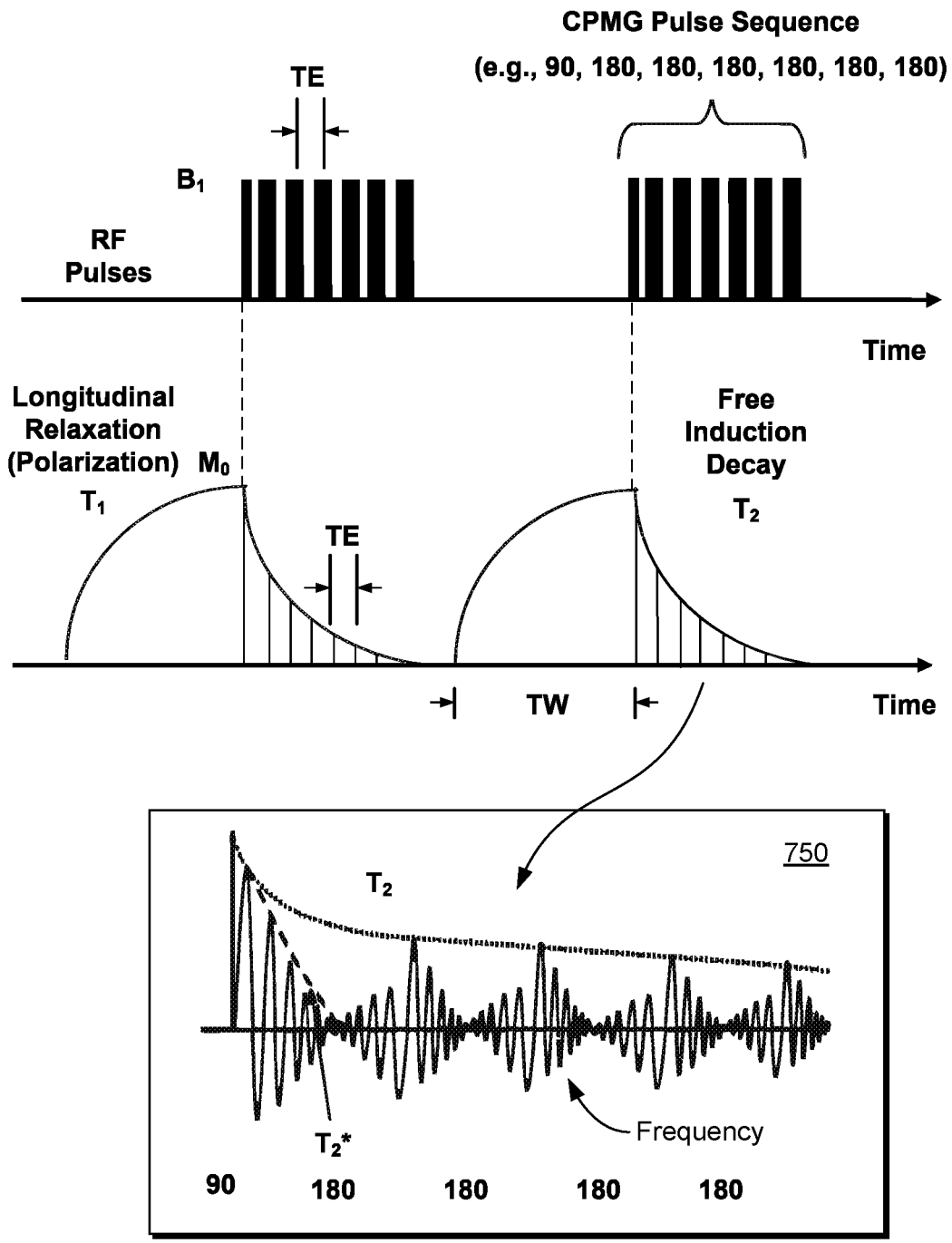
FIG. 7 illustrates an example of a method.

FIG. 7 shows an example of a method 700 that includes emitting RF pulses for an oscillating field $B_1$ to affect nuclei exposed to a static magnetic field $B_0$. In the method 700, two CPMG pulse sequences are illustrated, which include a 90 degree pulse and a train of 180 degree pulses.

The CPMG pulse sequence or simply "CPMG sequence" uses a train of $\pi$ pulses ($\pi$=180 degrees) to refocus inhomogeneous broadening of nuclear spins, which can help to enhance S/N, measure diffusion, measure $T_2$ processes (free induction decay), and reduce experimental time.

Like the Hahn echo, a $\pi$ pulse is placed after a $\pi/2$ pulse (90 degrees) in the NMR experiment, which refocuses the spins leading to echo formation. For CPMG echo train acquisition, n $\pi$ pulses are applied each 2ntr (if the sample is spinning), resulting in n echoes. The number of echoes which can be acquired is directly related to $T_2$ processes. Neglecting pulse imperfections, the echo tops as shown in a plot 750 of FIG. 7 will diminish in intensity due to coherence losses between spins, which is homogenous $T_2$, as the $\pi$ pulses refocus the inhomogeneous $T_2$ due to the varying magnetic field experienced by the sample.

As shown in FIG. 7, a maximum amplitude is indicated as $M_0$, which is a result of a wait time (TW) for longitudinal relaxation (polarization). In the CPMG sequences shown, the first pulse is 90 degrees, which can be thought of as tipping or rotating aligned nuclei into a plane. Once in the plane, some nuclei will lag and some nuclei will advance. Each of the 180 degree pulses acts to "flip" the lagging nuclei and advancing nuclei, which, in time, will cause a re-focusing of the nuclei, as indicated by the successive, yet decaying, amplitude peaks in the plot 750. Where pulse energy and frequency are constant, a 180 degree pulse can be approximately double the duration of a 90 degree pulse, which is approximated by the thickness of the individual pulses in the method 700 of FIG. 7. The echo time is shown to be the time between 180 degree pulses or, for example, the time between amplitude peaks.

FIG. 8 shows an example of a method 800 with respect to a NMR unit and a sensed region where the method 800 includes exposing the sensed region to a static magnetic field of the permanent magnet (or magnets), utilizing an antenna (e.g., or other transmitter) to generate an oscillating field that penetrates the sensed region, and utilizing the antenna (e.g., as a receiver) to receive energy released by nuclei in the sensed region. As shown, one or more components can be eccentric such that the NMR unit can have an orientation with respect to the sensed region, which can be a portion of a wall of a borehole.

FIG. 8 also shows an example of a tool 850, which can include one or more features such as a stabilizer, a pad, a turbine, etc. The tool 850 includes an NMR unit 870, for which an approximate cross-sectional view along a line A-A is shown. In the cross-sectional view, the NMR unit 870 is shown to include magnets 872, an antenna 874 and circuitry 880, which can include RF emission circuitry, antenna circuitry and analog-to-digital conversion circuitry (e.g., an analog-to-digital converter (ADC)). As an example, the NMR unit 870 can include one or more passages for one or more conduits. For example, consider a power conduit, a data transmission conduit, a power and data conduit, etc. As an example, the tool 850 can include a power source or be operatively coupled to a power source, which may be a fluid driven turbine (e.g., turbogenerator, etc.), a surface power source (see, e.g., the logging truck 550, the battery 570, etc.). As an example, a power source may be a power grid, a generator (e.g., gas, wind, fuel, etc.), a solar panel, a battery, etc.

As to the circuitry 880, it can include one or more processors and memory accessible to at least one of the one or more processors. For example, the circuitry 880 can include a processor that executes instructions that control energy emissions to generate an oscillating magnetic field, as may be according to a programmed pulse sequence. As an example, the circuitry 880 can include one or more switches, which may be operatively coupled to sources of energy, which can include a source to generate pulsed emissions and/or a source that is an antenna or antennas that receive signals from nuclei in a formation. For example, a switch may act to control an antenna to use the antenna for transmission of energy and then to use the antenna for reception of energy. Received energy can be directed to an analog-to-digital converter that can convert analog signals to digital data according to a selected sampling rate and/or bit depth. As an example, the digital data can be stored to memory and optionally processed by the processor (e.g., downhole) and/or transmitted to another processor, storage device, etc., which may be uphole or part of the downhole tool or another downhole tool. As an example, a processor or processors can be configured using executable instructions to perform one or more operations on data such as, for example, inversion to derive one or more values (e.g., $T_2$ values, $T_1$ values, etc.).

As shown in the example of FIG. 8, the circuitry 880 can include a sequencer 882, a transmitter 884, a receiver 886, and an ADC 888. The sequencer 882 can include instructions or otherwise be instructed to control the transmitter 884, which can be operatively coupled to the antenna 874 for transmission of oscillating magnetic fields. The receiver 886 can be operatively coupled to the antenna 874 for reception of echo signals where such signals can be in analog form and converted into digital echo data using the ADC 888. As shown in the example of FIG. 8, other circuitry 889 can be included, which may be operatively coupled to one or more data and/or power lines. For example, consider one or more data and/or power lines operatively coupled to an uphole (e.g., surface) unit or system. As an example, the sequencer 882 may be programmable via instructions, commands, etc., received from memory locally, from a surface unit or system, another component of a downhole string, etc. As an example, a method can include controlling emissions, which may be via RF emission circuitry. As an example, such circuitry can include the sequencer 882 and the transmitter 884 as operatively coupled to the antenna 874. As an example, a method can include acquiring digital echo data, which may be via antenna circuitry and analog-to-digital conversion circuitry. As an example, such circuitry can include the antenna 874, the receiver 886 and the ADC 888. As an example, compression circuitry may be included to compress digital echo data (e.g., consider one or more of window summing, singular value decomposition, etc.). Data compression may reduce data density for transmission of data uphole to a surface unit or system (e.g., via the circuitry 889, etc.).

As an example, the tool 850 can be dimensioned for receipt in a borehole with a diameter of approximately 10 cm or more, which may depend on features such as a centralizer, pads, etc. As an example, the tool 850 can be of a maximum diameter of a tool body of approximately 5 cm or more. For example, consider an outer tool body diameter of approximately 12 cm at a NMR unit (e.g., a NMR unit with a 12 cm cross-sectional dimension).

As an example, a NMR unit can be skid-mounted to cut through mud cake and for contact with a formation. As an example, contact may be enhanced through one or more components such as an eccentralizing arm or power calipers. As mentioned, internal permanent magnets can be utilized to provide a static polarizing magnetic field. As an example, a NMR unit may be sensitive to a volume of about 1 cm to 3 cm or more into a formation where the volume may extend a length of an antenna along a longitudinal axis of the NMR unit (e.g., 5 cm to 15 cm or more), which can be a factor in vertical resolution. As an example, an antenna can be operated as a transmitter, a receiver or both a transmitter and a receiver. As a transmitter, an antenna can transmit a sequence for an oscillating magnetic field (e.g., consider a CPMG pulse sequence, etc.). As a receiver, an antenna can receive pulse echoes from a formation, including substances in the formation such as one or more fluids.

Figure 9:
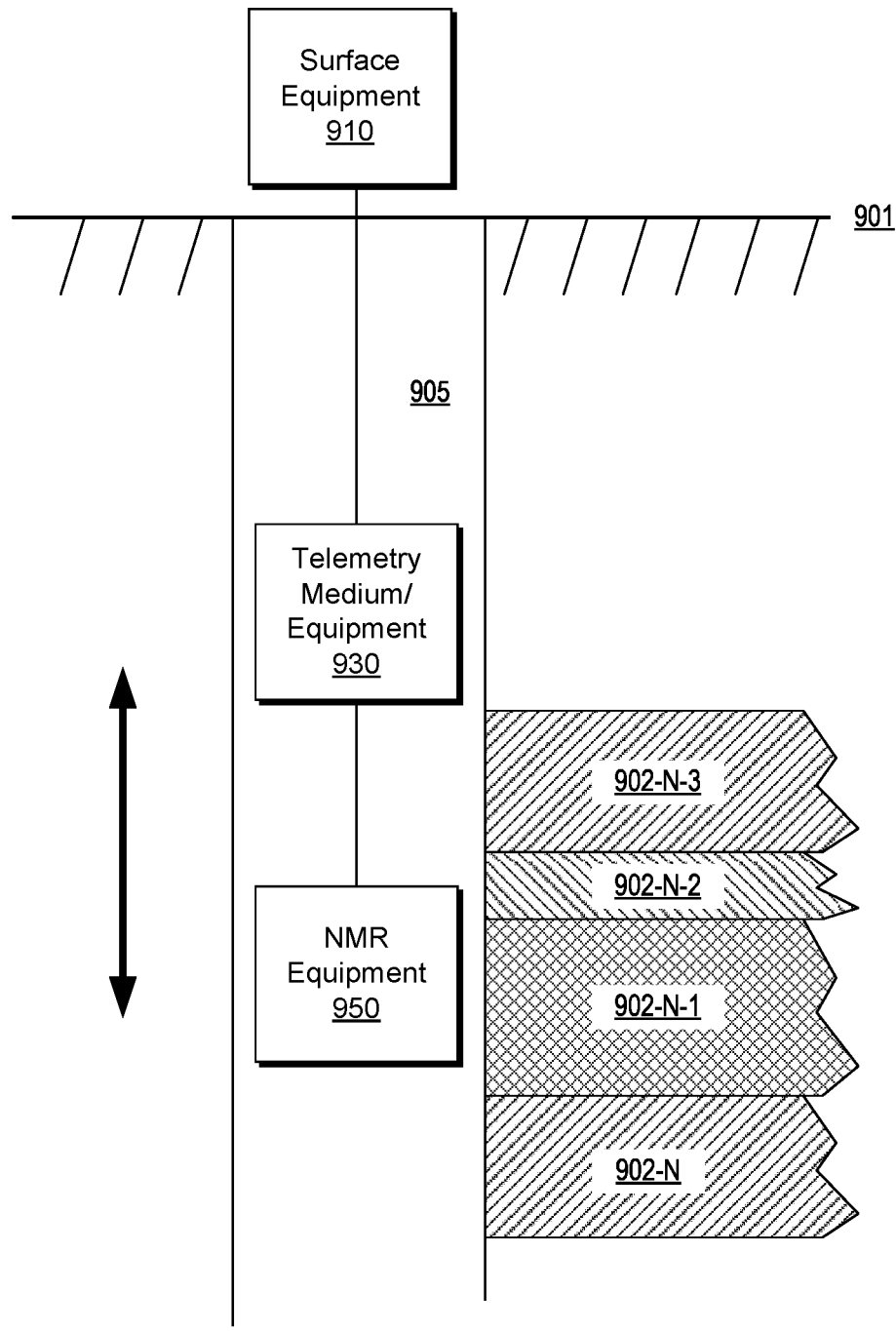
FIG. 9 illustrates an example of a system.

FIG. 9 shows an example of a system 900 with respect to a subsurface region 901 that includes a surface 901, various types of formations 902-N-3, 902-N-2, 902-N-1, and 902-N, which may be referred to as formations 902 or individually as individual formations, and that includes a borehole 905 where the formations 902 define a wall of the borehole (e.g., a borehole wall). As shown in the example of FIG. 9, the formations 902 can be of different thicknesses, of different materials, and may be disposed at different angles with respect to the surface 901. As an example, the borehole 905 may be vertical or deviated. As an example, the borehole 905 may include a vertical portion and a deviated portion. As an example, in a deviated portion, the borehole 905 may traverse the formations 902 in a manner that increases path length such that the path length of the borehole 905 in each of the formations 902 is greater than the thickness of each of the formations 902.

As shown in the example of FIG. 9, the system 900 includes surface equipment 910, telemetry medium and/or equipment 930 and NMR equipment 950. As explained, whether the system 900 includes drilling equipment or logging equipment, the NMR equipment 950 can move in the borehole 905. For example, the NMR equipment 950 can be tripped in, move with drilling, tripped out, maintained at a stationary position, etc. As to movement of the NMR equipment 950, it may be referenced with respect to spatial coordinates, which may provide for a measured depth and/or a vertical depth. As an example, movement along the borehole 905 can be characterized with respect to velocity, acceleration, translation, vibration, rotation, etc.

In the example of FIG. 9, the NMR equipment 950 can be operated to acquire NMR data for the different formations 902. Where the formations 902 differ in their materials (e.g., types of materials, composition of materials, etc.), the NMR equipment 950 may operate more efficiently when an acquisition protocol is matched to one or more formation characteristics. For example, formation characteristics may result in different relaxation time constants (e.g., $T_1$ and/or $T_2$). In such an example, an acquisition protocol for a slow $T_2$ (e.g., AP1) may differ from an acquisition protocol for a fast $T_2$ (e.g., AP2). In such an example, if AP1 is applied to a non-optimal formation type (e.g., fast $T_2$), the resulting NMR data may be of lesser quality. For example, the NMR data may be of a lower signal to noise ratio (SNR). As an example, for NMR measurements, an acquisition protocol (AP) may be characterized by a pulse sequence (PS). As an example, the NMR equipment 950 can include circuitry that can automatically change an AP, which can include changing a PS.

As an example, the system 900 can include computational resources that can automatically adjust the NMR equipment 950, which may be responsive to a formation characteristic. In such an example, the telemetry medium and/or equipment 930 may be adjusted. For example, consider an adjustment to telemetry mode, compression of data, organization of data, etc.

As an example, as the NMR equipment 950 moves in the borehole 905, the NMR equipment 950 may be adjusted in real time such that one or more adjustments are made to the NMR equipment 950 based on one or more formation characteristics of the formations 902. Such an approach may provide for more efficient operation of the NMR equipment 950, which may provide improved SNR, improved power utilization, improved telemetry, etc.

As an example, the NMR equipment 950 can automatically adjust acquisition, for example, by selecting a particular acquisition protocol (AP) from a group of acquisition protocols (APs). As an example, an automatic adjustment may include adjusting one or more parameters of an acquisition protocol (AP).

As an example, the NMR equipment 950 can include and/or be operatively coupled to a trained machine model that can receive input and generation output. In such an example, the output may be utilized to control operation of the NMR equipment 950.

As mentioned with respect to FIG. 8, the NMR unit 870 (e.g., NMR equipment) can include the circuitry 880. Such circuitry may be "lightweight". As an example, NMR equipment can include a microprocessor that has associated specifications. For example, consider a microprocessor with a relatively low clock rate (e.g., less than 100 MHz). As an example, NMR equipment can include memory that has associated specifications. For example, consider random access memory (RAM) with a relatively low amount of memory (e.g., less than 10 MB).

FIG. 10 shows an example of a microprocessor 1000 that may be utilized in a downhole tool such as a NMR unit (e.g., NMR equipment) along with an example of circuitry 1080 that can include a plurality of microprocessors 1000-1, 1000-2, 1000-3, 1000-4, and 1000-5. As shown, the circuitry 1080 can include a modem processor 1000-1, a controller processor 1000-2, a sequencer processor 1000-3, a processing and diagnostics processor 1000-4, and an acquisition processor 1000-5. Also shown in the example circuitry 1080 of FIG. 10 are memory, an ADC, a transmitter, a receiver and an antenna (see, e.g., the circuitry 880 of FIG. 8).

As an example, the microprocessor 1000 can include various features such as registers, cache, memory (e.g., for instructions and data), busses, a clock, address generators, interrupts, logic units, etc. As an example, the microprocessor 1000 can include various features of an INTEL Corporation (Sunnyvale, Calif.) microprocessor such as one or more of the NIOS family microprocessors (e.g., NIOS II, etc.). As an example, a microprocessor such as the microprocessor 1000 may be utilized with and/or include one or more features of a device such as the CYCLONE device (Altera, San Jose, Calif.). For example, a CYCLONE III device can include a NIOS II family microprocessor. The NIOS II family of microprocessors includes a 32-bit embedded-processor architecture designed specifically for the ALTERA family of field-programmable gate array (FPGA) integrated circuits.

A NIOS II processor can include an instruction cache, 60 MHz clock, hardware multipliers, external SRAM (for executable code and data) such as 2 MB on a modem and on a sequencer and 4 MB on a controller along with 8 MB external cache for storing FPGA image and software and a 4 GB recording cache (controller coupled). In such an example, each FPGA can possess "system on a chip" (SoC) characteristics and custom instructions to tailor functionality to the specific portion of circuitry.

Figure 11:
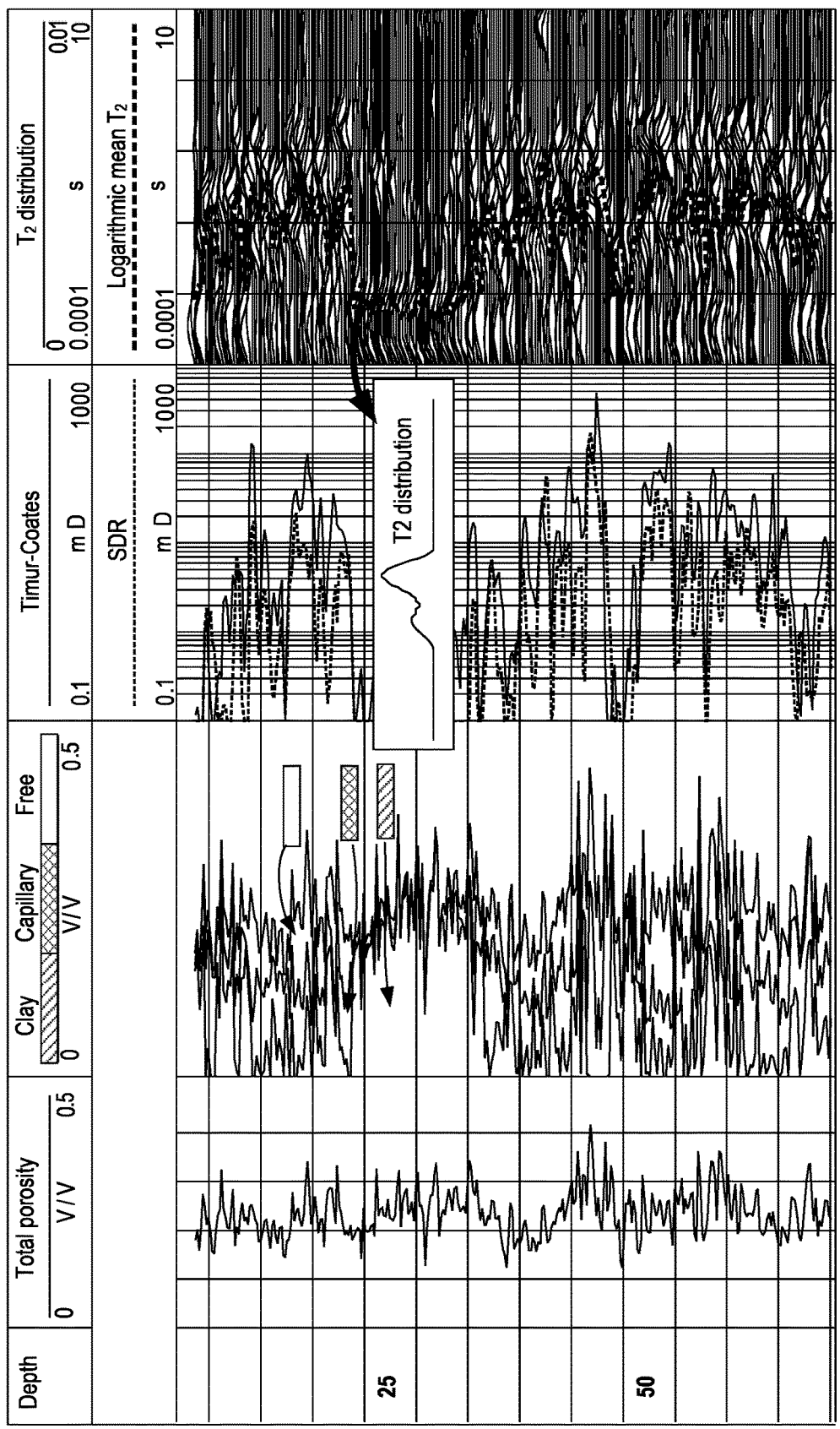
FIG. 11 illustrates an example of a graphical user interface.

FIG. 11 shows an example of a graphical user interface (GUI) 1100 that includes graphics derived from NMR data as acquired by a NMR unit of a downhole tool. The GUI 1100 shows four tracks in log form, with respect to depth and various other scales. The GUI 1100 may include, for example, a gamma ray track, which may help to provide indication of position (e.g., depth, measured depth, etc.). As shown, the first track includes a plot of total porosity (e.g., lithology-independent), the second track includes graphics of volumes of clay-bound water, capillary-bound water, and free fluid derived from a measured $T_2$ distribution, the third track includes permeability estimate graphics as derived using Timur-Coates and Schlumberger-Doll-Research (SDR) permeability equations and the fourth track includes the measured $T_2$ distribution as well as the logarithmic mean $T_2$ values at various depths.

As to depth, indicators as to 25 and 50 are shown, which can be utilized to determine a resolution (e.g., a vertical resolution, which may be with respect to a direction in vertical depth or a direction in measured depth). As may be appreciated, a higher vertical resolution can provide greater insight into characteristics of a formation.

As an example, a tool for NMR can include multiple sensors, including a large antenna for fluid characterization and complementary small aperture antennae for high-resolution acquisition modes. As an example, an automated switching method may optionally include switching of an antenna. As an example, a tool for NMR can include sensors that can be operated either separately or simultaneously at various logging speeds. For example, consider a tool that can operate at logging speeds up to 1,000 meters per hour or more. As an example, a tool for NMR can provide for analyses of responses for high-resolution identification of long $T_1$ fluids such as light hydrocarbons.

As to logging speed, consider the logging truck 550 of FIG. 5 as including a reel (e.g., a wireline reel, coiled tubing reel, etc.) that can be rotated by a motor to cause the logging string 540 to translate in the openhole section 528, which can be directional such as toward the end of the borehole (inwardly) or toward the surface of the borehole (outwardly). Such directional movement may be referred to as tripping in or tripping out. The logging speed can depend on the type of pulse sequence utilized for NMR and/or a switching method may include selecting a pulse sequence using one or more motion signals, etc. As an example, a pulse sequence that takes more time can result in slower logging speeds while a sequence that takes lesser time may result in faster logging speeds (e.g., depending on physical constraints of a system, an environment, etc.). In the example of FIG. 5, the logging truck 550 can include the system 560 where the system 560 controls a reel that controls movement of the logging string 540. For example, rotation of the reel can be controlled to achieve a desired logging speed of the logging string 540. As an example, logging may occur with continuous motion or with starts and stops. As an example, a logging speed may be an average speed that includes time(s) associated with one or more stop/start cycles.

Referring again to the GUI 1100 and the fourth track, $T_2$ distributions are illustrated graphically for a series of depths. The GUI 1100 shows a single $T_2$ distribution amplified to demonstrate that $T_2$ values can have a peak or peaks for a volume of investigation at a particular depth. As an example, a higher vertical resolution can provide for more $T_2$ distributions over a particular segment of a borehole. As an example, a sequence that can be executed in lesser time with acceptable data quality can provide for a greater logging speed, which may allow for receiving data for a segment of a borehole in a shorter period of time (e.g., more rapid formation evaluation, etc.).

As an example, a method can include various parameters such as a speed parameter, a number of NMR measurements at different depths per unit time parameter, a sequence duration parameter, a maximum speed parameter as to NMR measurements, a maximum speed parameter as to physical constraints on a logging tool and/or a logging system, a maximum data rate or bit rate for transmission of data from a downhole tool, a maximum processing rate as to processing of data (e.g., downhole and/or uphole), etc.

Figure 12:
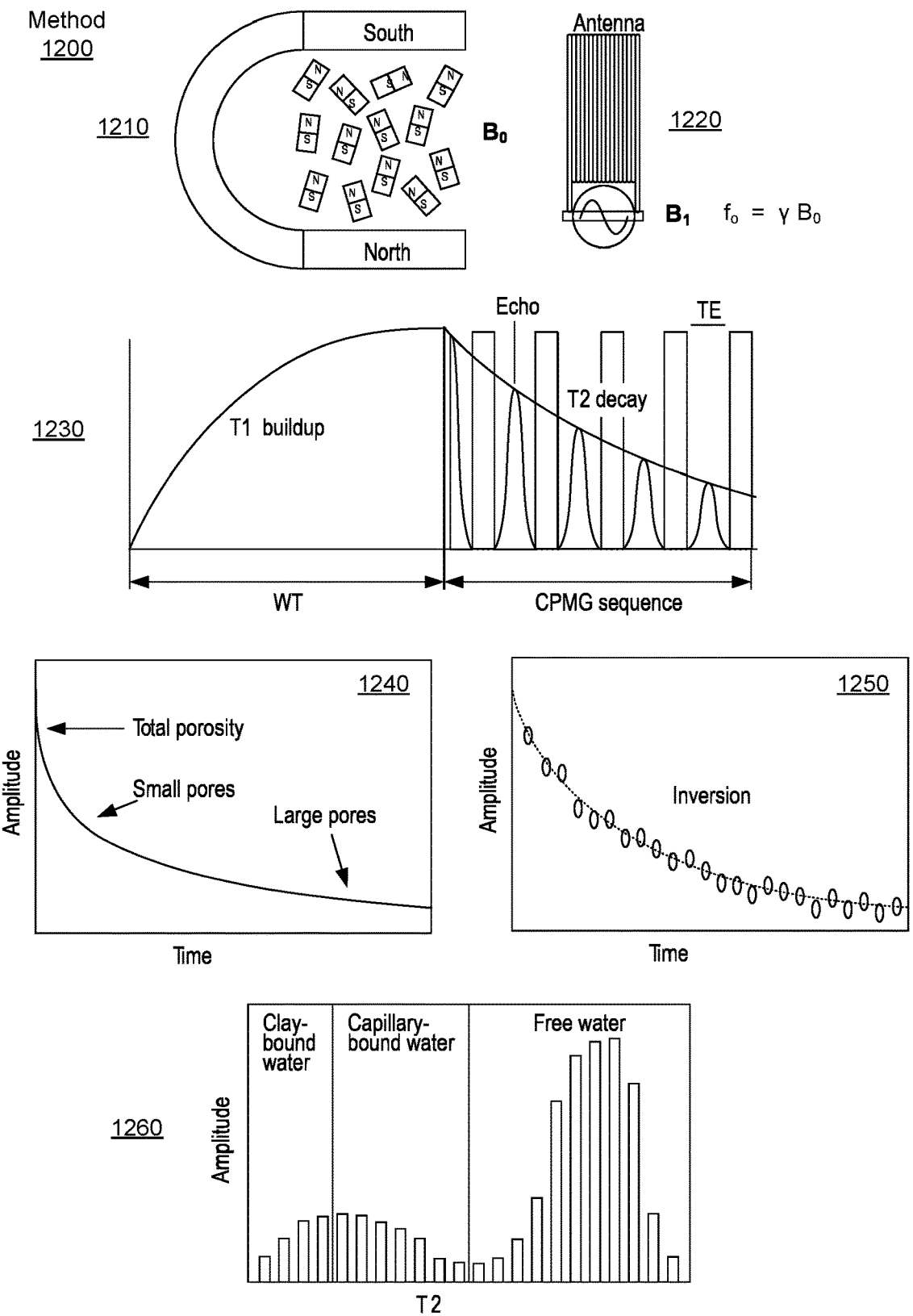
FIG. 12 illustrates an example of a method.

FIG. 12 shows an example of a method 1200 that includes various actions along with approximate graphical representations. The method 1200 includes an exposure block 1210 for exposing nuclei to a static magnetic field, an exposure block 1220 for exposing the nuclei to an oscillating magnetic field, a sequence block 1230 for performing the exposing according to a pre-determined sequence that includes data acquisition, an analysis block 1240 for analyzing at least a portion of acquired data, an inversion block 1250 for inverting at least a portion of the acquired data converts a decay curve into a distribution of $T_2$ measurements and an analysis block 1260 for analyzing a distribution of $T_2$ measurements with respect to porosity (e.g., pore sizes in the formation investigated), which can correspond to water environments (e.g., clay-bound water, capillary-bound water, free water, etc.).

As explained, hydrogen nuclei behave like tiny bar magnets and tend to align with the magnetic field of permanent magnets, such as those in an NMR logging tool. During a set wait time (WT), the nuclei polarize at an exponential buildup rate, $T_1$, including multiple components (C). Next, a train of RF pulses can adjust spins of the hydrogen nuclei causing them to tip 90 degrees and then precess about the permanent magnetic field, as mentioned, 180 degree pulses can re-focus the hydrogen nuclei at particular times. The formation fluids can generate RF echoes responsive to successive 180 degree pulses where the RF echoes are received and measured by the antenna of the NMR logging tool. The time between the 180 degree pulses can be defined as the echo spacing or echo time. The amplitudes of the echoes decay at a superposition of exponential relaxation times, $T_2$, which tend to be functions of pore-size distribution, fluid properties, formation mineralogy and molecular diffusion. As an example, an inversion technique can be applied that converts a decay curve into a distribution of $T_2$ measurements (see, e.g., $T_2$ distribution of the GUI 1100 of FIG. 1). In general, for brine-filled rocks, the distribution is related to the pore sizes in the rocks.

As an example, an approach can utilize a system that is distributed, for example, a system that utilizes a combination of high-performance computing (HPC) and edge computing infrastructures for automating and optimizing logging operations, where data acquisitions are dynamically adjusted with an incremental knowledge of a reservoir. An adaptive approach can be utilized with an aim to improve efficiency and quality of data acquisition and to automate job planning.

Figure 13:
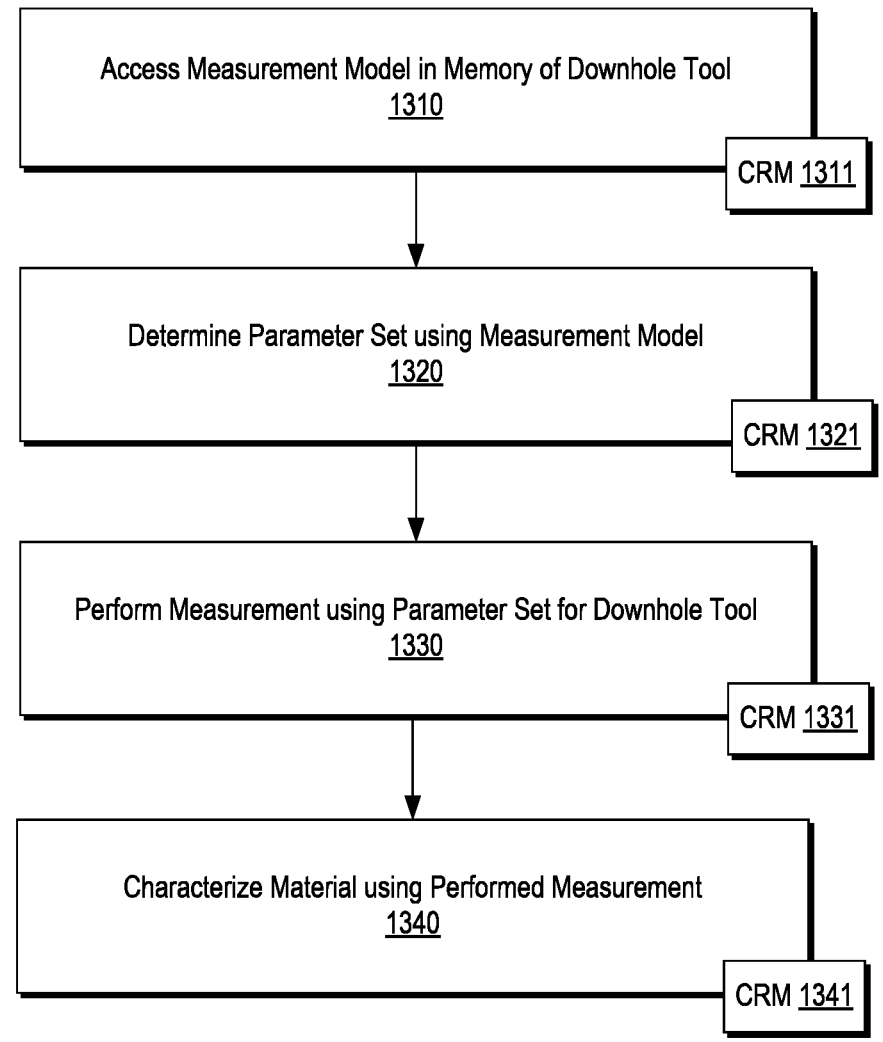
FIG. 13 illustrates an example of a method and an example of a system.

FIG. 13 shows an example of a method 1300 and an example of a system 1390. As shown, the method 1300 can include an access block 1310 for accessing a measurement model in memory of a downhole tool; a determination block 1320 for determining a parameter set using the measurement model; a performance block 1330 for performing measurement(s) using the parameter set for the downhole tool; and a characterization block 1340 for characterizing material using the performed measurement(s).

The method 1300 of FIG. 13 is shown as including various computer-readable storage medium (CRM) blocks 1311, 1321, 1331, and 1341 that can include processor-executable instructions that can instruct a computing system, which can be a control system, to perform one or more of the actions described with respect to the method 1300. As an example, the circuitry 880 and/or the circuitry 1080 may be utilized to perform one or more of the actions described with respect to the method 1300.

As shown in the example of FIG. 13, the system 1390 can include one or more computers 1392 that include one or more processors 1393, memory 1394 operatively coupled to at least one of the one or more processors 1393, instructions 1396 that can be, for example, stored in the memory 1394, and one or more interfaces 1395. As an example, the system 1390 can include one or more processor-readable media that include processor-executable instructions executable by at least one of the one or more processors 1393 to cause the system 1390 to perform actions such as, for example, one or more actions of the method 1300. As an example, the instructions 1396 can include instructions of one or more of the CRM blocks 1311, 1321, 1331, and 1341. The memory 1394 can be or include the one or more processor-readable media where the processor-executable instructions can be or include instructions. As an example, a processor-readable medium can be a computer-readable storage medium that is non-transitory that is not a signal and that is not a carrier wave.

As an example, the system 1390 can include subsystems 1391. For example, the system 1390 can include a plurality of subsystems 1391 that may operate using equipment that is distributed. For example, consider a downhole tool subsystem and a surface subsystem as described with respect to FIG. 9. As an example, operations of the blocks 1310, 1320 and 1330 of the method 1300 may be performed using a downhole tool subsystem. As an example, operation(s) of the block 1340 may be performed using a downhole subsystem and/or a surface subsystem, which may be a cloud-based or cloud-coupled subsystem. The method 1300 can be adaptive in that the measurement model can be utilized to determine a parameter set using one or more downhole measurements and/or results thereof. As explained, a downhole tool may be positioned in different environments where different parameter sets may be utilized. A measurement model can provide for selection of appropriate parameter sets for different environments. Such an approach may provide for improved measurements (e.g., greater SNR), improve efficiency (e.g., power utilization, etc.), or one or more improved performance aspects.

In various examples, NMR measurements are used to illustrate an adaptive workflow; noting that one or more types of sensor-based measurements may utilize an adaptive workflow (e.g., non-NMR, NMR and other, etc.).

NMR logging can face various challenges such as one or more of the three challenges described below. First, it tends to be slow due to real world physics, specifically, the prolonged time to polarize hydrogen atoms in a static magnetic field; second, it tends to have poor SNR owing to the intrinsically weak coupling between nuclear spins and the instrument detectors; and third, an NMR logging program tends to demand substantial job planning, demanding local knowledge and domain resources and resulting in a lengthy operational workflow. Methods that reduce logging time, enhance SNR, and streamline job design are generally desirable.

NMR is a routinely used technique for reservoir characterization due to its capability of measuring the hydrogen nuclei in the fluids. As both water and hydrocarbons like oil and gas contain hydrogen nuclei, they can be measured and quantified by NMR tools. Furthermore, NMR measurement of sample properties, such as relaxation times ($T_1$ and $T_2$) and diffusion coefficients enable understanding of the dynamics of these fluids, resulting in the interpretation of their physical state (e.g., free or bound), the sizes of the pores they are confined in, the viscosity and type of hydrocarbons, and the permeability, and other properties of the rock system.

NMR relaxation such as measured by $T_2$ has been shown to be directly proportional to the surface-to-volume ratio of a porous material, $$1/T_2 = \rho \cdot S N_P \qquad (1)$$

where $S$ is the total surface area of the material, $V_p$ is the pore volume, and $\rho$ is the surface relaxivity.

Above, surface relaxivity $\rho$ is a quantity (in units of micron/second) that defines the strength of the surface relaxation phenomenon. Because of this relationship, NMR is used in petroleum exploration to obtain estimates of porosity, pore size, bound fluids, permeability, and other rock and fluid properties (e.g., "petrophysical data"). For example, it is known that a $T_2$ distribution is closely related to the pore size distribution. Reservoir rocks often exhibit a wide range of $T_2$ s due to the difference in pore sizes, with observed $T_2$ from several seconds down to tens of microseconds. Signals at long $T_2$ (e.g., greater than 100 milliseconds) tend to be from large pores and such fluids may be considered producible. For shorter $T_2$ signals (e.g., 3 milliseconds to 50 milliseconds), the fluids are often considered to be bound by capillary force of the pores. For example, fluids in sandstone rocks with $T_2$ below 30 ms are considered bound by capillary force and tend not to produce. Thus, a cutoff value, $T_2$ cut (e.g., $T_2$ cut=30 ms) can be used to calculate the bound fluid volume:

$$BFV = \int_{T_2 min}^{T_2 cut} f(T_2) dT_2 \qquad (2)$$

where $f(T_2)$ is the $T_2$ distribution, and $T_2$ min is the minimum $T_2$ obtained in the $T_2$ distribution.

For a fully saturated sample, porosity 0 can be obtained by integrating $f(T_2)$ through the entire $T_2$ domain as:

$$\emptyset = \int_{T_2 min}^{T_2 max} f(T_2) dT_2 \qquad (3)$$

where $T_2$max is the maximum $T_2$ exhibited in the sample. Signals with even shorter $T_2$ (e.g., $T_2$ less than approximately 3 milliseconds) can be due to clay bound water or viscous (heavy) hydrocarbon (see, e.g., the plot 1260 of FIG.

12). Some rocks contain a substantial amount of kerogen that is solid organic matter and may exhibit $T_2$ s down to tens of microseconds.

As explained, NMR measurements can be acquired using specially designed data acquisition schemes (e.g., pulse sequences) which describe the timings of transmission and reception of electromagnetic signals. A pulse sequence for the measurement of $T_2$ relaxation time distribution can be a CPMG echo train (see, e.g., FIG. 7).

FIG. 14 shows some examples of pulse sequences (PSs) 1410 and 1430, where the PS 1410 is a CPMG sequence with an echo train. The CPMG echo train includes an initial idle time or wait time (WT) to allow the nuclei in formation fluids to reach equilibrium in the magnetic field produced by the permanent magnet of a logging tool. Thereafter, a set of RF pulses is applied, delivered by an antenna. Midway between two RF pulses, NMR signals (e.g., echoes) are formed and may be received by the same antenna (e.g., via a switch, etc.). As explained, the amplitude of the echoes attenuates over time. As explained with respect to FIG. 7, by fitting the echo amplitudes to a multi-exponential model, the $T_2$ distribution, $f(T_2)$, may be obtained.

In such an experiment, a train of echo signal is acquired. The signal amplitude, D, can be measured as a function of the echo time, $t_{echo}$, (the time of the echo from the beginning of the first 90-degree pulse), $$t_{echo} = n*TE \quad (4)$$

where n is the number of echo and TE is the echo spacing (e.g., the time between two adjacent 180-degree pulses as shown in the plot 1230 of FIG. 12). The signal amplitude then follows an exponential decay form, $$D(t_{echo}) = S(0)\exp\left(-n*\frac{TE}{T_2}\right) \quad (5)$$

for a sample of a single $T_2$.

For samples embodying a range of $T_2$ distribution, the total signal is a sum of $T_2$ components, $$D(t_{echo}) = \int dT_2 f(T_2)\exp\left(-n*\frac{TE}{T_2}\right) \quad (6)$$

where $f(T_2)$ is the $T_2$ distribution. In practice, fluid properties other than $T_2$ are measured by a wide variety of pulse sequences. For example, relaxation time $T_1$ is measured through inversion or saturation recovery pulse sequences, and translational diffusion coefficient, D, is measured by diffusion-editing or pulse-field gradient pulse sequences.

In an inversion-recovery $T_1$ measurement, as shown via the PS 1430 of FIG. 14, the echo signal is determined by $$D(t_1) \int dT_1 f(T_1)\left(1-2\exp\left(-\frac{t_1}{T_1}\right)\right) \quad (7)$$

where t1 is often called the "encoding time".

In practice, a list of t1 values can be used to measure the signal, and the resulting signal D(t1) is subsequently inverted to obtain the sample $T_1$ distribution, $f(T_1)$. An optimal choice of a {t1} list may be a function of sample $T_1$ distribution. For example, with $T_1=1$ ms, maximum t1 can be under 5 ms; while when $T_1=1$ s, {t1} can cover as long as 5 s. As an example, a method can include determining in real-time a {t1} sequence that suits the acquisition parameter for specific material under study.

A combination of pulse sequences can simultaneously measure more than one NMR property of fluids. For example, a combination of inversion recovery and CPMG sequences can provide a two-dimensional mapping of fluid $T_1$-$T_2$ distribution—a technique that can be utilized in evaluating shale and tight formations. High-dimensional measurements can be particularly time consuming as they demand traversing through a high-dimensional pulsing parameter table.

Figure 15:
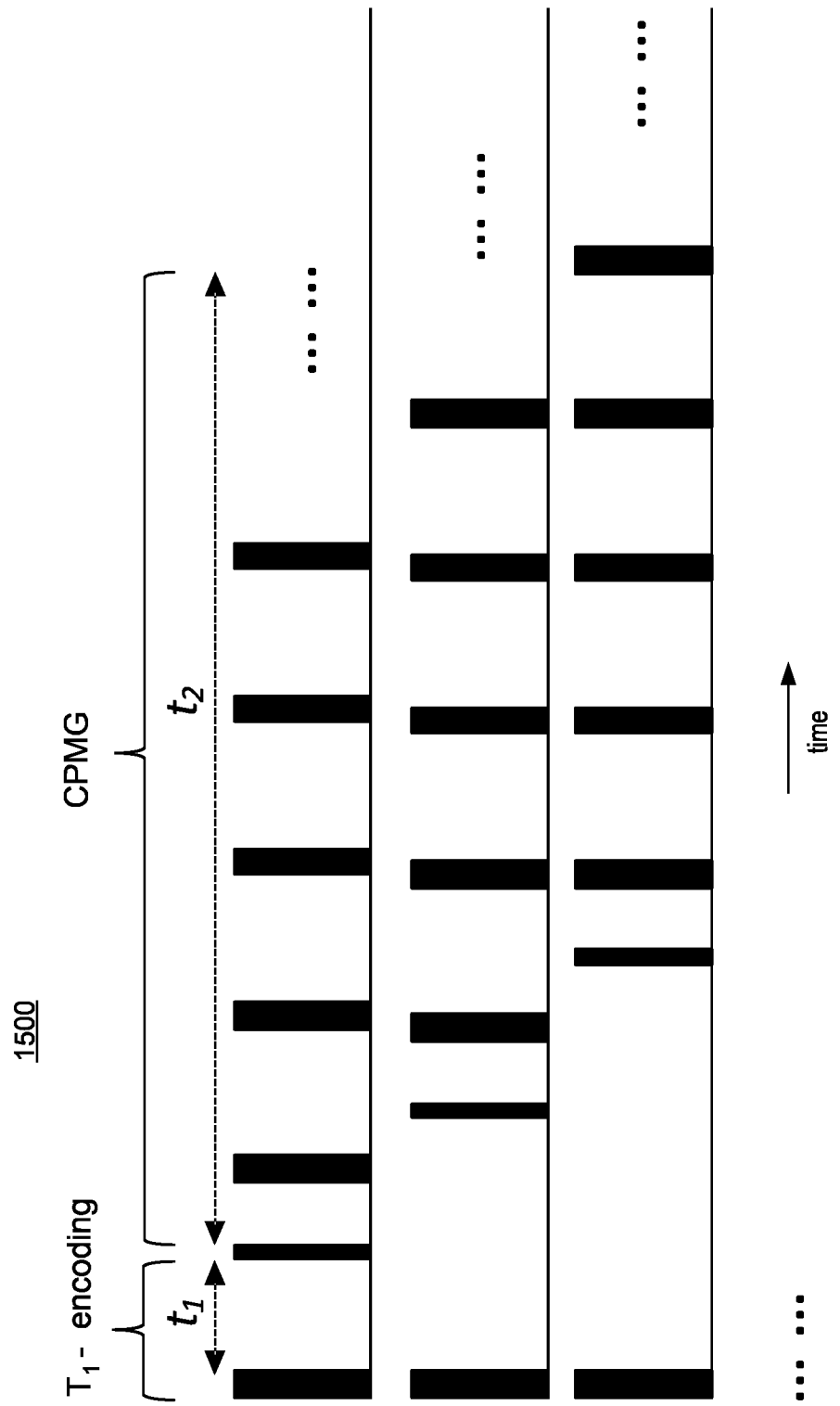
FIG. 15 illustrates examples of pulse sequences.

FIG. 15 shows an example of a portion of a table 1500 of pulse sequences. In FIG. 15, for parameters {t1, t2}, signal can be determined by:

$$D(t1,t2) = \int dT_1 dT_2 f(T_2,T_1)(1-e^{-t1/T1})e^{-t2/T2} \quad (8)$$

where $f(T_2, T_1)$ is the joint distribution of $T_1$ and $T_2$ relaxation times of the material under investigation.

As an example, a few parameter sets (e.g., sets of different {t1 t2} values) may be prepared while engineering an NMR tool, individually optimized for different formation types (shale, heavy oil, light oil, etc.). As to entering and exiting a formation layer during a logging operation, as an example, a method may be utilized that can include selecting one of the optimized pulse sequences for execution. Such an adaptive approach can involve real-time modeling of acquired NMR signals.

As an example, an NMR measurement may be described by a series of time sequences of RF pulses, gradient pulses, data acquisition, and synchronized operations of peripheral circuitries, such as duplexers. In such an example, each element of the time sequence can be further characterized by system parameters, such as duration, phase, amplitude and duty-cycle of RF and gradient pulses. Consider parameters such as p1, p2, . . . , and a suite of parameters as P={p1, p2, . . . }.

While NMR is mentioned, such an approach may optionally be applied to one or more other types of tools (e.g., other sensor tools). For example, an approach using parameters P can be applicable to one or more other logging instruments such as, for example: TX power/current, receiver sensitivity, bandwidth, and frequency for EM tools; and detector acquisition window, pulse neutron power, and pulse rate for nuclear tools.

As an example, one or more desired results or goals of real-time optimization can vary accordingly, for example, from improving data quality and operational efficiency to preserving useful lifetime of logging instruments. As an example, a method can include utilization of heterogeneous computing infrastructures, which may aim to reduce hardware functionalities, optimize performance and lower overall cost for instrument designs.

In addition to NMR well-logging, one or more other multi-dimensional NMR spectroscopy experiments can utilize one or more methods to improve measurement robustness and/or accelerate (e.g., simplify) planning. NMR properties measured in a spectroscopy experiment can include, for example, chemical shift, spin-spin coupling, heteronuclear interactions, and spin spatial dependence etc.

FIG. 16 shows an example of a method 1610 and accompanying measurement space plots 1620 (e.g., $T_1$, $T_2$ measurement space plots). An article by Song et al., entitled "Real-time optimization of nuclear magnetic resonance experiments" (Journal of Magnetic Resonance 289 (2018): 72-78), is incorporated by reference herein. In Song et al., echo time is represented by the small Greek letter T, encoding time by $T_e t$, and polarization time by $T_p t$. As to the method 1610, it represents an optimization method that conducts stochastic analyses on acquired data and in turn updates and optimizes subsequent measurements. The numbers (1) to (7) in the method 1610 are in Song et al. described as a process that: (1) establishes a suitable model and a range of possible system parameters; (2) acquires one data point at $\tau_i$; (3) generates a solution ensemble by sampling in the system parameter space and accepts the tentative solution if it agrees with the acquired data point(s); (4) uses the solution assemble to construct a group of synthetic data set at prospective t values; (5) locates the t that corresponds to the maximum variance of the synthetic data set and assign the value to $T_2$; (6) acquires one data point at $T_2$; (7) iterates from (3) to (6); and exits the program when either the maximum variance falls below the instrument noise floor or no solution ensemble may be generated, an indication of wrong model in use.

As to the plots 1620, they are 2D variance maps for a particular sample as a function of $\tau_{pt}$ (polarization time) and $\tau_{et}$ (encoding time between 180 degree inversion pulse and 90 degree detection pulse) after acquiring 1 (label A), 2 (label B), 3 (label C) and 4 (label D) data points. The square in the plot labeled A is the initial acquisition point and the circles are the maximum variance and the acquisition points for immediate next iterations. Specifically, the plots 1620 show the progression of a 2D variance map over five measurement iterations.

Figure 17:
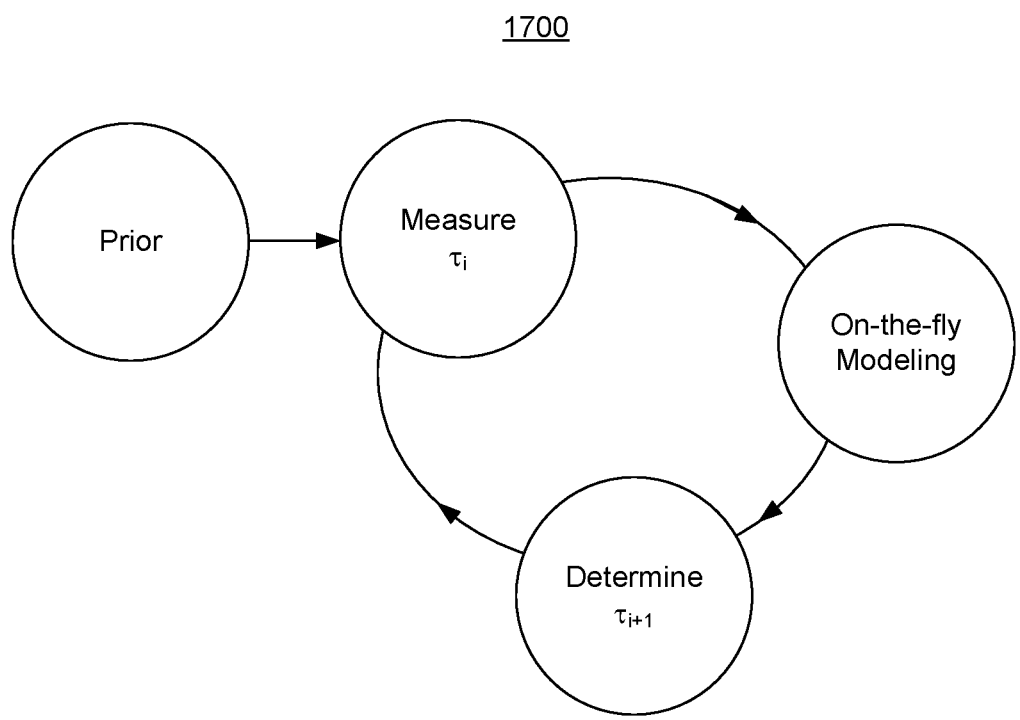
FIG. 17 illustrates an example of a state-based method implementable via a state machine.

FIG. 17 shows a state-based diagram of an example of a state machine 1700 that may be utilized to form an example framework. Such a method and/or machine can provide for dynamic optimizations of downhole measurements in real-time. As shown in FIGS. 16 and 17, a method can include acquiring data, on-the-fly modeling of results to obtain an optimized set of parameters, using the optimized parameter set to acquire new data, and looping back.

An architecture of a framework may be monolithic in the sense that computation and data acquisition are carried out within a single computing unit in an interlocked fashion, meaning that data may be passed from the measurement sensor to the computing device, in which on-the-fly modeling takes place and the analysis results are used to set the tool parameters for next measurement. In such an example, as a result, subsystems can be placed together or at least wired closely with high-speed high-fidelity data transmission. Such a system may be referred to as a monolithic system. As an example, one or more features of the microprocessor 1000 and/or the circuitry 1080 may be utilized to form a monolithic system.

As an example, a method can include deploying a system as part of an edge device (e.g., a logging tool, etc.). Such an approach can be challenging, especially as to on-the-fly modeling, which can demand substantial computation and computation resources. As explained with respect to the system 900 of FIG. 9, where a downhole tool is utilized (see, e.g., NMR equipment 950), options exist for downhole processing, transmission of information from downhole to surface, surface processing, etc. In an on-the-fly approach, depending on the depth of equipment in a downhole environment, telemetry and/or telemetry equipment may be limited such that one or more time lags exist that confound "real-time" adjustments (e.g., within the timeframe of a tool moving in a downhole environment as during logging, logging while drilling, etc.). As to telemetry, sensor data transmitted to surface equipment for analysis may take many seconds or longer depending on the telemetry and/or conveyance methods. In other mobile applications, data transmission between computing unit and a mobile device may also exhibit substantial time lags. Therefore, latency of a transmission network can render a workflow impractical for real-life applications.

As an example, with or without telemetry, data acquired via a downhole tool may be processed in a manner that accounts for use of one or more different measurement protocols. For example, consider use of two or more pulse sequences where data can be processed to provide for "regularity" in storage, data structures, telemetry, writing, reading, etc.

As an example, to achieve real-time (RT) optimization, a two-stage system may be utilized. Such a system may be referred to as a multi-stage system (MSS), which can be in contrast to a single-stage system (SSS) that can be referred to as being a monolithic system. A MSS can include at least two computing infrastructures, for example, consider a model builder subsystem and another as an RT modeler subsystem. In such an example, the model builder subsystem may be a HPC facility (high-speed computer with large memory, or a local cluster, or a cloud-computing system) on earth surface, such as the DELFI platform (Schlumberger Limited, Houston, Tex.). A RT modeler subsystem can be a downhole tool component, which may reside within a downhole tool, directly connected to a logging sensor, and composed of microprocessors and other embedded computing devices (e.g., DSP (digital signal processor), FPGA (Field Programmable Gate Array), etc.). As an example, one or more types of mobile processors, such as ARM processor, may be used, which may exhibit energy efficiency.

A MSS optimization workflow can be described in terms of a model builder subsystem (MBSS) and a RT modeler subsystem (RTMSS). The MBSS can be implemented to acquire a representative range of tool responses and the corresponding, optimal parameter set, P, for each response (the responses consider the actual performance of the sensor, such as signal-to-noise ratio, sensor calibration and range of sensitivity, in a variety of probable measurement conditions). Such a relationship can be represented by a large list of response/parameter pairs, {R(i)=>P(i)} with many entries (entry index i). Each pair means that if the sensor response is R(i), then the optimized parameter set should be P(i). Each pair may be referred to as a dictionary entry and a full list a dictionary. In such an example, note that each R(i) can be composed of one or more data points, e.g., R(i)={r1, r2, . . . }, where r1 and r2 are different data points (each represented by one number).

As an example, a MBSS can compress the dictionary (e.g., a relatively large list of response/parameter pairs) into an efficient data structure, such as a decision tree, a classification (e.g., a support vector machine (SVM), a principal component analysis (PCA)) or an artificial neural network (NN). Such a compressed data structure can be referred to a real-time model (e.g., RT model). A method can include deploying (e.g., or downloading) the RT model to a computing device of a RTMSS.

As an example, a RTMSS can utilize real-time acquired data (DATA) as an input to the RT model to obtain an optimal parameter set. Such an analysis can compare acquired DATA with a dictionary response, find one or a collection of R entries (e.g. R(k)) that is similar to the acquired DATA and then assign the corresponding parameter set to P(k). As an example, the RTMSS can execute the parameter set at the tool sensor to acquire next DATA and use the newly acquired DATA and possibly previously acquired DATA to loop back. Such a loop can continue until the end of a logging program or when a goal is reached.

The MBSS and RTMSS architecture can provide for a RT model (e.g., a compressed dictionary) that can be much smaller in size than a full dictionary. Such an approach can expedite computations.

Figure 18:
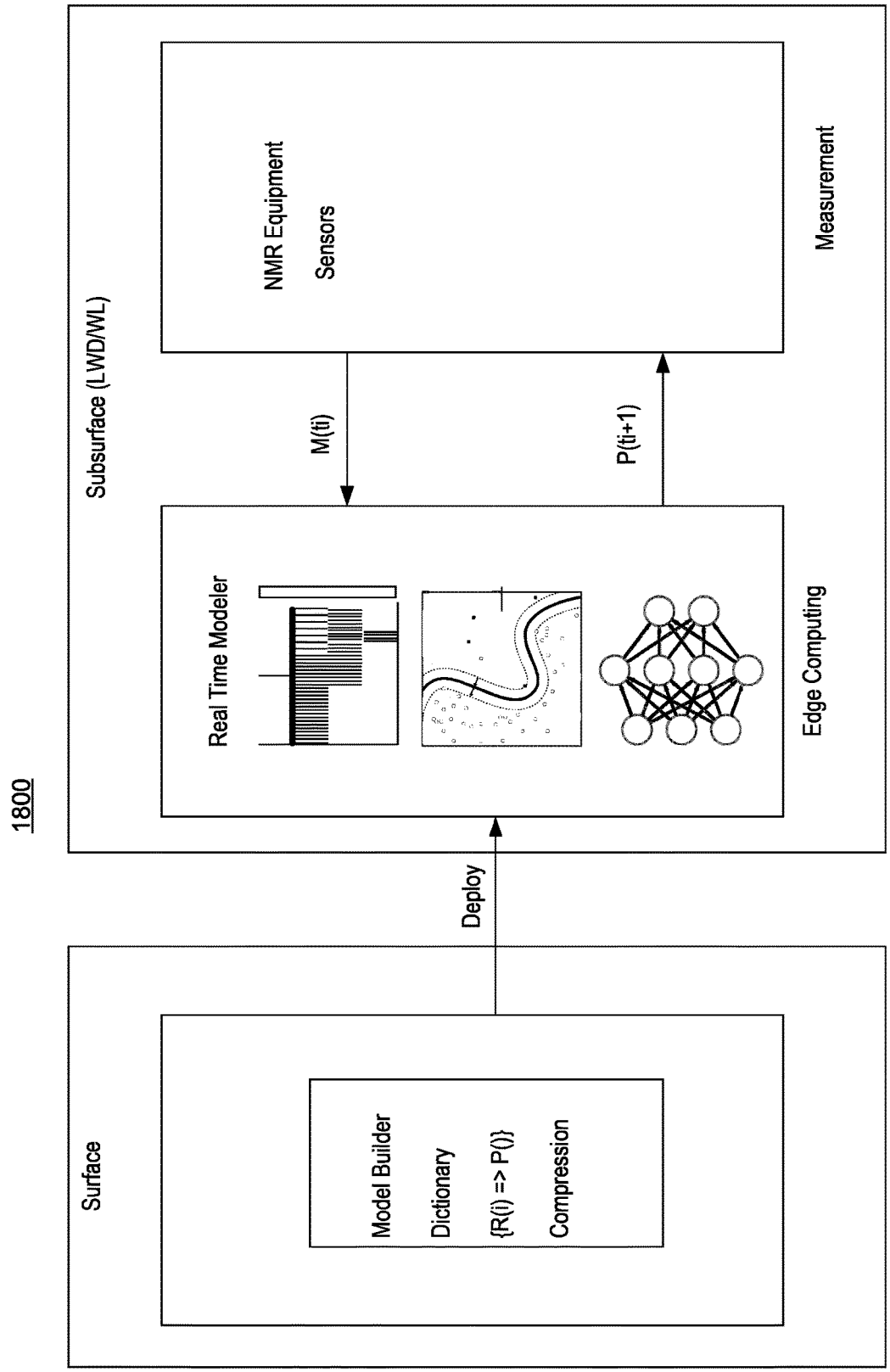
FIG. 18 illustrates an example of a system that includes a surface system and a subsurface system.
Figure 19:
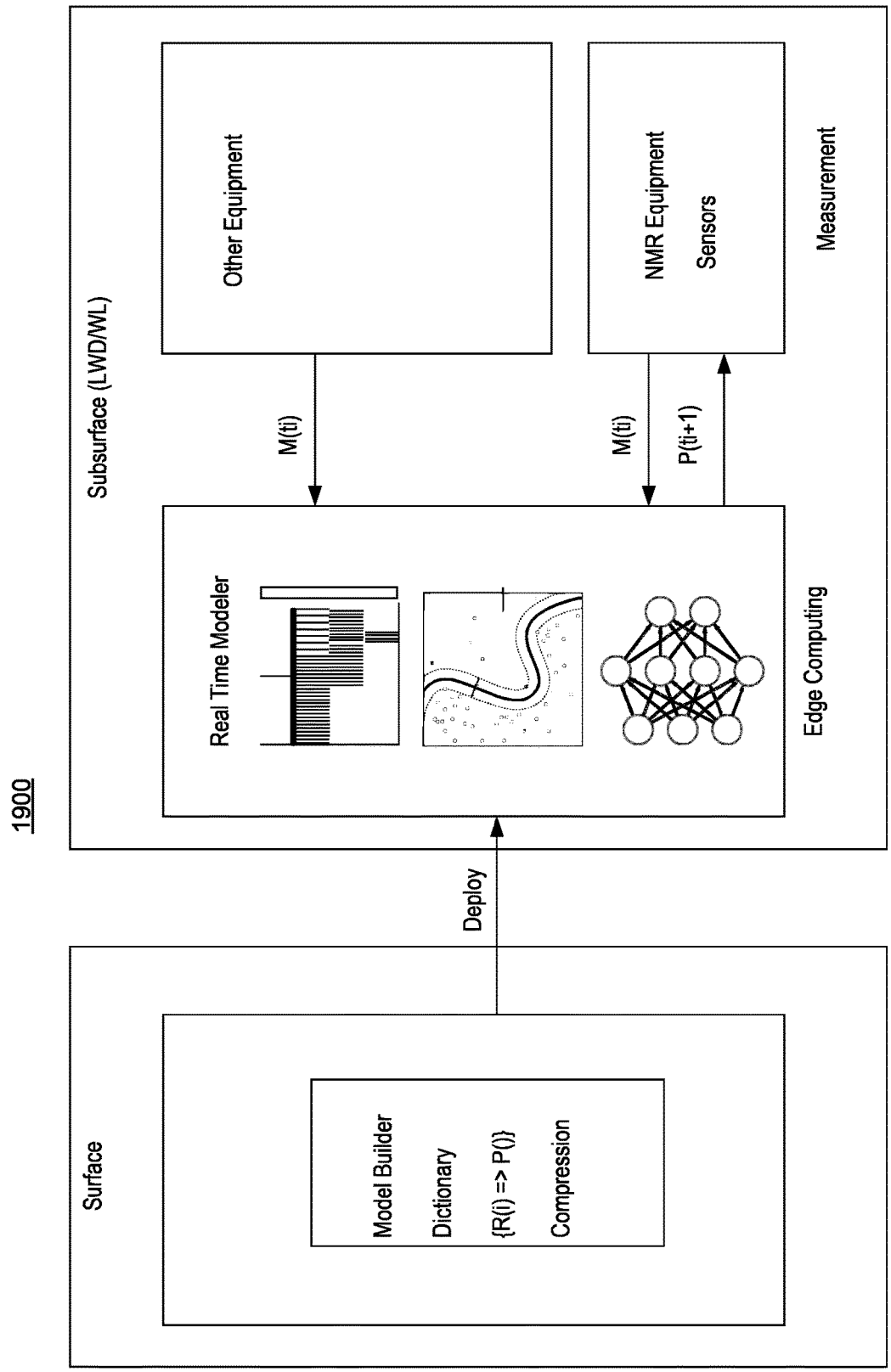
FIG. 19 illustrates an example of a system that includes a surface system and a subsurface system.
Figure 20:
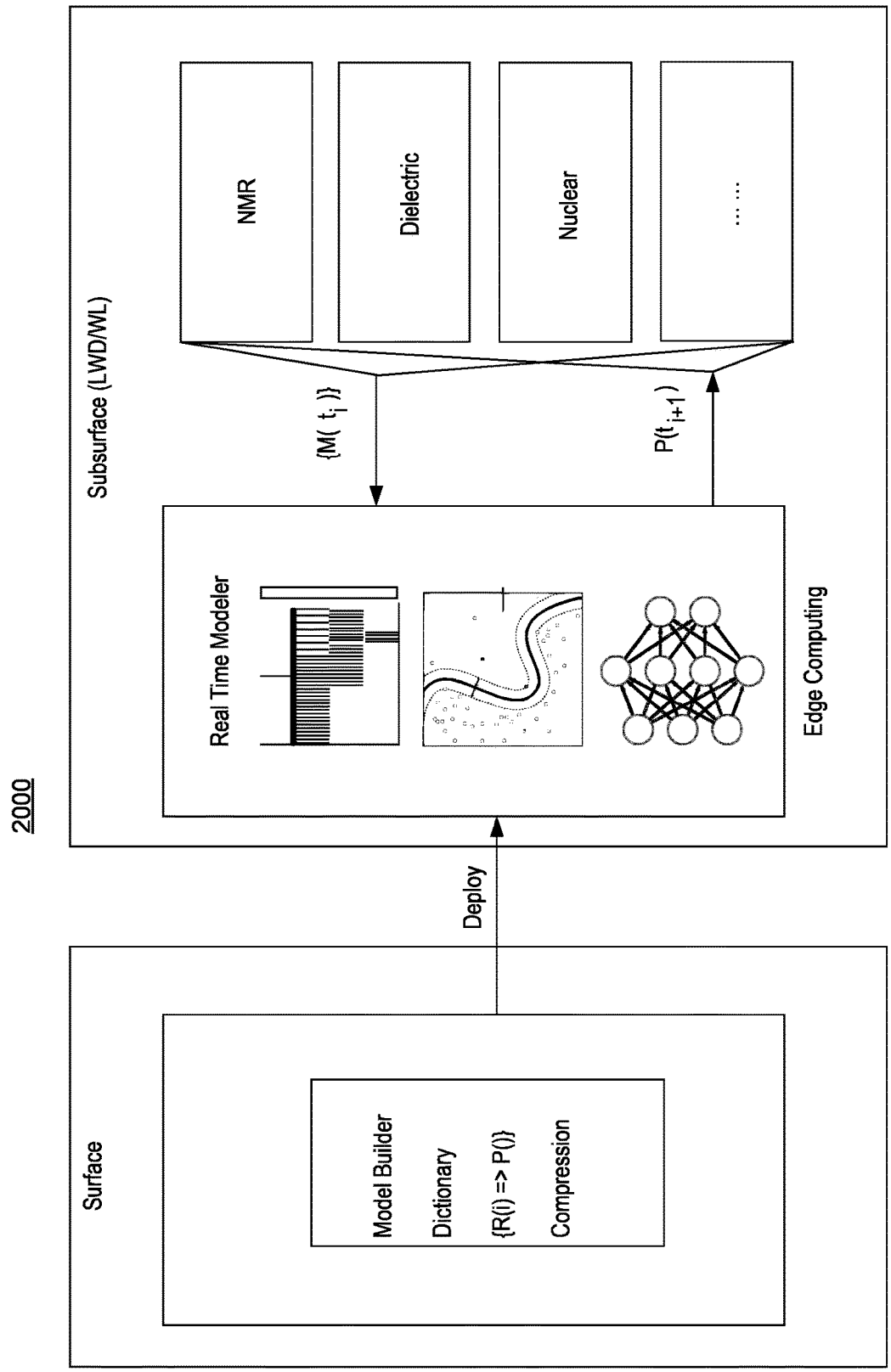
FIG. 20 illustrates an example of a system that includes a surface system and a subsurface system.

FIGS. 18, 19 and 20 show examples of systems 1800, 1900 and 2000 where each includes a surface subsystem and a subsurface subsystem. For example, the surface subsystem can be a MBSS and the subsurface subsystem can be a RTMSS. Such systems may be referred to as MSS. As an example, a downhole tool can include a RTMSS.

The systems 1800, 1900 and 2000 are illustrates with respect to example workflows, where particular types of measurement (NMR in FIG. 18), to a suite of measurements for optimizing another one (FIG. 19), to a joint downhole measurement optimization (FIG. 20) are presented.

The tool responses (R) used in the MBSS are data obtained from the tools of similar characteristics in the past and/or from simulations based on the reservoirs that the logging job will be performing at. It is possible to distinguish the tool responses, R, from DATA acquired while executing the dynamic optimization workflow. Below some definitions and examples of various components in the systems 1800, 1900 and 2000 are given.

As an example, for a dictionary, each dictionary entry can include tool responses, {R(i)}, and a corresponding parameter set, {P(i)}. The dictionary response can be obtained in one or more ways. For example, consider one or more of the following: simulation of tool responses from a wide range of $T_2$ distributions, or $T_1$-$T_2$ spectrum, D-$T_2$ spectrum, or higher dimension spectrum such as D-$T_1$-$T_2$; theoretical prediction based on the range of formation and oil/gas properties, for example, light oil tends to exhibit longer $T_1$ and $T_2$ and large diffusion coefficients; and previous logging results for a particular basin, region, country, area or world. As an example, an approach may utilize a combination of different dictionaries.

In practice, a dictionary response can be constructed from existing logs for particular reservoirs. For example, logs from the Permian basin in Texas tend to have quite different characteristics from those of the Ghawar field of Saudi Arabia due to different formation and oil properties. Therefore, a dictionary response of the Ghawar field and a dictionary response of the Permian basin can be substantially different.

For a particular region, for example, as more logging data become available during exploration, the dictionary may be constantly updated to better reflect the range of formation properties in a region/basin and/or new tools and measurements that were previously not considered for dynamic optimization. When exploring a new field with very little prior data, a more generic dictionary may be used, such as one based on similar formations and/or on geophysical understanding. In two dimensional measurements, such as $T_1$-$T_2$ maps, different regions of spectra can represent different fluid/rock species, and can be used as an a priori for constructing the dictionary entries.

FIG. 21 shows an example of a multidimensional space for unconventional basins 2110 and an example of a multidimensional space for conventional basins 2130. As indicated, $T_1$ and $T_2$ times map to different types of materials in the spaces 2110 and 2130. For example, the space 2130 includes a gas region while the space 2110 includes a bitumen and kerogen region.

As an example, a method can include selecting one or more optimal parameter sets. For example, once a dictionary response is obtained, an optimal parameter set for each R entry can be determined. One or more techniques may be utilized to determine a parameter set.

As an example, a method can include determining an optimal parameter set based on local petrophysical knowledge. For example, if a CPMG signal decays rapidly (e.g., $T_2$~0.1 second), then the wait time (WT) can be relatively short (e.g., 1 sec). As to another example, where the signal in $T_1$-$T_2$ measurement falls into a short $T_1$ and $T_2$ region, with $T_1/T_2>1$, this embodies the characteristics of shale formations (see, e.g., the unconventional space 2110). As a result, an optimized shale sequence ($T_1$-$T_2$ sequence) can be used. In contrast, an optimized light-oil sequence can be applied in the presence of a relatively long $T_1$ and $T_2$ characteristics in another response.

As an example, a method can include determining an optimal parameter set based on statistical analysis of a response. For example, for a given tool response, a method can include performing statistical calculations on the response to determine which parameter set P results in a constructed model (or models) of minimal uncertainty.

As an example, a method can include dictionary compression. For example, once a dictionary (e.g., response and parameter set) is obtained, the dictionary can be compressed to a data structure of reduced size. As an example, a compression can be performed in one or more manners. For example, consider responses directly compressed to reduce memory demand. For example, among various data points for each tool response, some data points may be pertinent while others may be discarded. As an example, a response can be compressed by one or more mathematical methods such as, for example, singular value decomposition (SVD), principal component analysis (PCA), etc. As an example, one or more machine learning methods can be used to compress a dictionary into one or more of a variety of data structures, such as, for example, decision trees, supervised-learning classifiers, artificial neural networks.

As an example, a result of a compression operation can be a RT model. Such a model may be highly tool- and/or region-specific for a particular logging operation. Before the operation, the RT model may be constructed and deployed onto a RTMSS in a logging instrument for execution.

As an example, an RT modeler can be implemented as a decision tree, a supervised-learning classifier, an artificial neural network, or in another manner. As to a decision tree approach, consider a decision tree data structure that optimizes $T_2$ measurements, assuming multi-exponential decay kernels. As to a SVM approach, consider a SVM-based classifier that takes a set of $T_1$-$T_2$ results, and provides the optimal sequence number for next measurement.

As to SVM training, below is an example for constructing a RT model in MATLAB programming language code (MathWorks, Inc., Natick, Mass.) using a multiclass SVM classifier:

% set default parameters
t=templateSVM('Standardize',1,'SaveSupportVectors', true);
% obtain the SVM classifier
RTM=fitcecoc(Dictionary_Response, Dictionary_P, 'Learners',t);
% Use the classifier to predict the parameter based on the input data DATA Predicted_P=predict(RTM,DATA);

In the foregoing example, fitcecoc is a multiclass classifier, in which a linear SVM is utilized for the construction. Above, Dictionary_Responses includes the entire tool responses and Dictionary_P the corresponding optimal parameter sets. RTM is the generated real-time model. When deployed in a logging instrument, the RTM will return the optimal parameter sets given the acquired DATA.

An implementation of an SVM approach is described further below with respect to FIGS. 29 to 34 where synthetic data are generated for training a SVM and where log data are utilized to assess results of a trained SVM.

Whether using a decision tree approach, an SVM approach or another approach, as an example, a workflow can be designed so that two subsystems (MBSS and RTMSS) operate independent of one another. As an example, a RTMSS and associated logging sensors can perform without real-time interventions of a MBSS.

Below, various examples pertaining to a decision tree approach are described with reference to FIGS. 22 to 28. As an example, a method can include using a decision tree for optimizing $T_2$ measurements. In this example, probable tool responses are considered in advance, and their corresponding optimal acquisition points are calculated and stored in a decision tree data structure. Such a lightweight decision tree can be readily loaded in the memory of downhole tool circuitry (e.g., using FPGA and/or DSP circuitry), and can be executed as real-time data streams taken in from one or more logging sensors.

As to decision trees, consider, as some examples, a 1-exponential kernel and a 2-exponential kernel. For a 1-exponential kernel, the kernel can include a single-exponential function:

$$D(t) = A\, e^{-t/T2} \quad (9)$$

where D is the time-domain signal. Amplitude, A, and $T_2$ are two unknown fluid properties. In this example, the dictionary can be constructed by considering 100 linearly spaced A's between 0 and 2 and 100 logarithmically spaced $T_2$ s between a time of $10^{-3}$ and 1 s.

Figure 22:
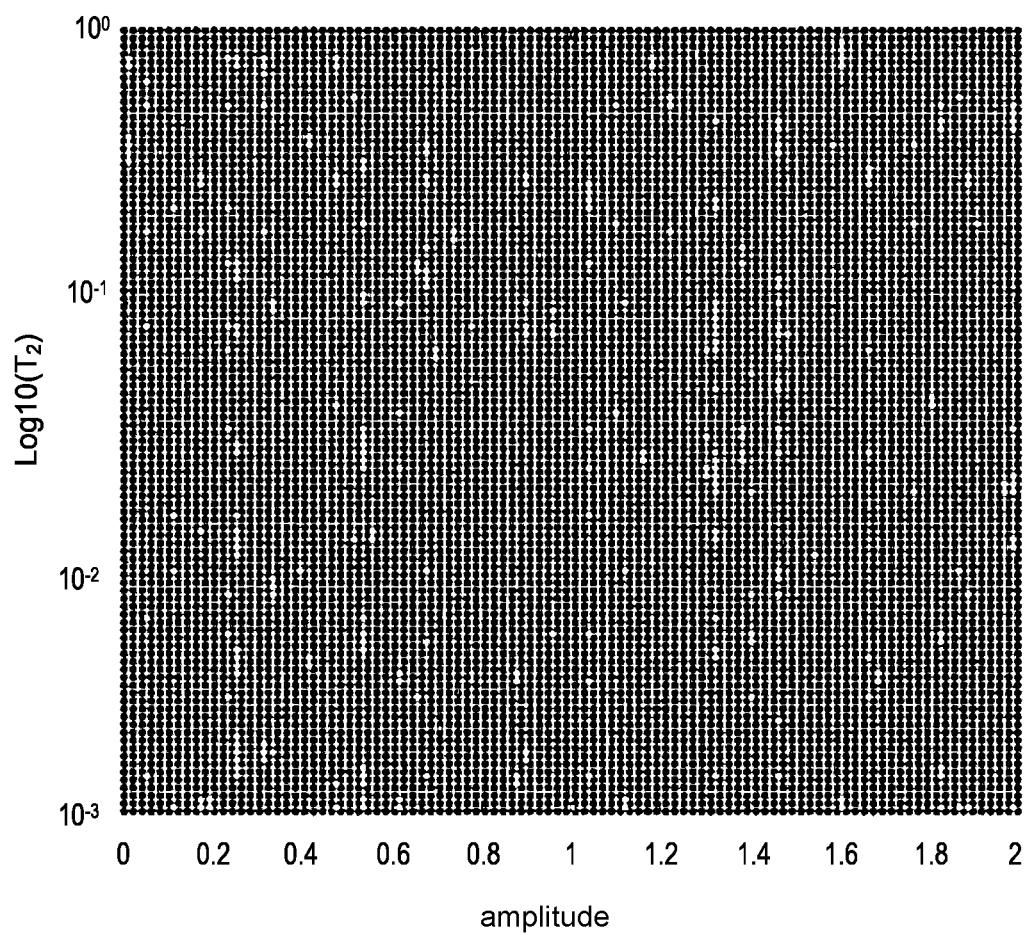
FIG. 22 illustrates an example of a parameter space of a measurement model.

FIG. 22 shows an example plot 2200 of an amplitude and $\tau_2$ space (log 10) with approximately 10,000 probable combinations of $\{A, T_2\}$.

In such an approach, the acquisition variables are 100 logarithmically spaced t between $10^{-3}$ and 3.3 s. Such an approach can use $\{R(t)\}$ to denote the 10,000 probable tool responses in a time domain, for example, with the size of approximately 8 MB. An optimization goal can be to find the sequence of $\{t\}$, the parameter set, that most efficiently determines sample A and $T_2$.

As an example, a method can include a compression process that involves pre-calculating a probable $\{ti\}$ sequence. For example, consider establishing a suitable model and a range of possible system parameters, deducing a maximum uncertainty of the parameter space in a time domain, and acquiring one data point at t1. Given a measurement SNR, the process can divide $\{R(t1)\}$ into N bins, where N=max($\{R(t1)\}$)×SNR/max(A). In such an example, for the ith bin, the process can locate t that corresponds to the maximum variance of the subset of $\{D(t)\}i$ and assign the value to t2,i. Such a process can perform the same calculations for i=1, 2, . . . N, iterate and exit when no more bin divisions are possible.

As an example, a method can include obtaining a set of cascades of $\{t\}$ sequences, intermediated by prospective signal amplitudes. In such an approach, the pre-calculated results can be packed in a decision tree.

Figure 23:
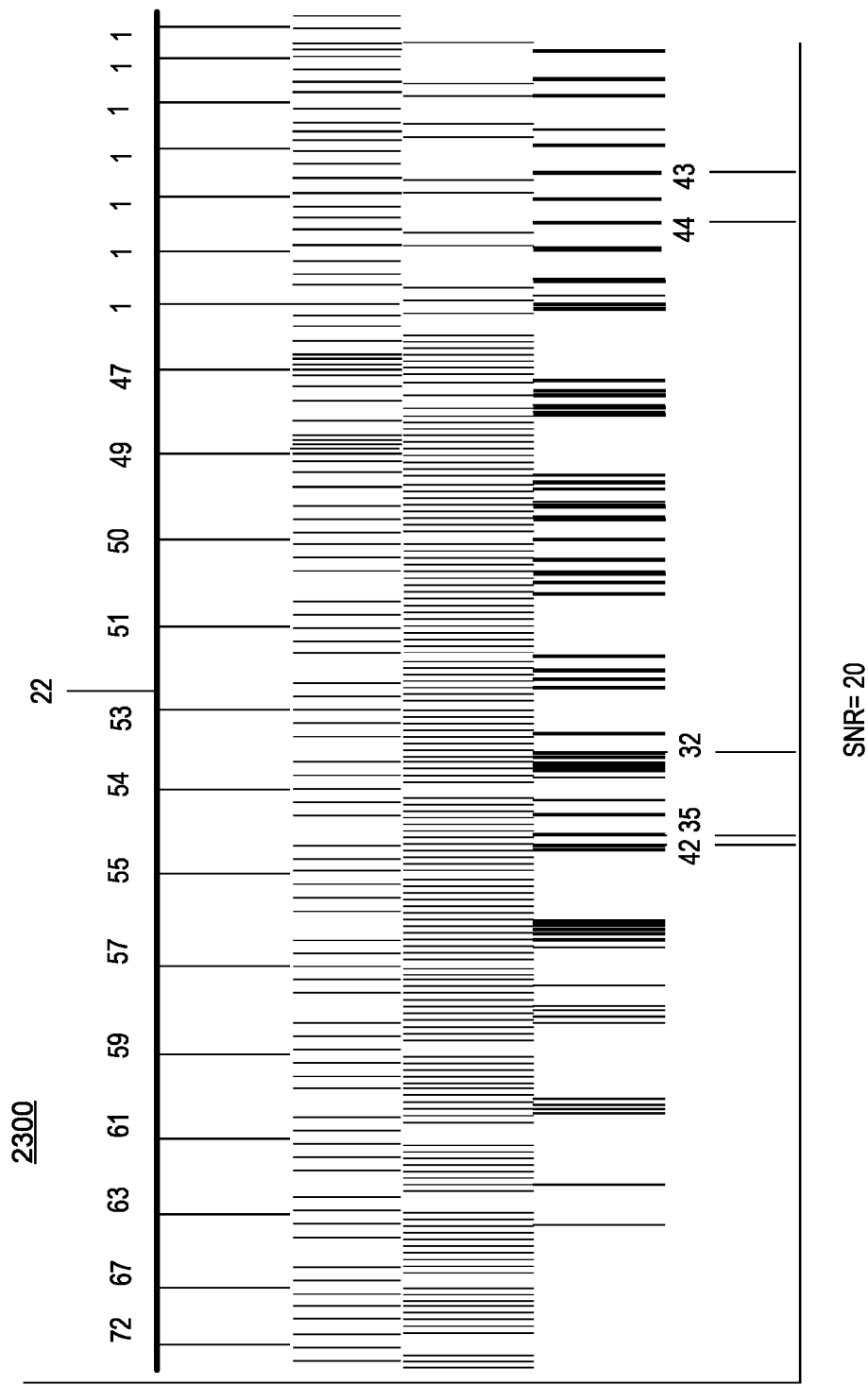
FIG. 23 illustrates an example of a decision tree of a measurement model.

FIG. 23 shows an example of a decision tree 2300 that can be rendered with information such as gradations as to statistical means. For example, various lines in the decision tree 2300 can be color coded or otherwise coded with respect to statistical means. Specifically, in the example of FIG. 23, the decision tree 2300 is for an assumed SNR of 20 where each layer of the decision tree 2300 represents an iteration of data acquisition events coded with numbers on top of each node for chosen indexes of t (from 1 to 100). As mentioned, gradations can be included that represent mean, for example, coded in a range from 0 to 2. The code is the mean within each bin, mathematically written as mean($\{R(t1)\}i$), with i=1, 2, . . . N, for the first layer.

Figure 24:
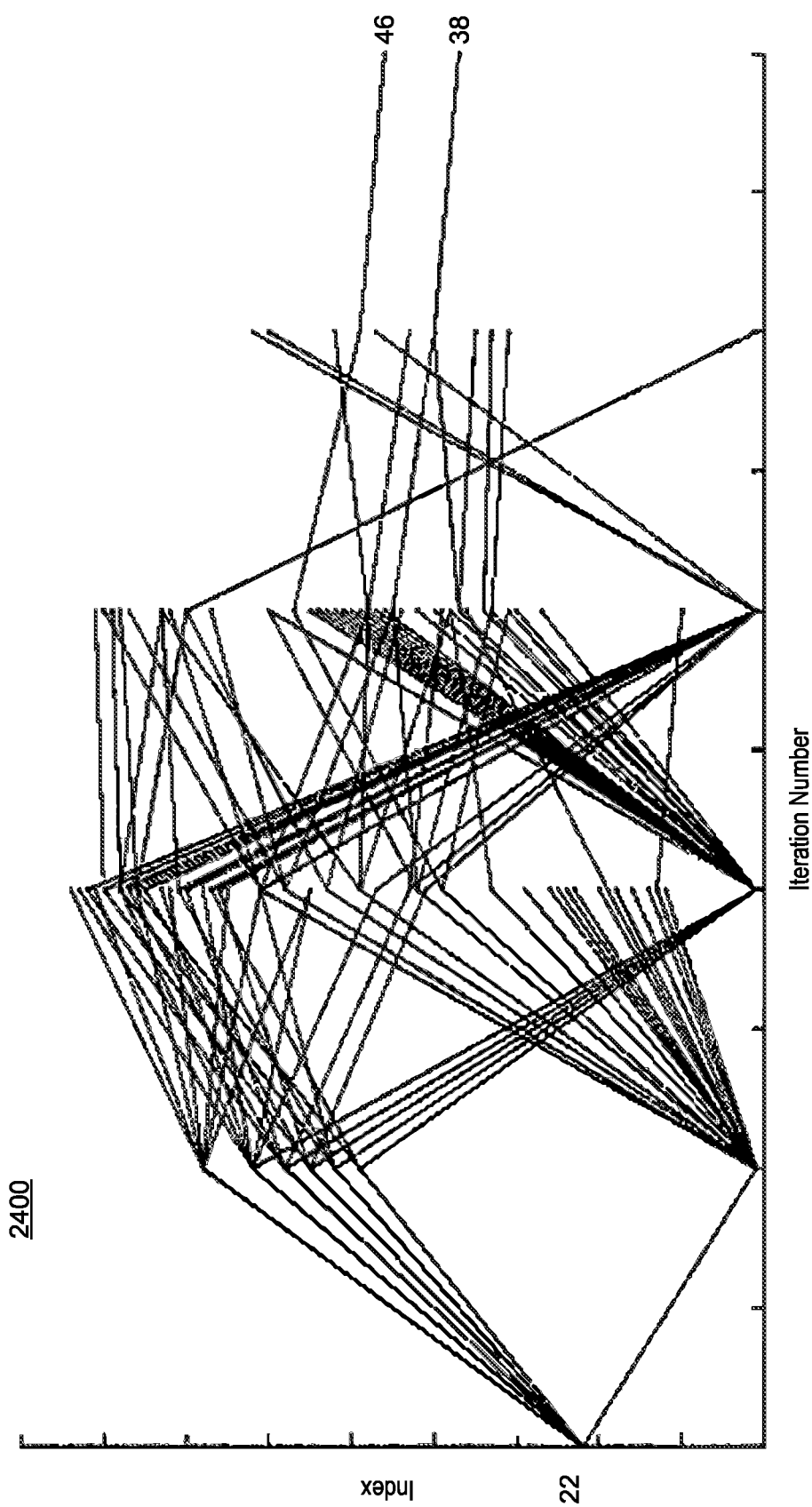
FIG. 24 illustrates an example of a decision process of a measurement model.

FIG. 24 shows an example of another tree structure 2400 that corresponds to the decision tree 2300 of FIG. 23, where the indexes are plotted as a function of the number of iterations.

In the example of FIG. 23, the decision tree 2300 is less than 200 KB (using double-precision floating point format, which can be further compressed). It is deterministic and inclusive, meaning that probable NMR signals are considered and that no time-consuming calculation such as sampling is demanded while running on an edge device. The computation involves comparing an acquired signal to the upper and lower bounds of each bin. In a worst case scenario, the maximum amount of computational operations is DT×SNR, where DT is depth of the decision tree. In the example shown, the worst case scenario is 5×20=100 (e.g., a relatively small number).

FIG. 25 shows example plots 2510, 2530 and 2550 that are from running the decision tree by feeding in a simulated data set of varying $T_2$ and A. In the three cases, the algorithm converged to appropriate numerical values of the system parameters (black circle) in three or four iterations.

As to a 2-exponential kernel, consider, as an example, a double-exponential function:

$$D(t) = A_{21} e^{-t/T21} + A_{22} e^{-t/T22} \quad (10)$$

As an example, a process can be executed in a manner akin to that of the 1-exponential kernel to generate a corresponding 2-exponential kernel decision tree.

Figure 26:
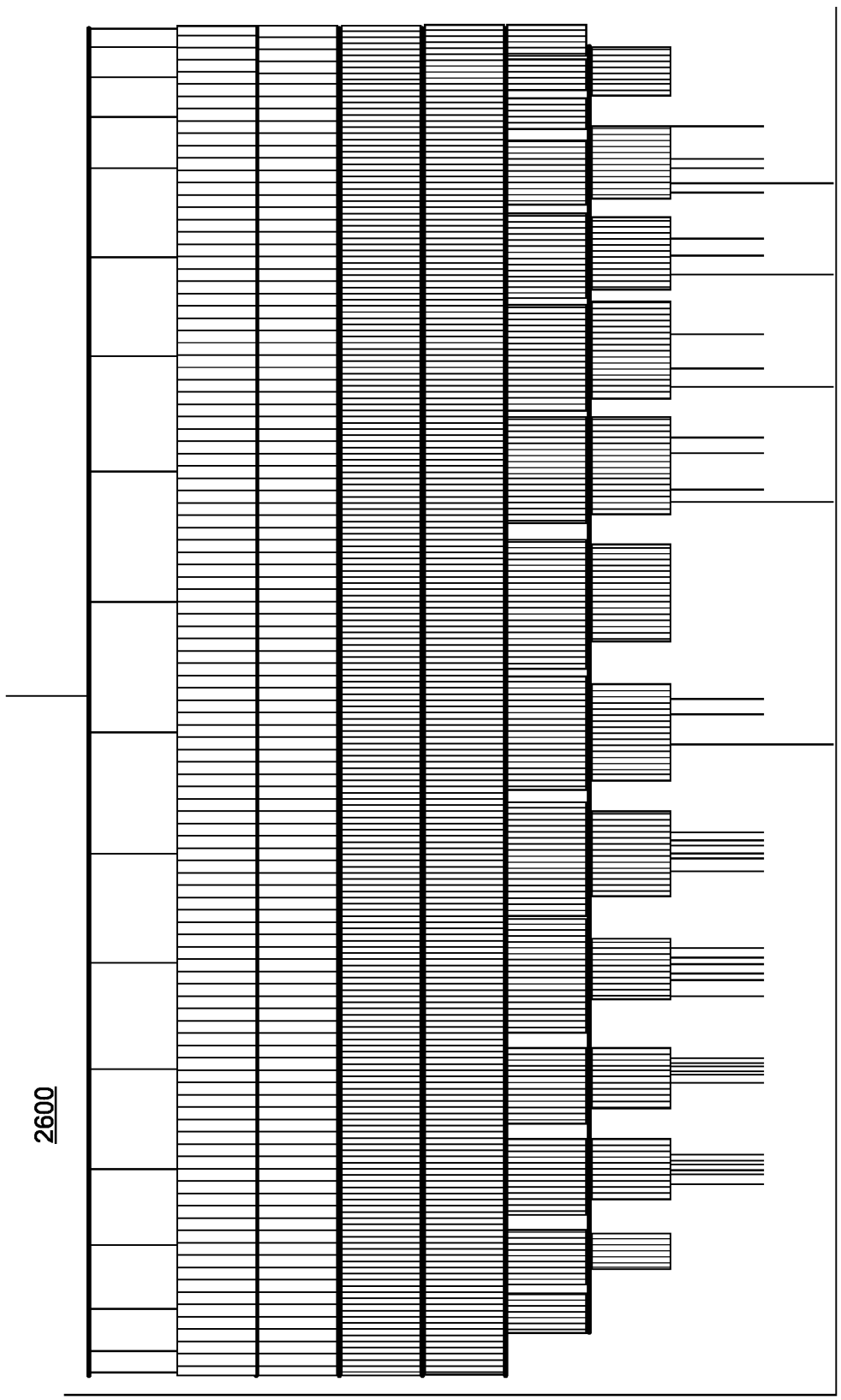
FIG. 26 illustrates an example of a decision tree of a measurement model.

FIG. 26 shows a graphical approximation of an example of a decision tree 2600 that corresponds to a 2-exponential kernel. In comparison to the decision tree 2300, the decision tree 2600 is more complex. As an example, an approach may be tailored to equipment. For example, depending on memory availability, processing speed, etc., an approach may implement a particular decision tree with an associated complexity. For example, in some instances a 1-exponential kernel decision tree may suffice while in other instances a 2-exponential kernel decision tree may be suitable. As an example, a process may optionally include selecting a particular decision tree model for a particular type of downhole tool, a particular type of sensor, etc.

Figure 27:
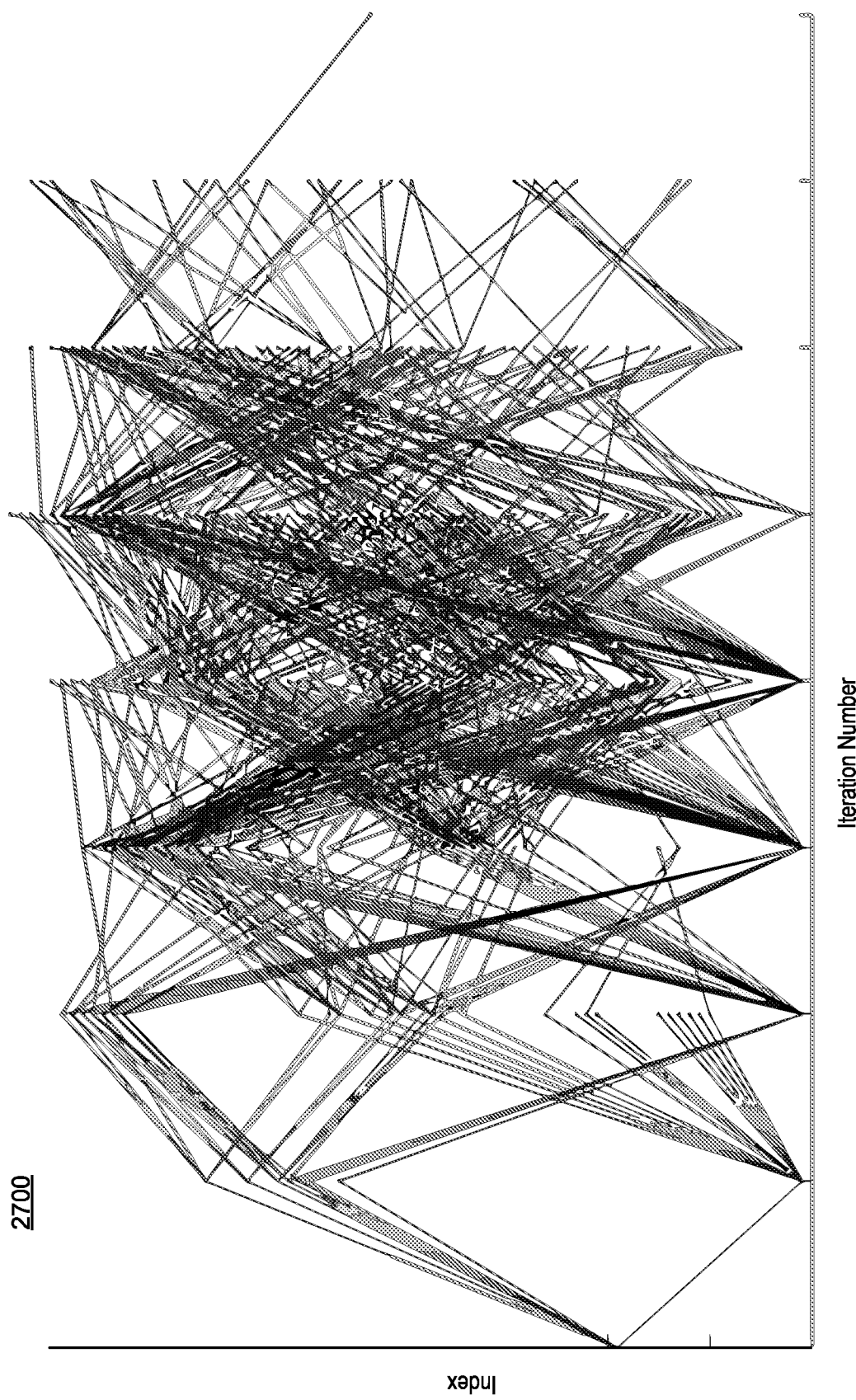
FIG. 27 illustrates an example of a decision process of a measurement model.

FIG. 27 shows an example of a tree structure 2700 as index versus iteration number that corresponds to the decision tree 2600 of FIG. 26. The tree structure 2700 may be compared to the tree structure 2400 of FIG. 24.

As to the decision tree 2600 and the tree structure 2700, a process constructed a dictionary from A's of 100 linearly spaced numbers from 0 to 1, and $T_2$s of 90 logarithmically spaced numbers from $10^{-3}$ s to 1 s. The total number of probable combinations for such an example is (100×100) 2=108. In conjunction of 100 t's, the complete dictionary includes 1010 (double) floating points, amounting to approximately 80 GB. As an example, a method can reduce size of a structure. For example, consider randomly sampling 5×106 $\{A, T_2\}$ combinations to generate a dictionary of approximately 4 GB.

As an example, assuming a measurement SNR of 20, a method can include generating probable $\{ti\}$ sequences.

Such a generated tree can have a size of less than approximately 50 MB, and a maximum number of operations of 200 (20×10=200).

Figure 28:
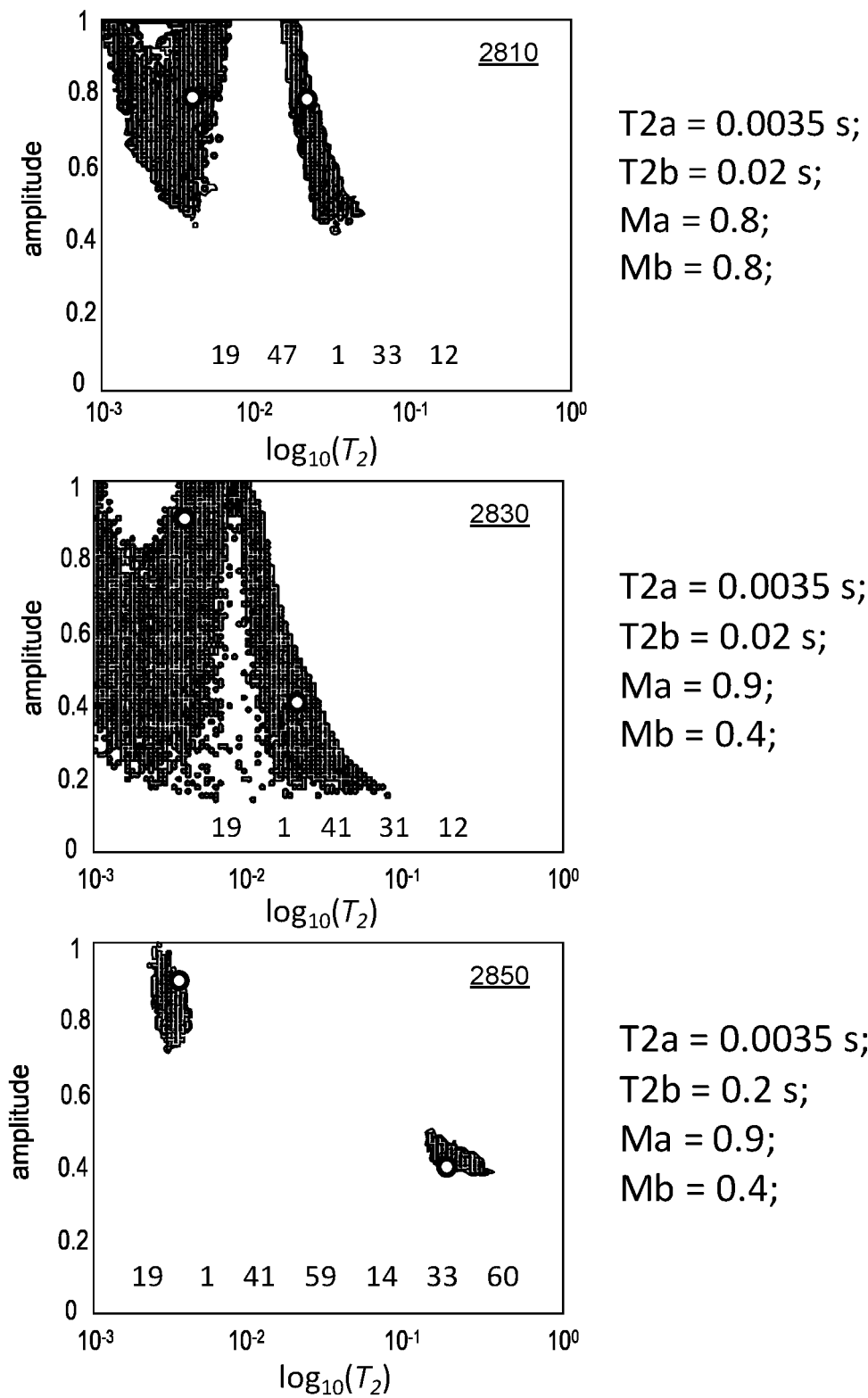
FIG. 28 illustrates examples of decision spaces of a measurement model.

FIG. 28 shows example plots 2810, 2830 and 2850 that correspond to measurements of different "ground truths" and their respective optimal {ti} sequences. Each of the plots 2810, 2830 and 2850 includes a listing of "t index" {ti} values (e.g., 19, 47, 1, 33, and 12; 19, 1, 41, 31, and 12; and 19, 1, 41, 59, 14, 33, and 60). Each plot includes open circles that correspond to $T_2$ and M pairs (e.g., n-tuple where n is 2).

As an example, a method can include using a SVM-based classifier for optimizing $T_1$-$T_2$ measurements. For example, consider using an SVM classifier to optimize NMR $T_1$-$T_2$ measurements on-the-fly. In such an example, consider a set of pulse sequences for $T_1$-$T_2$ measurements, where each is suitable for certain $T_1$-$T_2$ combinations corresponding to petrophysical signatures of certain formation/fluid types. For example, consider the plots 2110 and 2130 of FIG. 21 for unconventional and conventional signatures, respectively.

As an example, a method can include setting an objective that aims to dynamically select among the sequences for future measurements based on the current available results. In such an example, consider the following kernel:

$$D(t_{1i}, t_{2i}) = \sum_{k=1}^{n} A_k (1 - e^{-t_{1i}/T_{1k}}) e^{-t_{2i}/T_{2k}} \quad (11)$$

where n is the number of fluid species under consideration, $t_{1i}$ and $t_{2i}$ are the $T_1$ and $T_2$ encoding times for the ith sequence number i. As an example, a measurement protocol as in FIG. 15 may be utilized.

As to misclassified entries, a method may involve one or more types of analysis. For example, an analysis found that misclassified entries in a group of entries were "borderline cases", which means those tool responses can be assigned to more than one favorable parameter sets. As an example, a trained classifier was applied to 1,000 newly generated datasets where results exhibited an extremely low error rate.

As an example, a method can include statistical analysis of tool responses to determine an optimal parameter set P. For example, consider a workflow that includes determining an optimal P given a tool response. Such a workflow can involve optimally choosing one out of a dozen parameter sets (such as the choice of the suite of pulse sequences in a $T_1$-$T_2$ logging job). In such an approach, calculations may be conducted at a HPC facility on surface in a two-stage computing infrastructure.

For a particular experiment (a pulse sequence, or a suite pulse sequences), an expected signal can be a function of experiment parameters and sample properties, which include sample $T_1$, $T_2$, diffusion coefficient, chemical shift, etc. For example, consider a signal equation described as follows:

$$S = f(P; W) \quad (12)$$

where S is signal, where f is the forward models, such as shown in Equations (9) to (11), and where W is the set of properties that is a list of numbers.

One computation can be the variance of signal. Since a signal is defined by a series of numbers, $S = \{s_1, s_2, \ldots\}$, a list of signals can be described as S(k) where k=1 to N, and $S(k) = \{s_1(k), s_2(k), \ldots\}$. The variance of $s_i$ can be defined as, for example:

$$v_i = \frac{1}{N} \sum_{k=1}^{N} (s_i(k))^2 - \left(\frac{1}{N} \sum_{k=1}^{N} s_i(k)\right)^2 \quad (13)$$

where the variance for the signals is then $V = \{v_1, v_2, \ldots\}$.

For a given response R, a method can involve the task of determining a collection of W that is consistent with the response within instrument noise (e.g., measurement tool noise). Such a task can involve computing standard deviation between the response and the signal $\{s_1, S_2, \ldots\}$ (e.g., via Eq. (12)) as represented by S:

$$\frac{1}{n} \sum_{i=1}^{n} (r_i - s_i)^2 < \alpha \sigma^2$$

where n is the number of data points in the response, σ is the variance of the noise of the instrument, α is the parameter that determines the statistical likelihood (e.g., 1-2, as may also depend on the construct of dictionary entries).

For a given response, many values of the properties may be consistent with the response. For example, a method may obtain an ensemble of such properties, collectively called a solution ensemble, $W = \{W1, W2, \ldots\}$. For example, consider a two parameter approach with P1 and P2 (where 1, 2 is the index of k in Eq. (13), with N=2). In such an example, the purpose is to choose either P1 or P2 as the optimal measurement parameter sets for a given tool response.

As an example, a statistical analysis can be performed as follows: determine the appropriate signal equation, such as in Eq. (11); for a given response R, determine the ensemble of property W that is consistent with the response within the instrument noise, as shown in Eq. (13); use the list of W obtained to compute the simulated signal, NS1 for P1 (noting that NS1 is a list of signals, each corresponding to a Wi: NS1(i)=f(P1, Wi)); obtain the average of NS1: $\overline{NS1} = \{\bar{s}_1, \bar{s}_2, \ldots\}$; use $\overline{NS1}$ to find the corresponding ensemble of properties, W1; use W1 to simulate a series of signal for a parameter list PF: S1=f(PF; W1), for the W1 ensemble where PF is a parameter list that encompasses both P1 and P2; calculate the variance of signal $S_1$ to obtain $V_1$; Repeat for P2 and obtain $V_2$; and compare the variance $V_1$ and $V_2$ to determine the optimal parameter sets (P1 or P2).

In such an example, $V_1$ and $V_2$ can be vectors with n numbers where the mean variance can be used to select a parameter set with a smaller mean variance as the optimal parameter set (optimal P).

As an example, an alternative approach can include using the maximum value of $V_1$ and the maximum value of $V_2$ to determine the optimal P, for example, by using P of the smaller maximum variance. As an example, another approach can include using one or a few elements in the variance vectors and comparing means such that the parameter set with a smaller variance can be selected to be the optimal parameter set (e.g., optimal pulse sequence).

As an example, one or more approaches can be extended to compare three or more parameter sets (e.g., pulse sequences). As an example, one or more other criteria can be used to select the optimal parameter set. For example, consider a measurement time as being a criterion such that a shorter experimental time can be utilized for selecting the optimal P.

As mentioned, an approach may utilize a support vector machine (SVM), which may be a trained machine. As an example, a method can include training a SVM.

As an example, a SVM approach can be utilized to implement cognitive NMR and/or other types of sensor-based measurements. For example, a trained SVM may be utilized to make a tool that can self-reconfigure in real time responsive to various inputs such as, for example, inputs of internal and/or external sensory channels.

As an example, a tool can include components that provide it with the capability to reconfigure in real time as it senses a changing environment. Such a tool may provide for intelligent in-time PHM (prognostic health management), for example, by determining how the tool performs in different environments. While various examples describe concepts and deployment impact in the context of NMR logging, as mentioned, one or more other types of logging (e.g., wireline, drilling, non-NMR, etc.) may be implement such concepts.

As an example, a NMR logging job can be divided into three distinct phases. A first phase can involve job planning, which demands a highly trained expert, such as a domain champion or a seasoned petrophysicist, spending a few hours to days running reservoir models and iterating until a satisfactory measurement protocol is generated. During that phase, many decisions are made based on prior experience or educated guesses. Once generated, a measurement protocol can be loaded and calibrated with the tool.

In a second phase, downhole job execution occurs where the sensor runs the protocol through an entire logging interval. While a reduced dataset may be available in some instances (e.g., where telemetry is available) as a relatively continuous stream for real time inversion and answers to product extraction at the surface, a full data stack is generally unavailable during the downhole logging operation.

After the downhole logging job execution occurs and the tool is brought to surface, one or more full datasets can be retrieved from tool memory and analyzed using an appropriate framework (e.g., TECHLOG framework, etc.). Such a framework can be used to provide answer products for delivery to a client (e.g., a logging job client).

An NMR measurement protocol tends to be optimal for a particular logging job and the degree of optimality depends on knowledge of conditions, material types, etc., downhole, as well as an instrument's operating envelop. Executing one protocol through an entire job tends to result in tool under-utilization, often yielding suboptimal data and/or prolonged operating time. Where job planning is flawed, due to operator error, inaccurate reservoir modeling, or another unforeseen factor, bad data are a common result. Furthermore, the domain knowledge, extracted from the datasets and answer products, is largely captured in the minds of experts, rather than in a digital format that is both quantifiable and scalable.

As an example, a workflow can be enabled by edge processing and computing that allow for real time optimizations of tool operation and supervised learning techniques as may run on in a cloud environment (e.g., DELFI environment, etc.) that can result in ever-improving measurement methods. For example, consider a system that trains a supervised learning model with past logs and simulated datasets, where an acceptable forward model exists. Such an approach may be performed in conjunction with explicit design rules for optimal tool performance. As an example, a reduced learning model such as a RT model (RTM) can be loaded into memory of a downhole tool. Real time optimization of operation may be performed during a job and, upon delivering the derived answer products, the acquired logs can become part of a region-specific database that may be used to further refine and improve the learning models.

In an adaptive workflow, various previously distinctive job phases can coalesce. In particular, two iterative procedures, one at a fast time scale in the real time of logging and one at a slower time scale in the cycles of logging jobs, can be performed in a continuous or other manner to improve quality and efficiency of logging operations.

As mentioned, cognitive NMR can utilize an adaptive workflow for NMR logging where a tool can reconfigure in real time responsive to one or more factors, such as one or more of tool conditions and downhole conditions. As an example, consider an operation that involves LWD NMR in which two $T_1$ $T_2$ pulse sequences (PS) are compared.

As example, consider two pulse sequences (PS1 and PS2) where each is composed of six segments, each of a CPMG train of the same number of echoes and of the same number of phase cyclings (NPC). These two PSs can vary considerably in other parameters such as, for example, wait time (WT in ms), echo time (TE in us), and the number of repeats (NR). Consider PS2 taking 11.46 s to run while PS1 has almost twice the amount of runtime (22.72 s). In such an example, given a sample, PS2 can generate data with a 50% higher SNR than PS1 in a unit time. However, some caveats exist. With substantial longer wait times (WT), PS1 is more suitable to apply to formations of long $T_1$ components than PS2. Yet use of PS1 on reservoirs of relatively short Tis can be inefficient, resulting in an undeserved poor data quality. In contrast, PS2 is limited to samples of maximum $T_1$<80 ms due to its longest WT of 400 ms. In fact, using PS2 on reservoirs of $T_1$>80 ms could possibly miss out on free fluids (e.g., those fluids with relatively long $T_1$s), leading to an erroneous porosity reading. Therefore, it is beneficial to deduce formation type to provide acceptable accuracy. As an example, a tool can be configured with an ability to deduce formation type and/or another type of condition (e.g., or change in condition, etc.) and, in response, adjust the tool. Such an approach may be executable in real time and allow for determinations as to which PS to apply for making measurements.

Table 1 below shows the PS1 and PS2 examples.

|  | 1 | 2 | 3 | 4 | 5 | 6 |
|---|---|---|---|---|---|---|
| PS1: 22.72 s |  |  |  |  |  |  |
| WT (ms) | 800 | 2000 | 256 | 64 | 16 | 4 |
| TE (μs) | 1000 | 1000 | 800 | 600 | 600 | 600 |
| NE | 1024 | 1024 | 256 | 64 | 16 | 8 |
| NR | 1 | 1 | 2 | 8 | 64 | 32 |
| NPC | 1 | 2 | 2 | 2 | 2 | 2 |
| PS2: 11.46 s |  |  |  |  |  |  |
| WT (ms) | 400 | 200 | 50 | 30 | 8 | 4 |
| TE (μs) | 800 | 800 | 600 | 600 | 500 | 400 |
| NE | 1024 | 1024 | 256 | 64 | 16 | 8 |
| NR | 1 | 2 | 4 | 8 | 64 | 64 |
| NPC | 1 | 2 | 2 | 2 | 2 | 2 |

The two pulse sequences PS1 and PS2 were utilized to generate corresponding simulated $T_1$ $T_2$ datasets through forward modeling, with a one-scan Gaussian noise of 0.3 in amplitude. The simulated data are acquired by running PS1×1 and the simulated data are acquired by running PS2×2, back-to-back. The sample has bimodal distributions of equally weighted {$T_1$, $T_2$}s at {5 ms, 3 ms} and {70 ms, 80 ms}. As mentioned, there is noticeably enhanced SNR for PS2 compared to PS1.

In practice, probable pulsing and acquisition schemes go beyond the two examples given above (PS1 and PS2) and benefits can extend beyond improving data quality. For example, downhole power can often exhibit a temporal variance for LWD tools and correspondingly a throttle feature may be used to optimize tool performance under certain power envelops. The real time sensing and classification of power availability can be within the realm of cognitive NMR. For example, a tool can include features that provide the tool with a cognitive ability to adjust its circuitry in a manner that accounts for power (e.g., a reduced power pulse sequence where power is "low", a more power intensive pulse sequence where power is "high", additional processing where power is "high", limited processing where power is "low", etc.).

As an example, an approach to configuration may be described with respect to a matrix such as an N×N matrix to visualize a fast optimization routine. In such an example, one axis can represent states of a logging tool (e.g., either externally, such as formation types, or internally, such as available power) and another axis can represent optimal operating modes. An optimization goal can be to maximize the tool operation in diagonal quadrants. For example, consider a vertical axis as being, from bottom to top, protocol_low_power, protocol_bound_water, protocol_free_water and a horizontal axis as being, from left to right, free_fluids, bound_fluids, and low_power. In such an example, the diagonal entries can be the optimal states where for corresponding conditions of free fluid, bound fluid and low power, respectively.

Owing to the rather limited telemetry bandwidth in various operation and/or equipment, a real time modeler for LWD NMR may be executable in its entirety in a downhole tool using downhole tool circuitry (see, e.g., FIG. 10).

As mentioned, a SVM can be a machine learning model, which may be referred to as a trainable model, which can be trained to generate a trained SVM (e.g., trained machine learning model, etc.).

As an example, a method can include supervised learning for a SVM classifier where a trained SVM classifier can be utilized to inference results. To demonstrate an approach to training, consider datasets from an Alaska field test using a tool where information of drilling condition and reservoir properties are available. The datasets are acquired using the aforementioned pulse sequence PS1 as in Table 1, above. As explained with respect to the logs of FIG. 11, $T_2$ distribution data can be plotted versus a logging interval. As to the Alaska field data, the logging interval is over 2,500 ft (e.g., over approximately 800 meters). In the Alaska field data, the $T_2$ values span from about a few milliseconds to hundreds of milliseconds. $T_1$ values also vary over similar numerical decades.

As an example, a workflow can include preparing a suite of synthetic datasets according to a known forward model followed by using the simulated data to train a supervised learning model. Such a workflow can then use the trained model to classify acquired field datasets with respect to underlying formation types. Such an approach can provide flexibilities as to the learning model, for example, by incorporating various different classification criteria.

Training of a model through supervised learning can involve utilization of a relatively large number of high-quality datasets. While training data can include past logs (e.g., from a common reservoir, etc.), an approach can use forward modeling to generate synthetic (e.g., simulated) datasets. As an example, simulated datasets may be used when field data are either scarce or scarce for various reasons (e.g., proprietary, etc.). To help ensure training quality, simulated datasets can be generated that embody similar characteristics to field data, with the same sample properties. An underlying forward model of a NMR $T_1$ $T_2$ sequence can be as follows:

$$S(t) = \sum_{n=1}^{n=N} \mu_n \left(1 - e^{-WT/T_{1,n}}\right) e^{-NE \cdot TE/T_{2,n}} + \epsilon \qquad (14)$$

where S is the time-domain signal, n (=1, 2, . . . N) is the component of $\{T_1, T_2\}$ pairs with corresponding porosity, μ, and relaxation times $T_{1,n}$ and $T_{2,n}$. WT is wait time, NE is the number of echoes, TE is the echo spacing, and E is the tool noise (which may be approximated by a Gaussian distribution).

Figure 29:
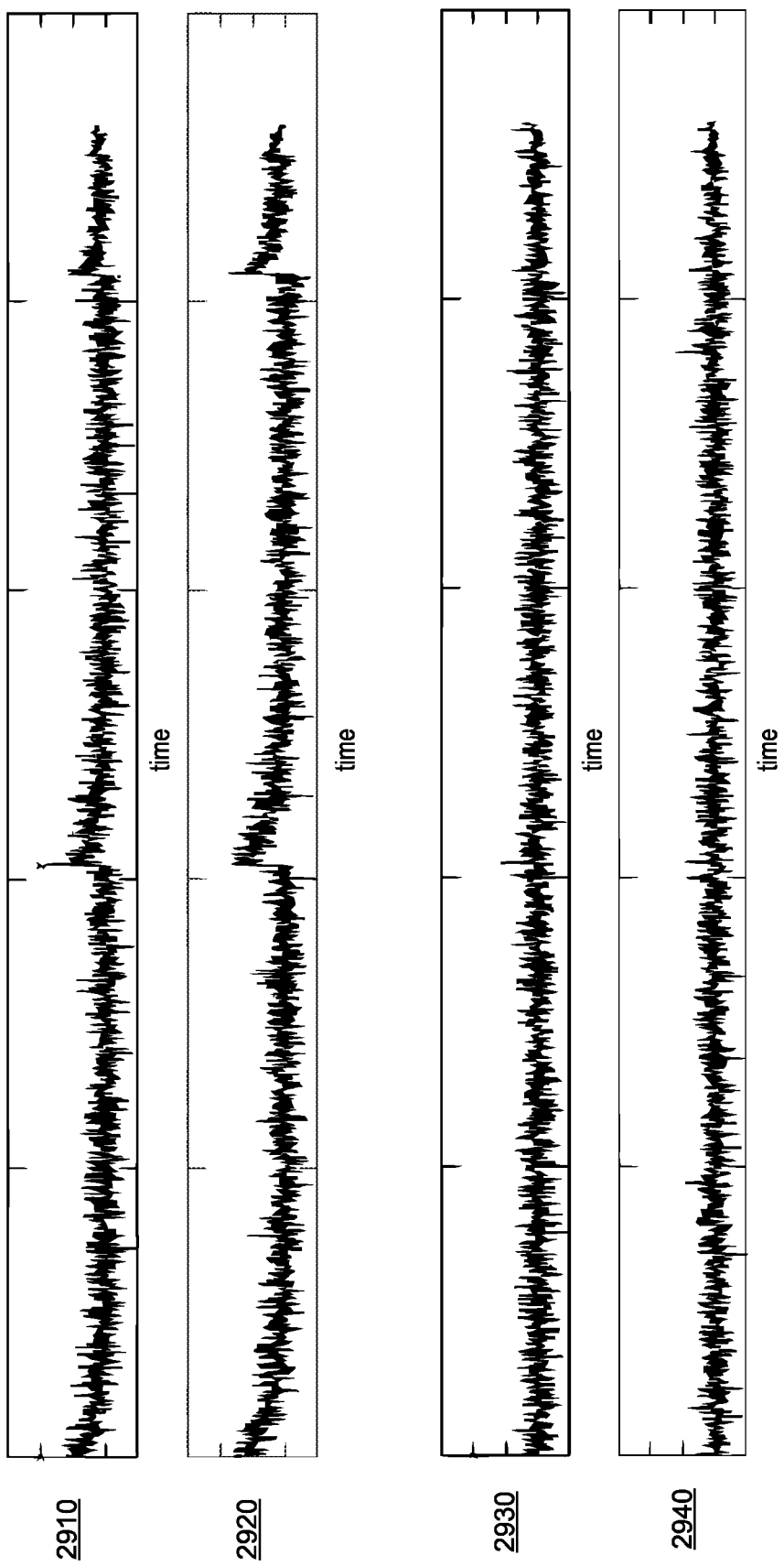
FIG. 29 illustrates examples of data and simulated data.

FIG. 29 shows a side-by-side comparison between simulated data and field data with the same underlying $T_1$ $T_2$ distributions. With a proper added noise, the simulation mimics the field data with acceptable. Validity of the synthetic data approach for training is also demonstrated in the example shown in FIG. 33.

In FIG. 29, acquired and simulated datasets are shown as rows 2910, 2920, 2930 and 2940. Rows 2920 and 2940 are the time-domain field data, with the respective simulated data in rows 2910 and 2930 of the same underlying $T_1$, $T_2$ distribution.

To train a learning model, a method can include classification criteria and data labeling. Explicit rules by which labels are generated are called classification criteria. With the same training data, different classification criteria can be applied to partition the data differently.

Figure 30:
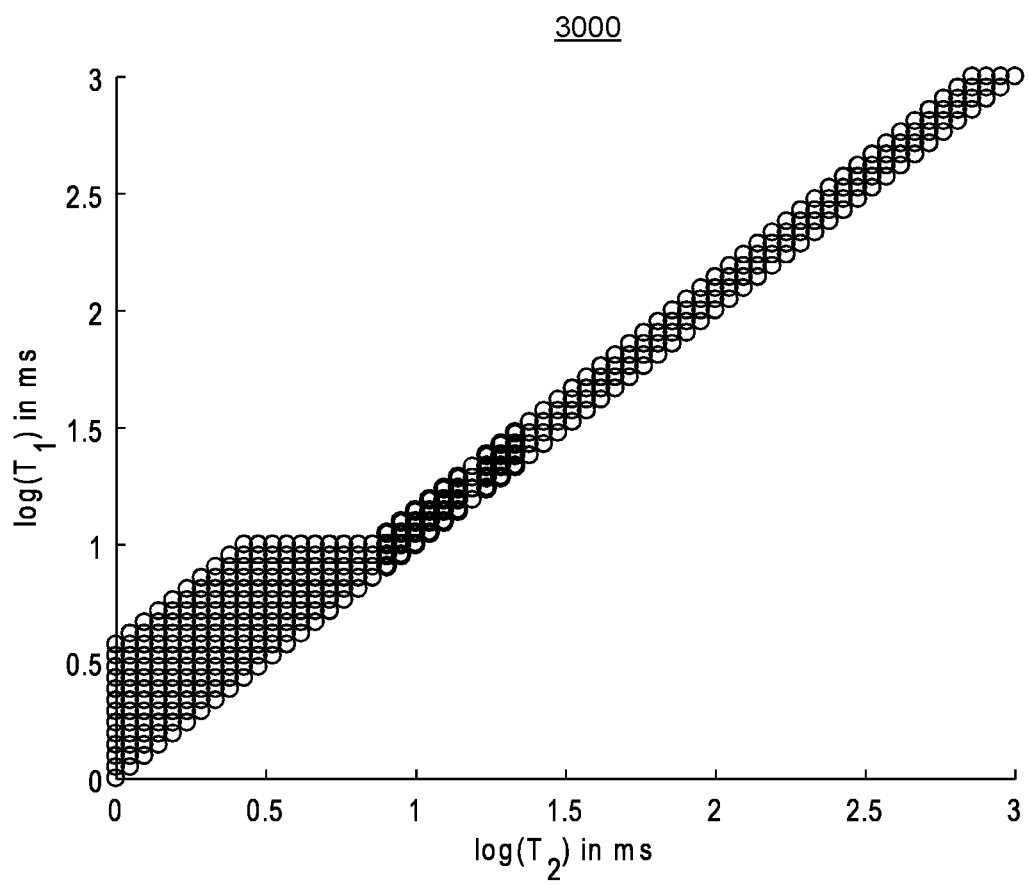
FIG. 30 illustrates an example of a plot in a parameter space for a classifications.

FIG. 30 shows a $T_1T_2$ space plot 3000 where the range of $T_1$, $T_2$ and $T_1/T_2$ ratio is constrained. In this approach, $T_1$ and $T_2$ are 100 logarithmically spaced values from 1 ms to 1 s. The allowed $T_1/T_2$ ratio is [1, 1.5] when $T_1$>10 ms and [1, 4] when $T_1$<10 ms. These numbers can be heuristic as they can follow a general trend revealed by petrophysical research yet can be reservoir-specific when re-running modeling.

Each simulated datum can be constructed by three components, each with porosity sampled stochastically in the interval [0, 0.15] and a $\{T_1, T_2\}$ pair sampled stochastically in the lexicographical ordering of the relaxation time index. A computed time-domain signal can be derived through Equation (15), below. In total 10,000 sets are generated.

$$S(t) = \sum_{n=1}^{n=3} \mu_n \left(1 - e^{-WT/T_{1,n}}\right) e^{-NE \cdot TE/T_{2,n}} + \epsilon. \qquad (15)$$

As an example, multiclass classification can be performed to accommodate more than two operating conditions. In various examples, for simplicity, two classes are considered for each classifier.

Figure 31:
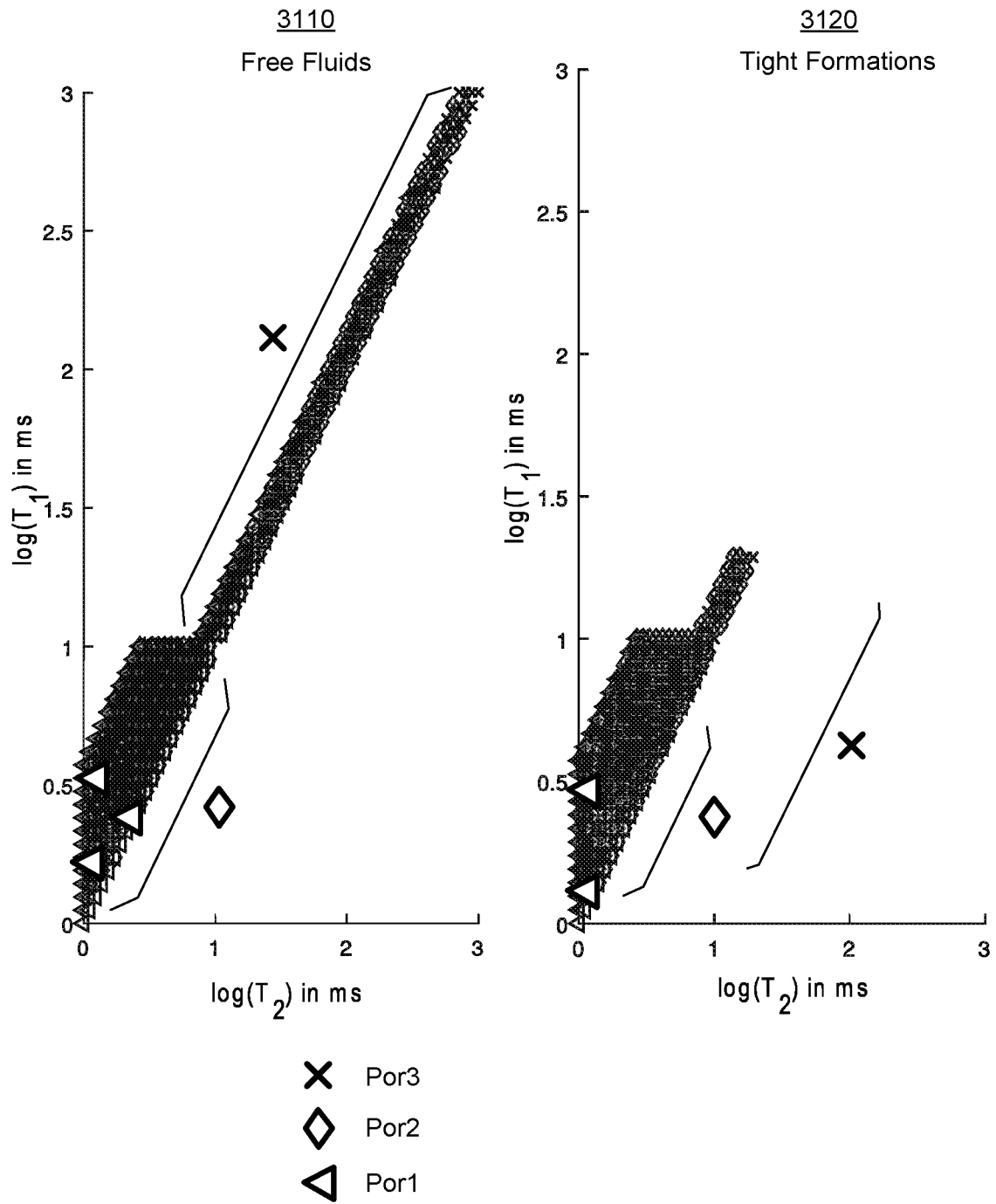
FIG. 31 illustrates examples of plots in a parameter space for classifications.

FIG. 31 shows example plots 3110 for free fluids and 3120 for tight formations. Markers in the plots 3110 and 3120 include crosses, diamonds and triangles, which represent three porosities: por1, por2, and por3. An example portion of code for classification appears below:

for i=1:SizeofTrainingData
  if (por3(i)>(por1(i)+por2(i)) && (T1_sort(i,3)>=20))
    classifier(i)=1; % free fluids
  elseif (T1_sort(i,3)<=20) && ((por1(i)+por2(i))>por3(i))
    classifier(i)=2; % tight formation
  end
end Above, SizeofTrainingData is equal to 10,000; por3, por2 and por1 are porosities of the corresponding $\{T_1, T_2\}$ component with descending $T_2$ values. $T_1\_sort(i,3)$ is the longest $T_1$ of the three components for a given data entry.

As to the first classification criterion, the goal is to distinguish "free fluids" from "tight formations". Simulated data are labeled to be "free fluids", if a datum has a porosity with $T_2$ larger than 20 ms. On the other hand, when the longest $T_2$ is shorter than 20 ms and porosities of short $T_2$s dominate, data are labeled "tight formation". Out of the 10,000 data entries, 1,300 are labeled "free fluids" and 900 are labeled "tight formation". Note again that here the numeric and terminologies are used quite liberally for purposes of illustrating the workflow and do not strictly correspond to established petrophysical nomenclatures.

Figure 32:
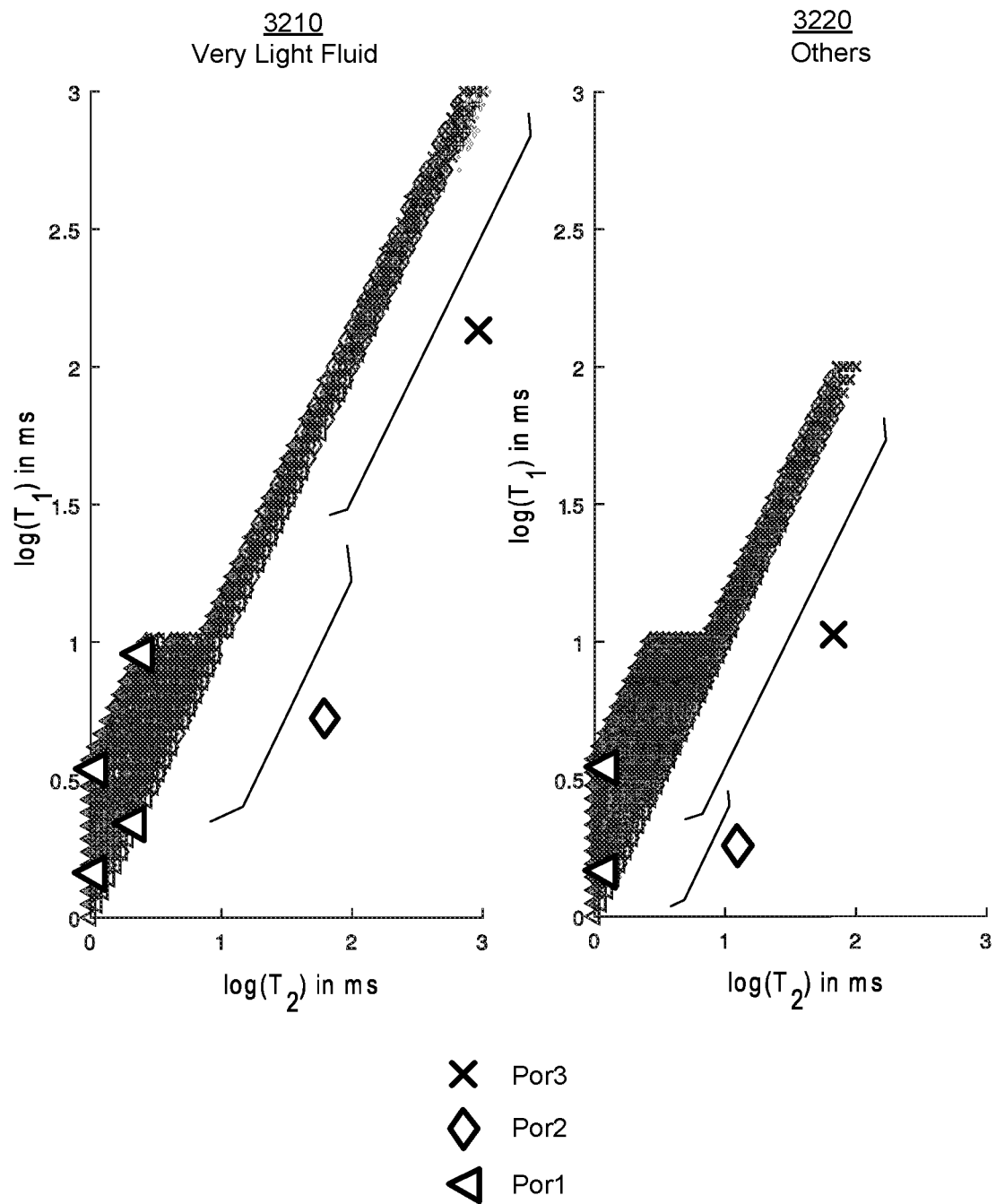
FIG. 32 illustrates examples of plots in a parameter space for classifications.

FIG. 32 shows the $T_1$ $T_2$ of "very light fluids" and "Others" 3220 labels. An example portion of code for classification appears below:

```
for i=1:SizeofTrainingData
  if (por3(i)>(por1(i)+por2(i)) && (T2_sort(i,3)>=300))
    classifier(i)=1; % light fluid
  elseif (T1_sort(i,3)<=100) && (T2_sort(i,2)<=80) &&
    ((por1(i)+por2(i))>por3(i))
    classifier(i)=2; % others
  end
end
```

Above, SizeofTrainingData is equal to 10,000; por3, por2 and por1 are porosities of the corresponding $\{T_1, T_2\}$ component with descending $T_2$ values. $T\frac{1}{2}\_sort(i,3)$ is the longest.

As to the second classification criterion, the goal is to distinguish "very light fluids" from "others". Simulated data are labeled to be "very light fluid", if a datum has a porosity with $T_2$ larger than 300 ms. On the other hand, when the longest $T_2$ is shorter than 100 ms, the second longest $\tau_2$ is shorter than 80 ms, and porosities of short $T_2$s dominate, the data are labeled "others". Out of the 10,000 data entries, 1,100 are labeled "free fluids" and 2300 are labeled "tight formation".

In an example workflow, each class of labeled formation types has its own optimized measurement protocol, for example, as in the aforementioned N×N matrix where N is equal to 3.

In an example workflow, labeled data are used to train a supervised learning model. The model, or a reduced version of it, can be a real time modeler (RT modeler). The model can be an efficient classifier that analyzes the time-domain sensory inputs generated by a tool and in turn outputs the state of the tool in certain operating quadrants. Subsequently, an appropriate method can be chosen for a next round of measurement (e.g., as a tool is moved in a borehole via drilling, tripping, wireline, etc.). An iterative process can be carried out through one or more downhole tool operations. For example, as a tool is moved along a borehole, a downhole RT modeler can output information such that the tool can select an appropriate method to make measurements. Such a selection can occur one or more times during movement of the tool in a downhole environment.

As mentions, the RT modeler can be or include a classifier, which can operate for making one or more types of classifications. As an example, consider a workflow that includes running a real time classification for an LWD operation using a RT modeler (RTM). In such an example, the RTM can be executed in firmware of an embedded chipset (e.g., embedded circuitry) within a LWD tool. For example, consider use of a RTM with linear binary support vector machines (SVMs). Due to efficient algebra and a relatively small codebase, SVMs can be suitable in some instances for downhole deployment without introduction of additional computing hardware. For example, a tool's existing hardware may be sufficient to implement a RTM SVM or SVMs.

For a data entry of N complex points (xi, where i=1, 2, ... N), a trained SVM classifier includes N weights (Wi, where i=1, 2, ... N) and one bias (B). The numerical values of weights and bias are determined during training the model.

For predicting class of a testing dataset X, the classifier can perform a calculation $X*W+B$. Depending on sign (whether+ or −) of the result, it can assign one class (if $sign(X*W+B)>0$) or the other (if $sign(X*W+B)<0$) for X. For example, for a data entry of 3000 points, a trained classifier takes 12 KB in memory (assuming a 32-bit data format) and performs approximately 6000 floating point calculations. As an example, downhole data may be further compressed before classification using window-sum and SVDs.

To determine the weights and bias, the following code, given as a MATLAB example, may be utilized:

t=templateSVM('Standardize',1,'SaveSupportVectors', true);
RTM=fitcsvm(TrainingData,Labels,'RemoveDuplicates', true);

where fitcsvm is a binary classifier, TrainingData are the labeled $T_1$ $T_2$ training datasets, and Labels are their corresponding labels.

As to inference results, in an inference operation, a RTM can return a deduced formation type with the inputs of time-domain $T_1$ $T_2$ data. In an example of MATLAB syntax, it may read:

FormationType=predict(*RTM*,DATA).

Below, classification results are described from the two classifiers constructed by labels as shown in FIGS. 31 and 32.

Figure 33:
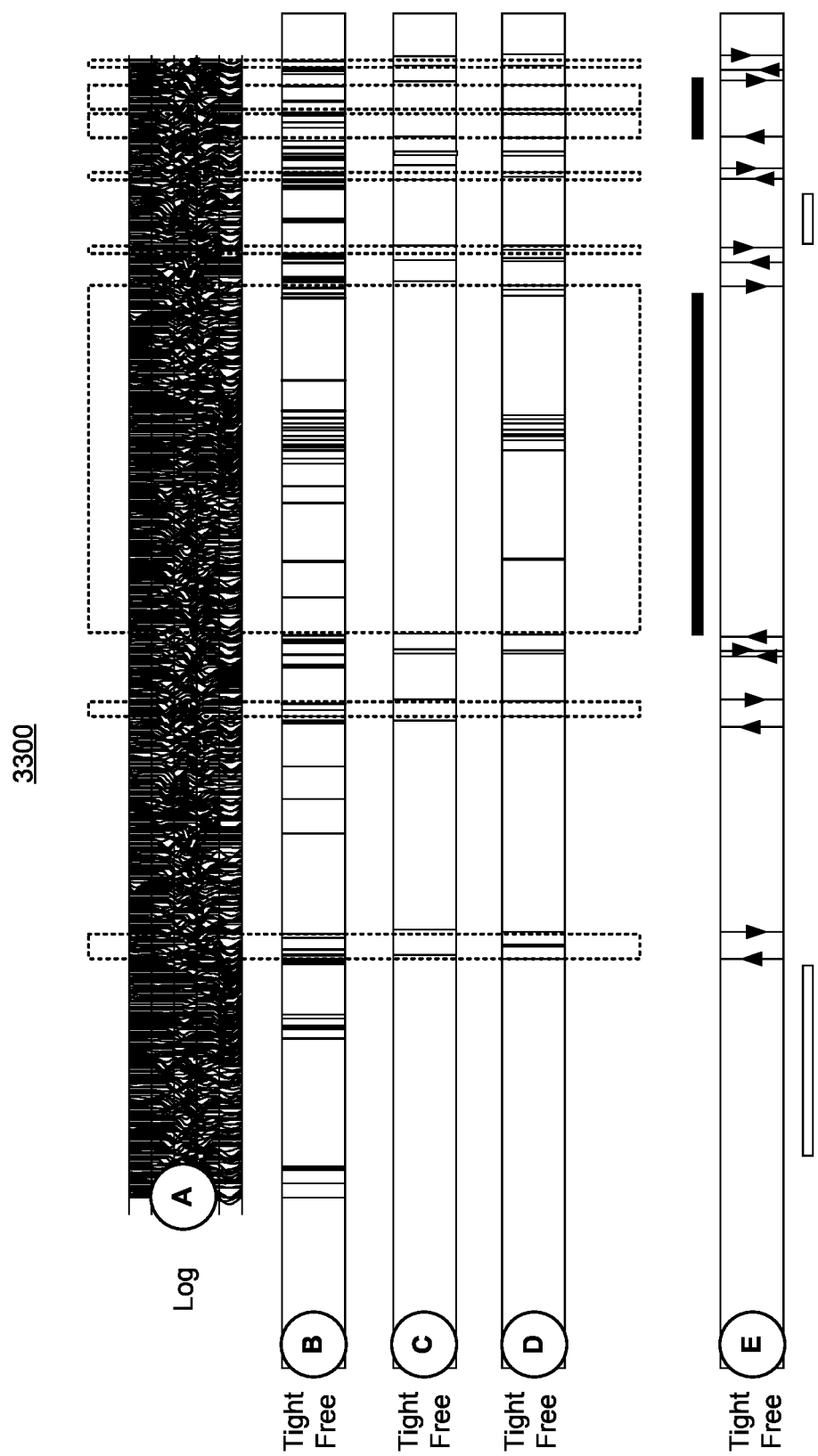
FIG. 33 illustrates examples of tracks that include log data, classifications and filtering.

FIG. 33 shows classification results 3300 from the first RTM where FIG. 33 specifically shows classification of the Alaska field test data (track A) into "free fluids" and "tight formation" classes. Track A includes the $T_2$ log of the 2,500 ft interval; track B includes the raw classification results; track C includes the filtered classification results, in which five consecutive results of different class call for triggering a switch; track D includes asymmetrically filtered classification results, in which a switch from tight to free demands two consecutive "free" results; while a switch from free to tight demands five consecutive "tight" results; and where track E includes the filtered classification results using the field data to train the RTM. For sake of clarity, track E includes arrows to indicate direction of switches and also includes open rectangular and filled rectangular indicators as bands for visual guidance. Training data points labeled "free fluid" and "tight formation" were assessed, 300 for each of "free fluid" and "tight formation". Tracks C and E agree in a majority of portions of the interval (see, e.g., the bands). Dotted boxes provide a visual guide to mapping of "tight" class in track D to the $T_2$ log of track A.

As explained, the raw classification results tended to be "noisy" in the sense that rapid switching between the two classes exists in several sections. To denoise the results, a method can include applying a simple low-pass filter as shown in track C of FIG. 33. According to the filter, five different, consecutive classification results triggers a switch (for example, sequential classification results, X, Y, Y, Y, Y, Y, will alter the classification output from X to Y at the last Y).

As an example, a method can value data from one type of formation more than another and, in such a case, a method may value information of free fluids more than information of tight formations. Such "favoritism" may be incorporated into a method (e.g., an RTM) by applying an asymmetrical low-pass filter, as shown in track D of FIG. 33. To evaluate classification quality by using simulations for training the model, classification results with a RTM trained by labeled sections can be compared to a corresponding logging interval. As shown, track E of FIG. 33 yields results that correspond well with track C. Specifically, quality can be demonstrated by comparing track C to track E, where the classification results are substantially the same between training with synthetic data and field data.

Figure 34:
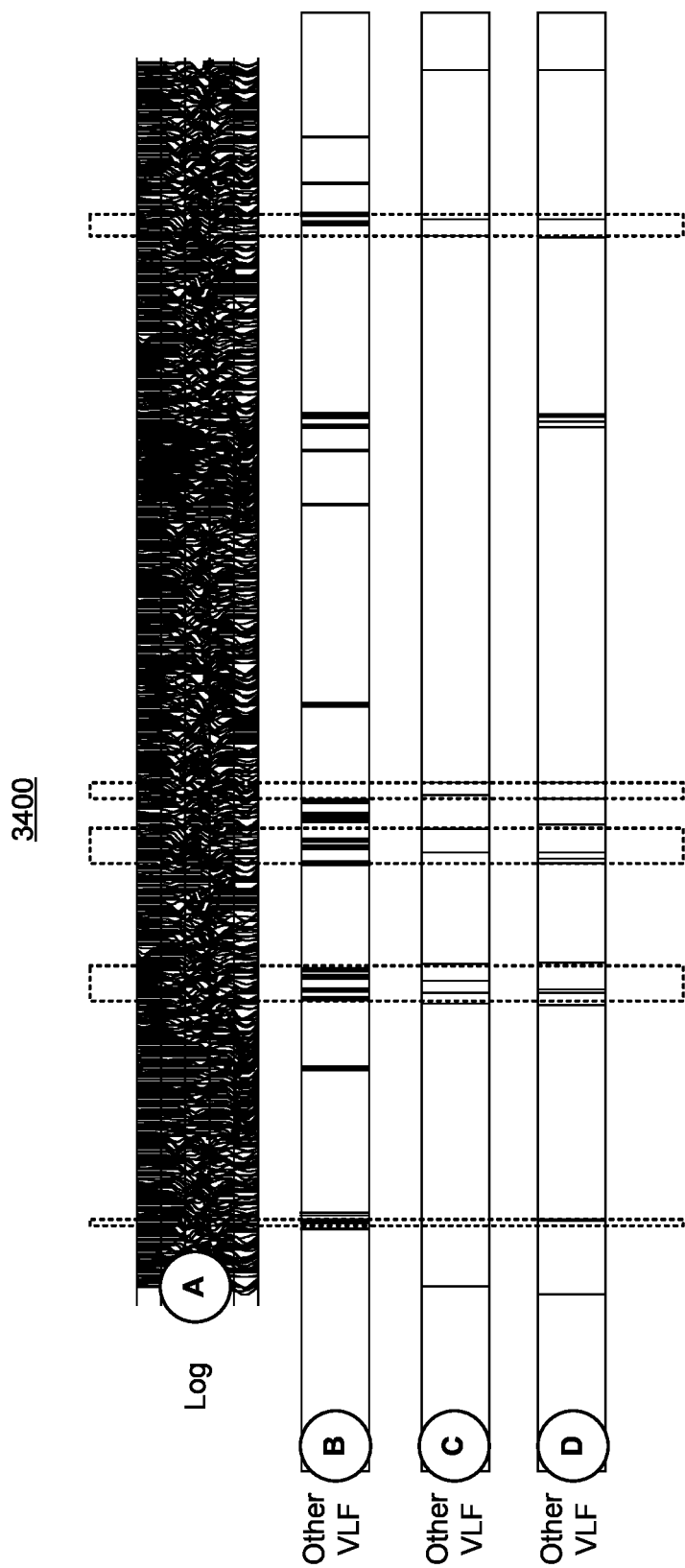
FIG. 34 illustrates examples of tracks that include log data, classifications and filtering.

FIG. 34 shows classification results 3400 from the second RTM (e.g., the second classifier as described above). Similar behaviors are exhibited while applying low-pass filters. The consistency between the $T_2$ log and the classification results are highlighted through the aligned, dotted boxes.

Specifically, FIG. 34 shows classifications of the Alaska field test data into "very light fluids" and "other" classes. Track A includes the $T_2$ log of the 2,500 ft interval; track B includes the raw classification results; track C includes filtered classification results, in which five consecutive results of different class will trigger a switch; track D includes asymmetrically filtered classification results, in which a switch from others=>very light fluids demands two consecutive "very light fluids" results; while a switch from very light fluids=>others demands five consecutive "others" results. The dotted boxes provide a visual guide to map "others" class in track D to the $T_2$ log of track A.

As an example, use of one or more RTMs can allow for a move from user-driven job planning and execution to data-driven and automated acquisition optimization.

As an example, a method may implement one or more techniques to address thin beds. For example, a balance can be programmed via logic to handle switching frequency and/or classification robustness. As an example, such logic can be utilized to balance switching when operating in laminated formations, where the tool is to detect boundaries of fine geological layers, especially in a pay zone(s). An approach may assess benchmarks to tune one or more hyperparameters of an algorithm. As an example, if a reservoir is known to include laminated zones, an ad hoc classification scheme may be designed, trained by regional logs, and deployed selectively.

A measurement protocol may be sensitive to various types of operating conditions. For example, assume applying a PS of short WT trains that is optimized for relatively short $\{T_1, T_2\}$ sections. The longest WTs, WTmax, of the array can be longer than a threshold, so that $1-\exp(-WTmax/T_1max)$ is sufficiently different from 1, where $T_1max$ is the longest $T_1$ of the considered reservoir. The appropriate numerical value of the threshold can be dependent on a multitude of factors, such as the mathematical construct, SNR, and etc.

As an example, as NMR logs can exhibit a rich diversity due to geological variance across different reservoirs, best practices could vary, from place to place. As an example, a global database with data for regions can be utilized for training various RTMs. Such an approach can involve collecting and studying logs from worldwide operations and optimizing tool performance based on location-specific practices and objectives.

As an example, an RTM or RTMs can depend in part on conveyance method and corresponding operational constraints. While various examples refer to LWD (drilling) equipment, wireline equipment tends to have substantially wider telemetry bandwidth and at times available down logs. In wireline operations, switching may be implemented via one or more RTMs where analysis at surface may optionally be utilized to tailor operation of an RTM or RTMs or, for example, switch off an RTM in certain instances (e.g., for thin bed laminations, etc.). As an example, an RTM may be tailored as to velocity of a tool, acceleration of a tool, deceleration of a tool, etc. As an example, where telemetry is available in wireline operations, surface analysis may be utilized to adjust one or more conveyance parameters such as, for example, velocity of a tool, acceleration of a tool, deceleration of a tool, etc.

As an example, a tool may implement one or more RTMs for sequential optimization, for example, where newly acquired data are used to optimize future experiments. A complementary approach may be batch optimization, where a workflow can plan multiple experiments concurrently at a guess of sample properties. For example, within a class of definitive, prior $\{T_1, T_2\}$ distributions (such as acquired from past logs in an area or from down logs), a workflow can determine the optimal PS while meeting minimum operational demands, such as data SNR, total runtime, power, etc. As an example, a Bayesian approach may be implemented.

As mentioned, various types of circuitry can be included in a downhole tool that can implement one or more RTMs. For example, circuitry can include one or more features of the microprocessor 1000 and/or the circuitry 1080 of FIG. 10.

As an example, a downhole tool can include circuitry that can provide for processing of data and transmission of data, for example, using one or more telemetry systems to provide data at an uphole location.

As explained, often a tool is programmed prior to a job to utilize a single pulse sequence (PS) for the job throughout an entire logging run. With two (or more) PSs of different runtimes (and therefore a possible discrepancy of data density in a unit time), an ability to handle stacking can be beneficial, for example, to adjust stacking to keep an uplink rate unchanged. In various instances, data compression techniques can benefit from adjustments when running multiple PSs in a cross-scan stack.

As to data acquisition and compression, consider the pulse sequences PS1 and PS2 of Table 1. In these examples, 2392 echo amplitudes are generated during execution (e.g., 2392=1024+1024+256+64+16+8). In various field applications, more than 10,000 echo amplitudes may be obtained in each scan, depending on the PS in use. Consider a 4-byte format where the corresponding data volume exceeds 40 KB, which can, depending on equipment, be too large to be transmitted uphole in real time. To address data size (e.g., data volume), one or more data compression techniques may be utilized to reduce data density.

Figure 35:
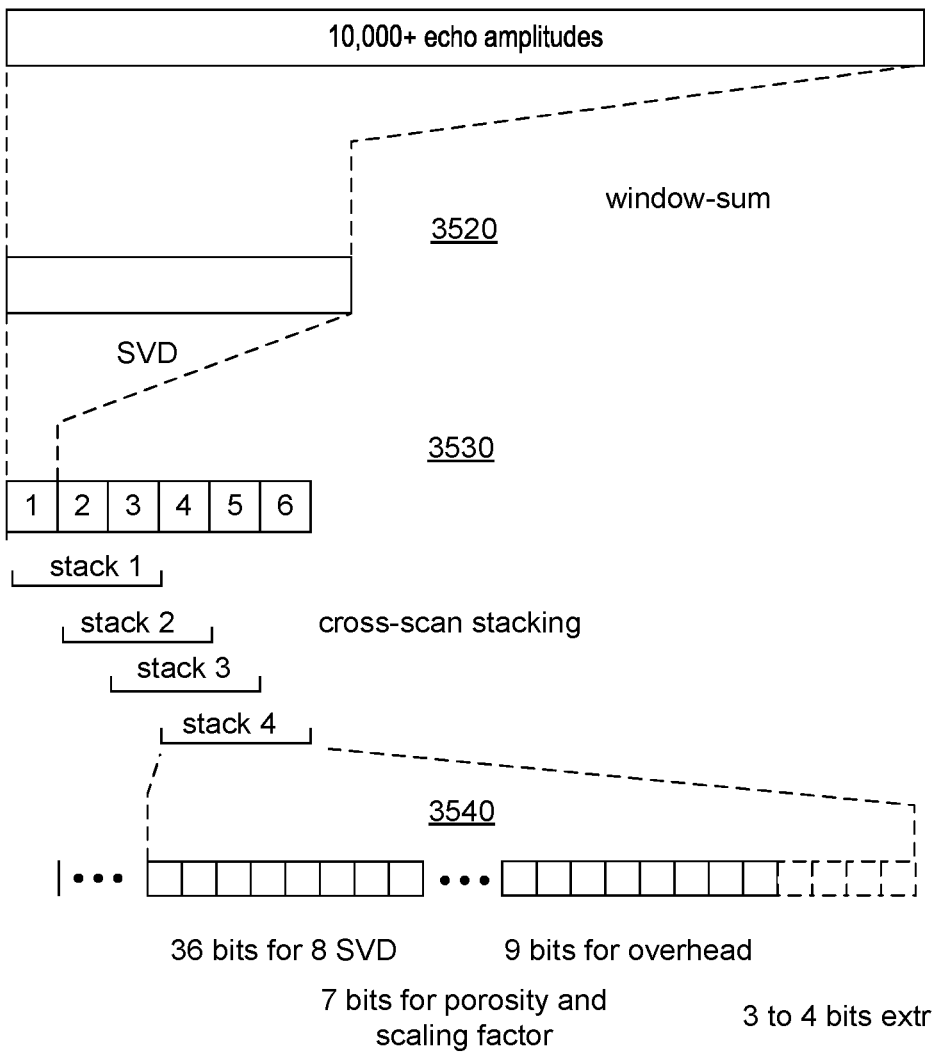
FIG. 35 illustrates examples of graphics with respect to data handling.

FIG. 35 shows an example of a technique 3500 that includes a window-sum operation. Specifically, FIG. 35 shows a downhole workflow of data generation, compression and packaging for sequence data where graphic 3510 includes uncompressed raw data of echo amplitudes; graphic 3520 includes a window-summed echo array; graphic 3530 includes 16 SVD values after applying the second compression technique; and graphic 3540 includes a full data frame from a 3-level cross-scan stacking, ready to be transmitted uphole.

The technique 3500 calculates the mean of echo amplitudes over an array of increasing intervals, such that echo amplitudes at longer echo times will be averaged more. For example, suppose the original echo amplitudes in a CPMG segment is a 1 D array $\{x_1, x_2, \ldots x_n\}$ and the window-sum vector is $\{w_1, w_2, \ldots w_m\}$, where $w_i$ is an integer that satisfies $w_i \geq w_{i-1}$ and $\Sigma w_i = n$. Then the compressed echo array is $\{\overline{x_1}, \overline{x_2}, \ldots \overline{x_m}\}$, in which:

$$\overline{x_k} = \overline{\left\{\sum_{i=1}^{x_{k-1}} w_i + 1, \ldots x \sum_{i=1}^{k} w_i\right\}} \quad (16)$$

where the overbar denotes an arithmetic mean. The window-sum vector is often a geometric sequence and therefore: m«n. After a first-step compression, up to 200 window-sum values can be obtained in tool memory.

Subsequently, singular value decomposition (SVD) may be applied to further reduce data size. As an example, a technique can produce a number of SVD values per scan, which may be configurable. As an example, an approach may utilize 16 SVD values per scan. In the instance where a single pulse sequence (PS) is executed in a job, the same SVD matrix can be applied to compress each scan. Then, cross-scan stacking can be applied to boost the acquisition SNR while further reducing unit-time data density (e.g., with the number of stacking specified prior to a logging job, for example, consider one of 3, 5 or 7).

Where 16 SVD values per scan are utilized, out of the 16 SVD values, the first eight may be transmitted uphole, for example, with aggressive quantization (e.g., 6, 6, 5, 5, 4, 4, 3, 3 bits, in order, for 36 bits total). In such an example, the 36 bits, plus seven for a porosity/scaling factor and nine "overhead" bits (e.g., 52 bits in total) may be transmitted uphole once per telemetry frame. The total length of the telemetry frame can vary by job and may be of the order of 2 to 4 minutes. Small additions (e.g., a scheme to permanently add 3-4 bits to the total 52 to encode a sequence identifier, etc.) may be accommodated. Multiplicative increases may be possible with additional logic and logical operations.

An LWD tool, under various circumstances, may not choose uplink timing itself. Instead, its data may be requested (e.g., at time intervals which are generally regular but from the tool's perspective to be treated as effectively random), upon which it sends the most recent data. External to a tool, during job setup, a request pattern can be configured into a tool.

As an example, consider a scan that takes 31 seconds and a 5-level stacking where the request interval will be no more than 155 seconds (e.g., 31 s multiplied by 5). As the data interval (e.g., scan rate times stacking level) will not (and cannot) equal the request interval, the data being sent can be either fresh or at times slightly stale (as much as one scan time, so 31 seconds in the example). Referring again to FIG. 35, in the graphic 3540, another example is shown, assuming stack1 is sent uphole, then the next data frame will be either stack3 (slightly stale) or stack4 (fresh).

To ensure the freshness of received data frames on surface, downhole data are compressed within a cross-scan stack, in which more than one measurement protocols may be used (see, e.g., PS1 and PS2 in Table 1). Additionally, under regular operation, there can be a demand for consistent data density within each data frame. As a consequence, varying levels of stacking are to be applied if per-scan data density of corresponding PS differs.

Referring again to the circuitry 1080 of FIG. 10, a high-level representation of a digital architecture for a downhole tool is shown. Such circuitry can be defined by functional blocks such as a board with a combined modem and controller board. As an example, consider a ToolX Controller (TLXCON) board and a ToolX Power and Communication (TLXPAC) board. As an example, circuitry may combine functionality of those two boards into a single board (e.g., optionally without TLXPAC features). Circuitry can provide various tool controller functions such as, for example, downhole and surface communication, data recording, high-level tool control, and tool configuration distribution. As an example, circuitry can provide for acquiring shock measurements and chassis/electronics temperature.

Circuitry can include a NMR Processing and Acquisition (NPA) board, which may provide functions such as: acquire and pre-process NMR data, acquire tool diagnostics data, and compute answer products. As an example, these functions may be divided between two separate FPGAs/processors. For example, an acquisition processor can acquire NMR data and performs certain NMR pre-processing operations (e.g., quadrature mixing, down-sampling, and echo integration) and then provide the data to an answer products processor, for example, via an SPI type of bus.

Circuitry can include an answer products processor (e.g., output processor of data for download, transmission, etc.) for taking NMR data and generating real time and recorded-mode NMR channels. Such data can be processed for transmission by transmission circuitry (e.g., TLXCON and sequencers) as appropriate.

As an example, a processor can be utilized for acquiring various tool diagnostics and status data. For example, consider handling of board voltages/currents, turbine RPM, analog system status (e.g. HVPS over-current), B0 field strength, and magnet temperature. As an example, a processor can control one or more interfaces (e.g., SPI, etc.) for one or more of operations (e.g., ADC control, etc.), which can include operations of multiplexer lines that drive acquisition electronics (e.g., on the same board, another board, etc.).

As shown in the circuitry 1080 of FIG. 10, a sequencer can provide for generating one or more NMR pulse sequences that can be output via the antenna.

Circuitry of a tool can include one or more RAM chips (e.g., SRAM, etc.) such as, for example, for memory that may be in a range of a megabyte to ten megabytes for various operations and memory that may be in the range of gigabytes for recording.

As an example, a method can provide for data compression where multiple, different pulse sequences (PSs) are utilized by a downhole tool in a downhole run.

As an example, a method can provide for a desired data density through running multiple PSs as well as switching among them and/or effectively compress echo data given multiple PSs in cross-scan stackings.

As an example, consider an approach that utilizes "hybrid stacking" to denote running multiple PSs (e.g., two or more PSs) in a cross-scan stack. To keep data density constant, the number of stackings can be specified to depend on runtimes of executed PSs.

FIG. 36 shows example graphics 3610 and 3630 where two pulse sequences are considered, PS1 and PS2, with a runtime of PS1 being twice as long as a runtime of PS2. In the example graphics, the width of bins is proportional to their respective runtime. Assuming a 3-level stacking for PS1, to maintain the same data density for uplink, hybrid stacking can be utilized as a logging tool transitions from running PS1 to PS2 as illustrated in the graphic 3610 and from running PS2 to PS1 as illustrated in the graphic 3630. The stackings labeled "2" and "3" have both sequences in use (see, e.g., dotted brackets).

Again, assume two PSs, PS1 and PS2, with run times: $R_1 = m \cdot R_2$. If N-level stacking is applied to PS1 alone, the number of stacking while running i scans (where i is an integer, ranging from 0 to N) of PS1 is given by:

$$S(k) = i + m \cdot (N-i) \qquad (17)$$

In such a scheme PS2 is executed $m \cdot (N-i)$ times. As an example, a method can be implemented that demands runtimes of different PSs to be multiples of one another (e.g., so that m is an integer, as shown in FIG. 36 where m=2); though this is not a stringent demand. Another consequence of using multiple PSs in a cross-scan stack is the modification of the SVD, which can impact data compression.

SVD is a technique that can be implemented to reduce data dimensionality while preserving a particular amount of information. In a matrix notation, an $T_1T_2$ echo array, D, can be expressed as:

$$D = K \cdot F + \varepsilon \qquad (18)$$

where K is the kernel function determined by the pulse sequence in use, F is the underlying density matrix of sample $\{T_1, T_2\}$, and $\varepsilon$ is the noise.

As an example, a method can factorize the matrix K into its singular vectors, U and $V^T$, mediated by E composed of K's singular values through $K = U\Sigma V^T$. Combining the SVD with Equation (18) yields:

$$U^T D = \Sigma V^T \cdot F + U^T \varepsilon \qquad (19)$$

Equation (19) depicts data compression through applying SVD. As to results, consider an example that assumes that the window-summed echo amplitudes are a complex array D of dimension 200×1 and U is the truncated singular vectors of dimensions 200×16, the compressed dataset, $U^T D$, has dimensions 16×1. In practice, matrix K (and subsequently U) may be obtained through analytical or experimental means and $U^T$ is stored in the SRAM of processing and acquisition circuitry.

Consider two PSs that manifest comparable noise characteristics within a single scan (such as the two sequences in Table 1). In this example, further assume runtime $R_1 = m \cdot R_2$ and N-level stacking if running PS1 alone. Following Equation (19), two Us are utilized with each corresponding to run a single PS in cross-scan stackings.

In a hybrid stacking of i PS1 scans and $m \cdot (N-i)$ PS2 scans, the window-summed echo array can be written as:

$$\begin{bmatrix} \overline{D}_1 \\ \overline{D}_2 \end{bmatrix} = \begin{bmatrix} iK_1 \cdot F_1 \\ m \cdot (N-i)K_2 \cdot F_2 \end{bmatrix} + \begin{bmatrix} \varepsilon_1 \\ \varepsilon_2 \end{bmatrix} \qquad (20)$$

where $\overline{D}_{1,2}$ is the stacked echo array, $\varepsilon_{1,2}$ the stacked noise, and $K_{1,2}$ the kernel functions for PS1 and PS2, respectively.

In an example logging operation, the tool movement may be quite slow such that $F_1 = F_2 = F$. Furthermore, considers $\varepsilon_1/\sqrt{i}$: $\varepsilon_2/\sqrt{m \cdot (N-i)}$:$\varepsilon$. As a result, $$\begin{bmatrix} \dfrac{\overline{D}_1}{\sqrt{i}} \\ \dfrac{\overline{D}_2}{\sqrt{m \cdot (N-i)}} \end{bmatrix} = \begin{bmatrix} \sqrt{i}\, K_1 \\ \sqrt{m \cdot (N-i)}\, K_2 \end{bmatrix} \cdot F + \varepsilon \qquad (21)$$

Denoting $K_i = \{\sqrt{i}K_1, \sqrt{m \cdot (N-i)}K_2\}^T$, which factorizes into $U_i \Sigma_i V_i^T$, $U_i^T$ (where i=0, 1, ... N) are the truncated singular vectors for the new downhole SVDs.

Table 2. Examples of multipliers of RAM demands for two example compression schemes.

| data | $U^T$ for 2 PSs | $U^T$ for M PSs |
|---|---|---|
| 1 | 2 | 2N | $M^2N - M^2 - MN + 2M$ |
| 2 | 2 | 4 | $M^2$ |

Each $U_i^T$ for i=1, 2, ... (N-1) takes twice the memory space that of $U^T$ in Equation (19). In conjunction with $U_0^T$ and $U_N^T$, the total memory demand is $2N(=2+(N-1)\times 2)$ times of $U^T$S. In addition, the window-summed echo, as shown in the l.h.s. of Equation (20), takes twice memory space of original Ds. The demanded RAM for two PSs, in both window-summed data and SVD matrices $U^T$, is summarized in Table 2 as multipliers of original requirements.

To further reduce RAM demand, a method may approximate $U_i^T$ for i=1, 2, ... (N-1) by a single matrix, $U_0^T$, as the truncated singular vectors for $K_0 = \{K_1, K_2\}$. In this alternative scheme, the total RAM for SVD matrices is ×4 of $U^T$s.

As an example, consider M pulse sequences loaded into tool memory. If arbitrary pairs of PSs are allowed, the total demand on memory for the considered two schemes (one in which additional (N-1) $U^T$'s are used for pairwise PS stacking, and the other in which one additional approximating $U_0^T$ is used for pairwise PS stacking) becomes $M^2N - M^2 - MN + 2M$ and $M^2$ times of the current respective memory usage.

Switching PSs in real time demands performing classification of the just-acquired echo arrays and based on which, deciding the subsequent measurement protocols. As an example, consider a workflow for PS switches using the two PSs, PS1 and PS2, in Table 1 as examples.

FIG. 37 shows example graphics 3710 and 3730 for real time classification of echo arrays. The graphic 3710 shows transition from PS1 to PS2 and the graphic 3730 shows transition from PS2 to PS1. Note a delay between the change of classifier outputs and PS switch, dubbed "transition". When the change persists for a consecutive number of scans, the PS switches. Since an echo array from hybrid stacking is not used for training the classifiers, classification can be turned off during that period and where cross-scan stack reaches sufficient SNR, classification can be switched back on (e.g., resume).

In the workflow illustrated in FIG. 37, uplinked stacks can be the same as classifier inputs for PS1, while they differ for PS2. Since classifiers can be trained with echo arrays of comparable SNR, they may also demand similar SNR for realtime field data. As single-scan SNR can be comparable between PS1 and PS2, the level of cross-scan stacks can be specified to be the same for both PSs when feeding into classifiers.

Various examples of workflows for hybrid stacking may be utilized along with downhole SVD, and realtime classification to accommodate real time self-reconfiguration of a downhole tool (e.g., NMR tools, etc.). As an example, surface equipment may be utilized in a manner that can handle hybrid stacks. For example, when hybrid stacks are transmitted uphole, an appropriate inversion algorithm can be selected and applied.

While NMR is mentioned, one or more other sensor-based measurement techniques, equipment, etc., may utilize automated switching and, for example, hybrid stacking. One example is casing detection, which can involve a number of fast antenna Q-measurements.

As an example, a method can include switching from a casing detection technique to a formation property technique where a transition occurs from a cased portion of a borehole to an open portion of a borehole (e.g., an uncased portion). In such an example, a measurement technique such as NMR measurement may commence where a tool is moved from a cased portion to an uncased portion of a borehole. As an example, during tripping out or other uphole movement, a reverse approach may be utilized where a measurement technique is switched off where data indicate that a tool has entered a cased portion of a borehole (e.g., from an uncased portion of a borehole). As an example, a casing detection technique may be of lower power utilization than a measurement technique for a formation property. In such examples, power of a tool may be conserved for a run in hole (RIH) and/or a pull out of hole (POOH). As an example, a casing detection technique may measure an antenna Q value and where a Q value changes, the change may indicate that a transition has occurred from a cased to uncased portion of a borehole or vice versa. As an example, when running in hole, a casing detection technique may be utilized to switch on a formation measurement technique and the casing detection technique may optionally run in parallel and/or in series, for example, to detect casing during subsequent running out of hole (e.g., tripping out). As an example, a method can include moving a tool inwardly and moving the tool outwardly one or more times over one or more portions of a borehole, which may be at or proximate to a completion component such as a casing, a shoe, etc. In some instances, knowledge of a formation at such a position in a borehole may be of particular value (e.g., to understand what issues may exist at an end of a completion component, how to extend the completion, etc.).

As an example, a tool can include a turbine power generation that can generate power responsive to flow of fluid. For example, consider a turbine power generator that can generate power responsive to flow of drilling fluid (e.g., in a downhole direction or in an uphole direction, whether in a tubular and/or in an annulus). Such power may be utilized to power one or more circuits of a downhole tool (e.g., consider circuitry as in FIG. 8, FIG. 10, etc.). As an example, an adaptive scheme implemented in a downhole tool may provide for optimal use of generated power, which may fluctuate in a manner that can depend on various factors (e.g., drilling fluid flow rate, etc.)

Again, while NMR is mentioned, various circuitry, techniques, etc., may be applied to one or more other types of measurements that can characterize one or more downhole conditions (e.g., formation, completions, fluid, etc.). As an example, consider EM measurements as for conductivity and/or resistivity. A switching approach may switch emissions of electromagnetic energy to a different frequency, amplitudes and phases, etc. As an example, a switching approach may adjust operation of one or more sensors, for example, to provide for more optimal measurement of energy received responsive to one or more energy emissions. As an example, consider tuning circuitry for an antenna, amplifier circuitry operatively coupled to a sensor, analog-to-digital conversion (ADC) circuitry, etc. As to ADC circuitry, consider an approach that can adjust a number of bits per sample, a sample rate, etc. Such adjustments may be coordinated with available storage (memory), with available power, with available telemetry, with available compression techniques, etc.

As an example, circuitry may receive information from one or more different types of sensors. For example, consider a temperature sensor and an NMR sensor where the temperature sensor may provide temperature information that is germane to NMR. As an example, one or more fluid properties, fluid phases, etc., may depend on temperature. For example, consider viscosity, which may decrease with an increase in temperature. In such an example, a NMR time constant may be affected, which may mean that a different pulse sequence may be more suitable than a current pulse sequence. As an example, a tool can include circuitry that can switch a pulse sequence (PS) based at least in part on temperature.

As an example, a tool may include one or more types of sensors that can provide information as to porosity of a formation. For example, consider neutron porosity information. For NMR measurements, polarization time can be related to porosity. As an example, where a neutron tool porosity value is acquired, that value may be utilized for one or more purposes. For example, consider switching a NMR pulse sequence (PS) responsive to a change in a neutron tool porosity value. Such an approach may, for example, select a PS that increases or decreases a polarization time, as appropriate. In such an example, the NMR measurement may become more accurate, may be reduce in run time, may conserve power, etc. As an example, an assessment may be made to "double check" a neutron tool porosity value based determination by assessing one or more NMR measurements (e.g., before and after a PS switch). As an example, a method may be utilized in a shale formation, optionally where a neutron tool can provide neutron tool porosity values (e.g., via gamma ray radiation, etc.).

Referring again to FIG. 10, one or more microprocessors such as the microprocessor 1000 may be utilized in a downhole tool. As an example, a downhole tool can include one or more processors with one or more features of the NVIDIA TEGRA family of processors (NVIDIA Corporation, Santa Clara, Calif.). For example, consider the TEGRA X1, which includes four ARM CORTEX-A57 cores and four ARM Cortex-A53 cores (ARM Holdings, plc, Cambridge, UK), as well as a NVIDIA MAXWELL-based GPU. The TEGRA X1 processor supports Adaptive Scalable Texture Compression. The four ARM CORTEX-A53 cores are used automatically in very low power scenarios as determined by the TEGRA X1. The TEGRA X1 may be utilized with the JETSON NANO development kit (NVIDIA Corporation, Santa Clara, Calif.). Various modes can include power consumption of 10 W (mode 0) and power consumption of 5 W (mode 1, using two cores at 918 MHz the GPU at 640 MHz).

As an example, circuitry can include a 256-core GPU of 1 Teraflops peak performance that implements a sampling approach for measurement optimization, and obtained 100× speedup when the GPU is enabled.

Figure 38:
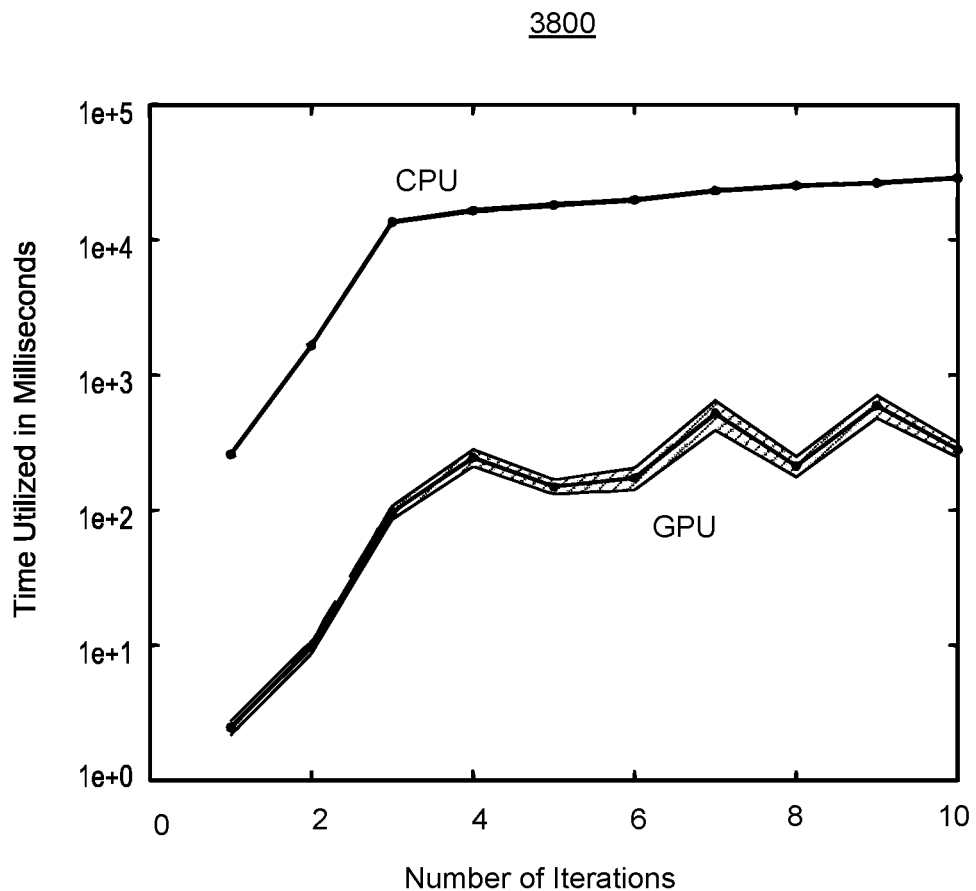
FIG. 38 illustrates an example plot of computational time versus iteration for a CPU and a GPU.

FIG. 38 shows an example plot 3800 of time utilized in milliseconds as computation time with and without GPU-enabled as a function of number of iterations. The decay function is $S(t)=A0 \exp(-t/T_2)+n.s.$ An implementation set the ground truths for A0 and $T_2$ at respectively 1 and 0.5, with the number of solutions being 5000 for each of the iterations (n.s.=0.01×N(0, 0.5)). In the example implementation, 10 times of the algorithm were repeated with and without GPU-enabled. The markers represent time consumed at each of the iterations while the cross-hatched area represents standard error of mean at each of the iterations. The results of FIG. 38 indicate that the GPU-enabled approach can expedite processing and can be suitable for real time operations in a downhole environment.

As explained, temperature can be a factor as to measurements performed in a downhole environment. Various types of circuitry can be limited as to temperature. For example, limits may be physical and/or programmed. As to programmed limits, a processor, chip, chipset, etc., may be programmed to terminate various operations in response to a temperature reading being at or above a temperature limit. Table 3, below, shows some thermal specifications, where an operation temperature (Op T) value for a thermal transfer plate (TTP) is shown, along with values for the TEGRA X1.

Table 3. Example thermal specifications.

| Parameter | Value | Units |
| --- | --- | --- |
| Max. TTP Op T | 80 | C. |
| Max TEGRA X1 Op T | T.cpu = 89 | C. |
| | T.gpu = 90.5 | C. |
| TEGRA X1 Shutdown T | T.cpu = 103 | C. |
| | T.gpu = 104 | C. |

As an example, a downhole tool can include cooling equipment that can cool circuitry. For example, such cooling equipment may operate in an effort to maintain circuitry below one or more specified temperatures.

As an example, for cooling, circuitry can be covered by one or more types of TIM (thermal insulation material). For example, consider one or more of a TIM1 a 1.0 mm layer of FUJIPOLY SARCON PG80A (Fujipoly, Carteret, N.J.) and TIM2 a thermal gap pads (T-FLEX 360, Laird, plc, London, UK). As an example, an added layer of TIM (TIM3) can be utilized with a goal of keeping a thermal transfer plate (TTP) below 80° C.

As an example, cooling equipment may aim to cool down circuitry directly, optionally without a TTP in place. For example, consider an approach that disassembles a thermal stack-up and places cooling equipment directly on top of a processor (e.g., chip or chipset) and its peripheral circuitry. As an example, such an approach may be utilized as a cooling scheme to maintain a temperature below a specified temperature (e.g., 90° C., etc.).

Various types of equipment may be utilized for cooling circuitry. For example, consider equipment that aims to maintain a TTP below 80° C. and/or circuitry below 90° C. with a 5 W thermal load.

As example, a cooling scheme can use thermoelectric (Peltier) cooling. One example of such a cooler is a Peltier cooler of 2.6 cm$^2$ cm effective cooling area that provides 60° C. cooling, with 6 W thermal load at 50° C. in an $N_2$ environment using HHL sub-mounts from TEC Microsystems GmbH (Berlin, DE). For example, consider a 1 MC06-126-05 thermoelectric cooler (TEC) or another one of the MC06 series family of TECs.

As an example, cooling equipment can include fluid such as $CO_2$. For example, consider a container (e.g., vacuum flask, Dewar, etc.) that can contain liquid $CO_2$ which can keep the inside of the container at a much lower temperature for extended time. As an example, a cooling flask can be used to incorporate circuitry (e.g., one or more processors, etc.) to maintain operating temperatures within specifications.

Figure 39:
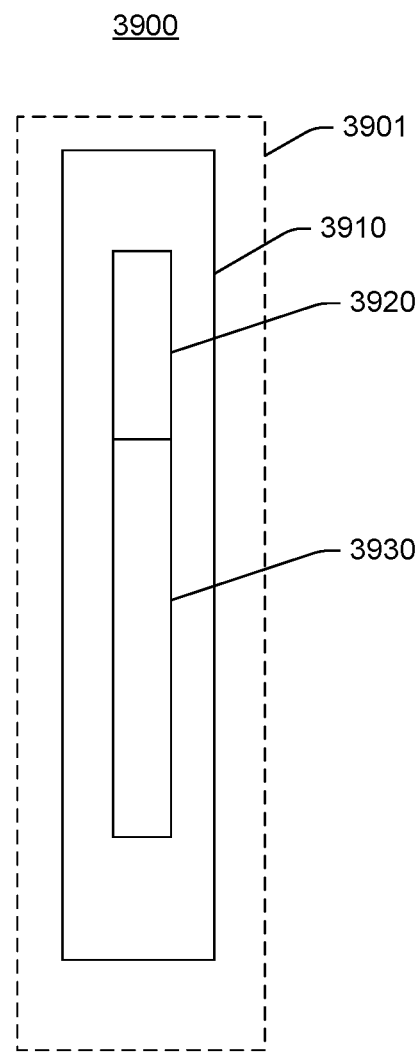
FIG. 39 illustrates an example of an assembly.

FIG. 39 shows an example of an assembly 3900 that includes a downhole tool 3901 that includes a container 3910 for a cooling liquid that can cool circuitry 3920 that can be operatively coupled to a heat sink 3930 (e.g., for thermal transfer of heat energy away from the circuitry 3920 and increase of surface area in contact with the cooling liquid. The assembly 3900 may include one or more thermoelectric coolers (TECs).

As an example, a method can include accessing a measurement model in memory of a downhole tool; determining an optimal parameter set using a processor of the downhole tool and the measurement model; and performing at least one measurement using at least one sensor of the downhole tool operated according to the optimal parameter set. In such an example, the method can include determining the optimal parameter set using at least one prior measurement acquired via the downhole tool.

As an example, a measurement model can be a compressed measurement model that is compressed prior to storage in memory of a downhole tool.

As an example, an optimal parameter set can be optimal for measuring one or more physical properties of material that can be material that forms a wall of a borehole where such material can include fluid or fluids. As an example, an optimal parameter set may be optimal for making measurements in a manner that accounts for one or more circuitry related factors such as, for example, power utilization, available memory, available telemetry, available processing, etc. As an example, an optimal parameter set may be optimal for making measurements in a manner that accounts for one or more downhole tool related factors such as, for example, tool velocity, tool acceleration, tool vibration, tool operation(s), tool depth (e.g., TVD, MD, etc.), etc. As an example, a downhole tool can include one or more measurement models. As an example, a measurement model may be selected from a group of measurement models that provide for determining an optimal parameter set with respect to one or more factors (e.g., formation, circuitry, downhole tool, etc.).

As an example, a method can include moving a downhole tool in a borehole defined by at least one formation where, for example, at least one measurement characterizes at least one of the at least one formation. In such an example, the method can include determining an optimal parameter set using the at least one measurement. For example, consider assessing a measurement using a measurement model and determining an optimal parameter set for making measurements of a formation where, for example, an optimal parameter set may exist for each of a plurality of different types of formations. In such an example, a method can include automated determinations as to parameter sets where a downhole run can utilize a plurality of different parameter sets as automatically determined (e.g., selected, etc.) responsive to changes in environment about a downhole measurement tool.

As an example, a method can include determining a transition of a downhole tool from a first formation of a borehole to a second formation of the borehole where an optimal parameter set is determined that corresponds to the first formation of the borehole and, responsive to the transition, the method includes determining an optimal parameter set that corresponds to the second formation of the borehole.

As an example, a measurement model can be or include a nuclear magnetic resonance (NMR) measurement model. In such an example, the measurement model can be utilized in a method that includes determining an optimal parameter set by utilizing at least one of a $T_1$ value and a $T_2$ value. As an example, a measurement model can include $T_1$ values and $T_2$ values corresponding to an unconventional reservoir and associated parameter sets, where an optimal parameter set can be selected from the parameter sets.

As an example, a measurement model can include at least one classifier. For example, consider at least one classifier that is a formation type classifier. As an example, a measurement model can be or include a decision tree. As an example, a measurement model can be or include a support vector machine (SVM). As an example, a measurement model can include at least two classifiers. For example, consider at least two classifiers that classify measurements as corresponding to different types of formations.

As an example, a method can include generating a measurement model prior to storing the measurement model in the memory of the downhole tool. In such an example, a method can include building an uncompressed measurement model and compressing the uncompressed measurement model to generate a compressed measurement model for storage in the memory of the downhole tool.

As an example, a system can include a processor; memory accessible to the processor; processor-executable instructions stored in the memory and executable by the processor to instruct the system to: access a measurement model in memory of a downhole tool; determine an optimal parameter set using a processor of the downhole tool and the measurement model; and perform at least one measurement using at least one sensor of the downhole tool operated according to the optimal parameter set. In such an example, the measurement model can be or include a decision tree or a support vector machine (SVM).

As an example, one or more computer-readable storage media can include computer-executable instructions executable to instruct a computing system to: access a measurement model in memory of a downhole tool; determine an optimal parameter set using a processor of the downhole tool and the measurement model; and perform at least one measurement using at least one sensor of the downhole tool operated according to the optimal parameter set.

Figure 40:
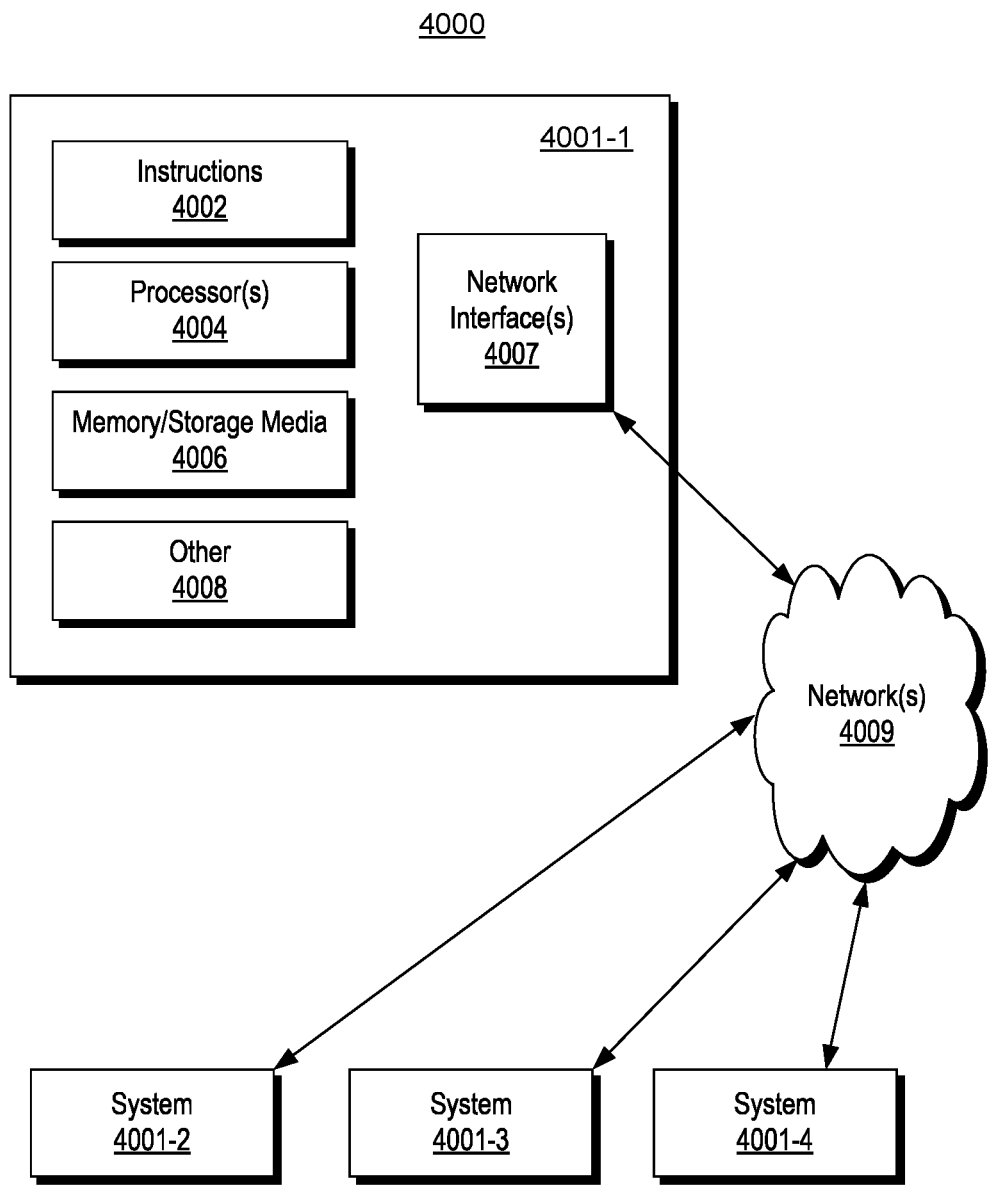
FIG. 40 illustrates examples of computing and networking equipment.

In some embodiments, a method or methods may be executed by a computing system. FIG. 40 shows an example of a system 4000 that can include one or more computing systems 4001-1, 4001-2, 4001-3 and 4001-4, which may be operatively coupled via one or more networks 4009, which may include wired and/or wireless networks.

As an example, a system can include an individual computer system or an arrangement of distributed computer systems. In the example of FIG. 40, the computer system 4001-1 can include one or more sets of instructions 4002, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 4004, which is (or are) operatively coupled to one or more storage media 4006 (e.g., via wire, wirelessly, etc.). As an example, one or more of the one or more processors 4004 can be operatively coupled to at least one of one or more network interface 4007. In such an example, the computer system 4001-1 can transmit and/or receive information, for example, via the one or more networks 4009 (e.g., consider one or more of the Internet, a private network, a cellular network, a satellite network, etc.).

As an example, the computer system 4001-1 may receive from and/or transmit information to one or more other devices, which may be or include, for example, one or more of the computer systems 4001-2, etc. A device may be located in a physical location that differs from that of the computer system 4001-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 4006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 41:
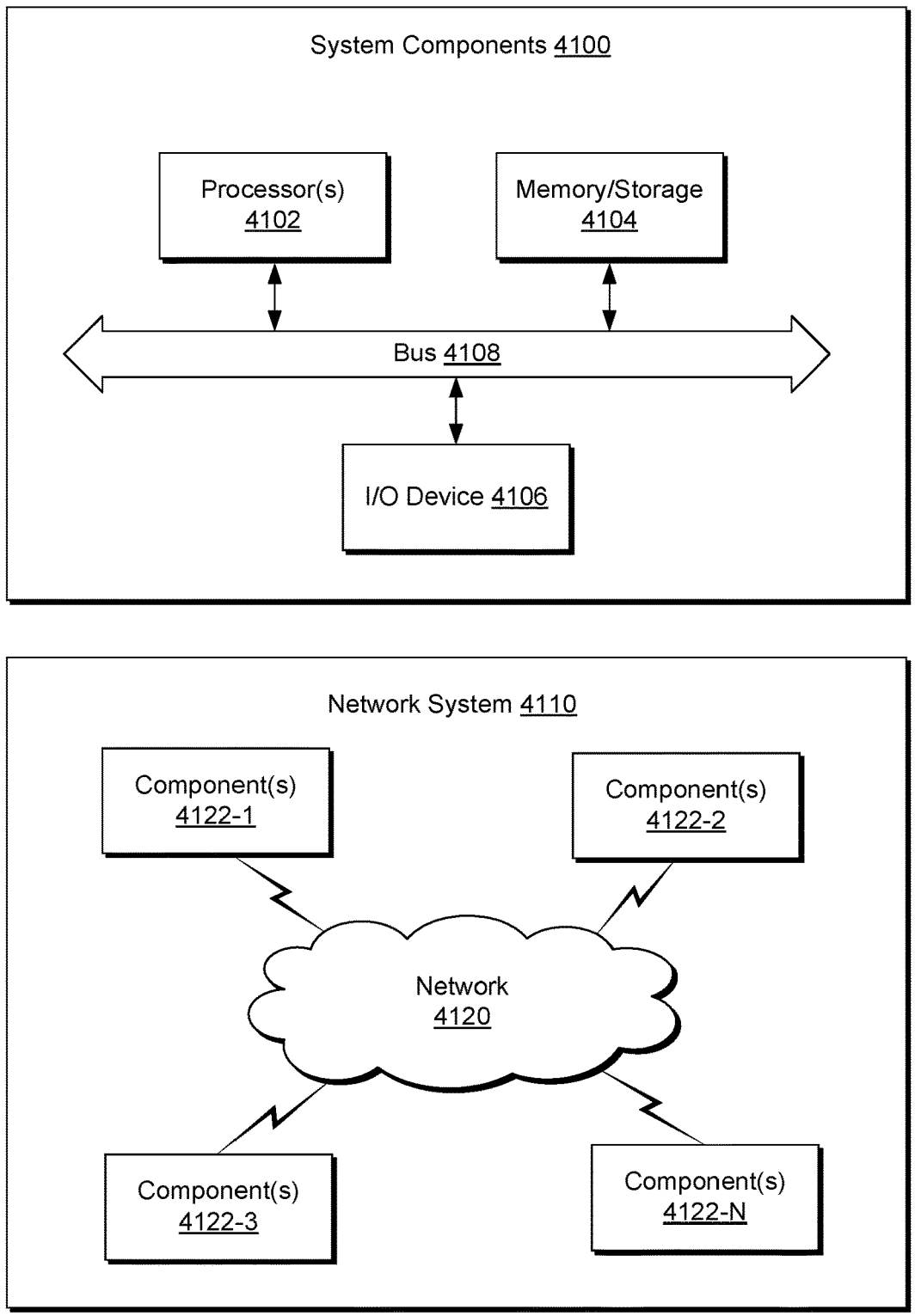
FIG. 41 illustrates example components of a system and a networked system.

FIG. 41 shows components of a computing system 4100 and a networked system 4110. The system 4100 includes one or more processors 4102, memory and/or storage components 4104, one or more input and/or output devices 4106 and a bus 4108. According to an embodiment, instructions may be stored in one or more computer-readable media (e.g., memory/storage components 4104). Such instructions may be read by one or more processors (e.g., the processor(s) 4102) via a communication bus (e.g., the bus 4108), which may be wired or wireless. The one or more processors may execute such instructions to implement (wholly or in part) one or more attributes (e.g., as part of a method). A user may view output from and interact with a process via an I/O device (e.g., the device 4106). According to an embodiment, a computer-readable medium may be a storage component such as a physical memory storage device, for example, a chip, a chip on a package, a memory card, etc.

According to an embodiment, components may be distributed, such as in the network system 4110. The network system 4110 includes components 4122-1, 4122-2, 4122-3, . . . 4122-N. For example, the components 4122-1 may include the processor(s) 4102 while the component(s) 4122-3 may include memory accessible by the processor(s) 4102. Further, the component(s) 4122-2 may include an I/O device for display and optionally interaction with a method. The network 4120 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
generating a measurement model at surface prior to storing the measurement model in memory disposed within a downhole tool, wherein generating the measurement model includes building an uncompressed measurement model and compressing the uncompressed measurement model to generate a compressed measurement model for storage in the memory;
storing the compressed measurement model in the memory;
moving the downhole tool from a first subsurface location to a second subsurface location in a borehole defined by at least one formation;
accessing the compressed measurement model in the memory;
performing a first measurement using a sensor of the downhole tool operated according to a first parameter set while the sensor is positioned subsurface within the borehole;
determining, by a processor disposed within the downhole tool, an optimal parameter set for operating the sensor of the downhole tool using the compressed measurement model and the first measurement while each of the processor, the sensor, and the memory is positioned subsurface within the borehole, wherein the first parameter set and the optimal parameter set are different; and
performing a second measurement using the sensor of the downhole tool operated according to the optimal parameter set while each of the sensor, the processor, and the memory is positioned subsurface within the borehole.

2. The method of claim 1 further comprising determining the optimal parameter set using at least one prior measurement acquired via the downhole tool.

3. The method of claim 1, wherein the first measurement characterizes at least one of the at least one formation.

4. The method of claim 1, further comprising:
determining a transition of the downhole tool from a first formation of a borehole to a second formation of the borehole, wherein the optimal parameter set is a first optimal parameter set that corresponds to the first formation of the borehole and;
responsive to the transition, determining a second optimal parameter set that corresponds to the second formation of the borehole, wherein the first optimal parameter set and the second optimal parameter set are different.

5. The method of claim 1, wherein the compressed measurement model comprises a nuclear magnetic resonance (NMR) measurement model.

6. The method of claim 5, wherein determining the optimal parameter set utilizes at least one of a $T_1$ value and a $T_2$ value.

7. The method of claim 5, wherein the compressed measurement model comprises $T_1$ values and $T_2$ values corresponding to an unconventional reservoir and associated parameter sets, wherein the optimal parameter set is selected from the parameter sets.

8. The method of claim 1, wherein the compressed measurement model comprises at least one classifier.

9. The method of claim 8, wherein the at least one classifier comprises a formation type classifier.

10. The method of claim 1, wherein the compressed measurement model comprises at least two classifiers.

11. The method of claim 10, wherein the at least two classifiers classify measurements as corresponding to different types of formations.

12. The method of claim 1, wherein the compressed measurement model comprises a decision tree.

13. The method of claim 1, wherein the compressed measurement model comprises a support vector machine (SVM).

14. A system comprising:
a first subsystem comprising:
   a processor;
   memory accessible to the processor; and
   processor-executable instructions stored in the memory and executable by the processor to instruct the first subsystem to:
      generate a measurement model at surface prior to storing the measurement model in memory disposed within a downhole tool, wherein generating the measurement model includes building an uncompressed measurement model and compressing the uncompressed measurement model to generate a compressed measurement model for storage in the memory of the downhole tool; and
      store the compressed measurement model in the memory disposed within
   the downhole tool; and
a second subsystem comprising:
   a processor:
   memory accessible to the processor of the second subsystem; and
   processor-executable instructions stored in the memory and executable by the processor to instruct the second subsystem to:
      access the compressed measurement model in the memory disposed within the downhole tool while the downhole tool is moving from a first subsurface location to a second subsurface location in a borehole defined by at least one formation;
      perform a first measurement using a sensor disposed within the downhole tool, wherein the sensor is operated according to a first parameter set while the sensor is positioned subsurface within the borehole:
      determine, by a processor disposed within the downhole tool, an optimal parameter set using the compressed measurement model and the first measurement while each of the processor disposed within the downhole tool, the sensor disposed within the downhole tool, and the memory disposed within the downhole tool is positioned subsurface within the borehole, wherein the first parameter set and the optimal parameter set are different; and
      perform a second measurement using the sensor of the downhole tool operated according to the optimal parameter set while each of the sensor, the processor disposed within the downhole tool, and the memory disposed within the downhole tool is positioned subsurface within the borehole.

15. The system of claim 14, wherein the compressed measurement model comprises a decision tree or a support vector machine.

16. One or more computer-readable storage media comprising computer-executable instructions executable to instruct a computing system to:
   generate a measurement model at surface prior to storing the measurement model in memory disposed within a downhole tool, wherein generating the measurement model includes building an uncompressed measurement model and compressing the uncompressed measurement model to generate a compressed measurement model for storage in the memory;
   store the compressed measurement model in the memory;
   access the compressed measurement model in the memory while the downhole tool is moving from a first subsurface location to a second subsurface location in a borehole defined by at least one formation;
   perform a first measurement using a sensor of the downhole tool operated according to a first parameter set while the sensor is positioned subsurface within the borehole;
   determine, by a processor disposed within the downhole tool, an optimal parameter set using the compressed measurement model and the first measurement while each of the processor, the sensor, and the memory is positioned subsurface within the borehole, wherein the first parameter set and the optimal parameter set are different; and
   perform a second measurement using the sensor of the downhole tool operated according to the optimal parameter set while each of the sensor, the processor, and the memory is positioned subsurface within the borehole.

17. The system of claim 14, wherein the second subsystem is disposed within the downhole tool.

18. The one or more computer-readable storage media of claim 16, wherein the compressed measurement model comprises a nuclear magnetic resonance (NMR) measurement model.

19. The one or more computer-readable storage media of claim 16, wherein the compressed measurement model comprises a decision tree or a support vector machine.

* * * * *